US012138751B2

(12) United States Patent
Xu et al.

(10) Patent No.: US 12,138,751 B2
(45) Date of Patent: Nov. 12, 2024

(54) IMPACT TOOL

(71) Applicant: Nanjing Chervon Industry Co., Ltd., Nanjing (CN)

(72) Inventors: Rui Xu, Nanjing (CN); Yuyi Zheng, Nanjing (CN); Chen Wang, Nanjing (CN); Masatoshi Fukinuki, Nanjing (CN); Biao Zhang, Nanjing (CN); Hongtao Ke, Nanjing (CN); Hengyong Hu, Nanjing (CN); Chuan Geng, Nanjing (CN); Xiaoyong Wang, Nanjing (CN); Di Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 83 days.

(21) Appl. No.: 18/094,475

(22) Filed: Jan. 9, 2023

(65) Prior Publication Data

US 2023/0234193 A1 Jul. 27, 2023

(30) Foreign Application Priority Data

| | | |
|---|---|---|
| Jan. 25, 2022 | (CN) | 202210086517.1 |
| Mar. 25, 2022 | (CN) | 202210300738.4 |
| Mar. 25, 2022 | (CN) | 202210302299.0 |
| Jun. 22, 2022 | (CN) | 202221569354.4 |
| Dec. 15, 2022 | (CN) | 202223396429.6 |

(51) Int. Cl.
*B25B 21/02* (2006.01)
*B25F 5/00* (2006.01)
*B25F 5/02* (2006.01)

(52) U.S. Cl.
CPC .............. *B25B 21/02* (2013.01); *B25F 5/001* (2013.01); *B25F 5/02* (2013.01)

(58) Field of Classification Search
CPC ............. B25F 5/02; B25F 5/001; B25B 21/02
See application file for complete search history.

(56) References Cited

U.S. PATENT DOCUMENTS

2023/0166387 A1* 6/2023 Aoyama .................. B25F 5/02 173/93

* cited by examiner

*Primary Examiner* — Daniel Jeremy Leeds
(74) *Attorney, Agent, or Firm* — Greenberg Traurig, LLP

(57) ABSTRACT

An impact tool includes an impact assembly and a housing. The impact assembly is used for applying an impact force to an output shaft and includes a main shaft driven by a drive shaft, an impact block connected to the main shaft, and a hammer anvil mating with and struck by the impact block. A motor is at least partially accommodated in the housing. A length L from a rear end of the housing to a front end of the output shaft is greater than or equal to 78 mm and less than or equal to 97 mm and an outer circumferential diameter D of the housing is less than or equal to 60 mm.

15 Claims, 39 Drawing Sheets

IMPACT TOOL

RELATED APPLICATION INFORMATION

This application claims the benefit under 35 U.S.C. § 119(a) of Chinese Patent Application No. 202210086517.1, filed on Jan. 25, 2022, Chinese Patent Application No. 202210300738.4, filed on Mar. 25, 2022, Chinese Patent Application No. 202210302299.0, filed on Mar. 25, 2022, Chinese Patent Application No. 202221569354.4, filed on Jun. 22, 2022, and Chinese Patent Application No. 202223396429.6, filed on Dec. 15, 2022, which applications are incorporated herein by reference in their entirety.

TECHNICAL FIELD

The present disclosure relates to a power tool and, in particular, to an impact tool.

BACKGROUND

An impact tool can output a rotary motion with a certain impact frequency and includes, but is not limited to, an impact wrench and an impact screwdriver. For example, the impact wrench is used for tightening bolts and nuts, and the impact screwdriver is often used for loosening or tightening screws. To achieve the rotary motion with the certain impact frequency, the impact tool needs to include an output assembly for outputting a rotary force and an impact assembly for periodically impacting on the output assembly. Thus, the whole impact tool is relatively bulky. In some narrow working conditions, the relatively bulky impact tool cannot enter into operation, resulting in reduced efficiency during mounting or detaching.

SUMMARY

An impact tool includes a motor, an output shaft, an impact assembly, a housing, a hammer housing, and a grip. The motor includes a drive shaft that rotates about a first axis. The output shaft is used for outputting power and rotating about an output axis. The impact assembly is used for applying an impact force to the output shaft and includes a main shaft driven by the drive shaft, an impact block connected to the main shaft, and a hammer anvil mating with and struck by the impact block. The motor is at least partially accommodated in the housing. The hammer housing is formed on or connected to the housing, where the output shaft is at least partially accommodated in the hammer housing. The grip is connected to or formed on the housing. A length L from a rear end of the housing to a front end of the output shaft is greater than or equal to 78 mm and less than or equal to 97 mm and an outer circumferential diameter D of the housing is less than or equal to 60 mm.

An impact tool includes a motor, an output shaft, an impact assembly, a housing, a hammer housing, and a grip. The motor includes a drive shaft that rotates about a first axis. The output shaft is used for outputting power and rotating about an output axis. The impact assembly is used for applying an impact force to the output shaft and includes a main shaft driven by the drive shaft, an impact block connected to the main shaft, and a hammer anvil mating with and struck by the impact block. The motor is at least partially accommodated in the housing. The hammer housing is formed on or connected to the housing, where the output shaft is at least partially accommodated in the hammer housing. The grip is connected to or formed on the housing.

A length L from a rear end of the housing to a front end of the output shaft is less than or equal to 97 mm.

An impact tool includes a motor, an output shaft, an impact assembly, a housing, a hammer housing, and a grip. The motor includes a drive shaft that rotates about a first axis. The output shaft is used for outputting power and rotating about an output axis. The impact assembly is used for applying an impact force to the output shaft and includes a main shaft driven by the drive shaft, an impact block connected to the main shaft, and a hammer anvil mating with and struck by the impact block. The motor is at least partially accommodated in the housing. The hammer housing is formed on or connected to the housing, where the output shaft is at least partially accommodated in the hammer housing. The grip is connected to or formed on the housing. A length L from a rear end of the housing to a front end of the output shaft is greater than or equal to 78 mm and less than or equal to 97 mm.

DETAILED DESCRIPTION

The present disclosure is described hereinafter in detail in conjunction with drawings and examples.

Figure 1:
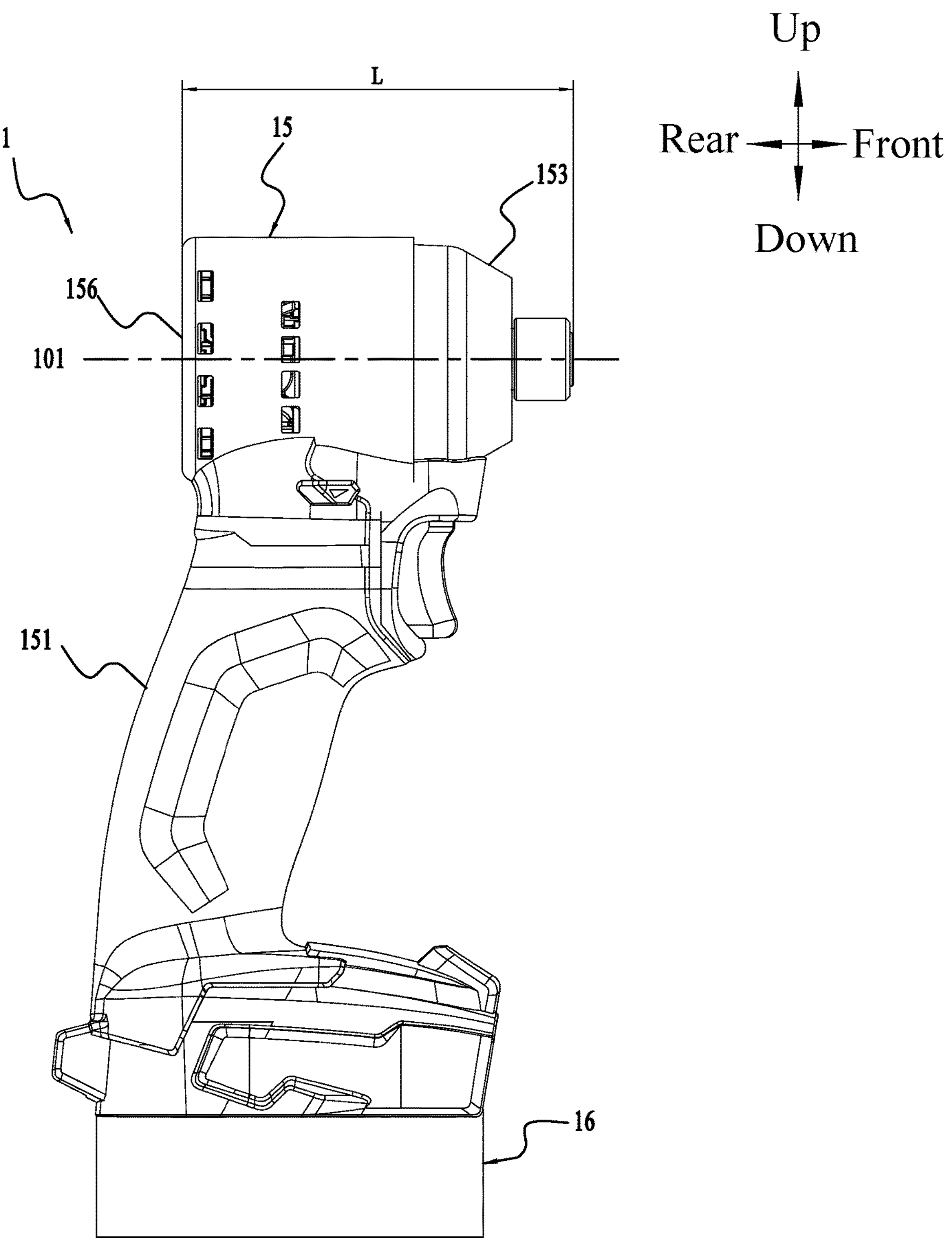
FIG. 1 is a structural view of a first example of the present application.

To clearly illustrate technical solutions of the present disclosure, an upper side, a lower side, a front side, and a rear side shown in FIG. 1 are further defined.

FIGS. 1 to 18 show a first example of the present disclosure. An impact tool 1 includes a motor 11, a transmission assembly 12, an impact assembly 13, a power output assembly 14, and a housing 15. The motor 11, the transmission assembly 12, the impact assembly 13, and the power output assembly 14 are arranged in sequence along a front and rear direction in the housing 15.

The motor 11 includes or is connected to a drive shaft 111 that is rotatable relative to the housing 15 about a first axis 101. In this example, the drive shaft 111 is directly connected to a rotor of the motor 11. In other examples, the drive shaft 111 may be another rotating shaft drivingly connected to the rotor of the motor 11. It is to be noted that in the present disclosure, the motor 11 is specifically configured to be an electric motor 11, and the electric motor 11 is used instead of the motor 11 hereinafter but cannot be construed as limiting the present disclosure.

Further, the housing 15 is formed with or connected to a grip 151 for a user to operate. The grip 151 and the housing 15 form a T-shaped or L-shaped structure, which is convenient for the user to hold and operate. A power supply device 16 is connected to an end of the grip 151. The power supply device 16 is detachably connected to the housing 15. The power supply device 16 may be mains power. In this example, the power supply device 16 is a battery pack. A hammer housing 153 is connected to a front end of the housing 15 and the impact assembly 13 is at least partially disposed in the hammer housing 153.

The power output assembly 14 includes an output shaft 141, and an accommodating portion 1412 is disposed at a front end of the output shaft 141 and may accommodate a corresponding working head, such as a screwdriver, a drill bit, and a wrench, when different functions are implemented. A clamping structure for retaining or clamping the corresponding working head is disposed on the output shaft. The clamping structure may exceed the output shaft in a direction of an output axis. The clamping structure may be disposed on a rear side of the output shaft, that is, may not exceed the output shaft. It is also feasible that a front end of the clamping structure is flush with the front end of the output shaft.

In this example, the impact tool 1 is specifically an impact screwdriver for screwing a screw. It is to be understood that in other examples, the impact tool may be an impact wrench capable of screwing a bolt or nut.

As shown in FIGS. 1 to 8, when the electric motor 11 operates at a high speed, a large amount of heat is generated, resulting in heating of a coil due to a current passing through a stator winding. The heat is accumulated in the housing 15, and excessive heat causes a series of problems. For example, the time for which the impact tool keeps outputting relatively high power becomes shorter, which cannot satisfy the actual requirements of the impact tool. To improve the heat dissipation efficiency of the electric motor 11 and cause the heat to be effectively discharged, a fan 117 is mounted on the electric motor 11. In this example, an end of the electric motor 11 is used for outputting a driving force and connected to the power output assembly 14 through the transmission assembly 12 and the impact assembly 13. The other end of the electric motor 11 is connected to the fan 117. In other alternative examples, the fan may be mounted on the same side as the power output assembly 14. In other alternative examples, the fan 117 may be disposed at other positions of the electric motor 11 according to a mounting position of the electric motor in the housing and the layout of an output relationship of the driving force in the impact tool.

A heat dissipation hole 154 communicating the inside and the outside of the housing 15 is opened on the housing 15 at a position corresponding to the fan 117 and serves as an air outlet. An air inlet is opened at a front end of the electric motor 11. The fan 117 is driven by the drive shaft 111 to rotate about a second axis. In this example, the fan 117 is directly sleeved on the drive shaft 111 through a center hole 1173, and the second axis coincides with the first axis 101. In other examples, the drive shaft may be connected to the fan 117 through another mechanism with a gear ratio, and it is not limited here that the fan 117 is directly or indirectly driven by the electric motor specifically. According to different transmission manners of the fan 117 and the drive shaft, a positional relationship between the second axis and the first axis includes, but is not limited to, being at an angle or parallel to each other as long as the drive shaft 111 can drive the fan 117 to rotate.

The impact tool 1 further includes a rear bearing 113 of the electric motor, and a first bearing 113 supports a rear end of the drive shaft 111. The first bearing 113 is detachably mounted in the housing 15. An outer race of the first bearing 113 is engaged with a rear end of the housing 15. An inner race of the first bearing 113 abuts against an outer circumferential surface of the drive shaft 111. In this example, a bearing mounting groove 155 is disposed on an inner sidewall 157 at the rear end of the housing, and the first bearing 113 is detachably mounted in the bearing mounting groove 155.

The fan 117 includes fan blades 1171 and a fan baseplate 1172 on which the fan blades 1171 are mounted. The center hole 1173 of the fan 117 is disposed on the fan baseplate 1172. In this example, the center hole 1173 of the fan 117 is disposed at a geometric center of the fan baseplate 1172. The fan blades 1171 are disposed on a side of the fan baseplate 1172 along a circumferential direction of the fan baseplate 1172. Specifically, the fan blades 1171 are disposed at least partially on a front end surface of the fan baseplate 1172, and a rear side of the fan baseplate 1172 faces the first bearing 113. The fan blades 1171 each rotate around the drive shaft 111 about the first axis 101. The first bearing 113 at least partially overlaps with the fan 117 along a direction of the first axis 101. That is to say, a straight line perpendicular to the first axis 101 at least exists, which penetrates through both the first bearing 113 and the fan 117. Specifically, the fan baseplate 1172 is formed with a groove 1174 around the center hole 1173 of the fan 117, and the first bearing 113 is at least partially disposed in the groove 1174. The fan 117 at least partially overlaps with the electric motor 11 along the direction of the first axis 101. In this manner, the impact tool has a more compact structure along the direction of the first axis 101 and a length of the impact tool in the front and rear direction is reduced. Specifically, a length from an outer sidewall 156 at the rear end of the housing to a front end of the impact tool is reduced. According to the dimension specification of the relevant known first bearing, the length in the front and rear direction may be reduced by at least 6 mm.

Figure 7:
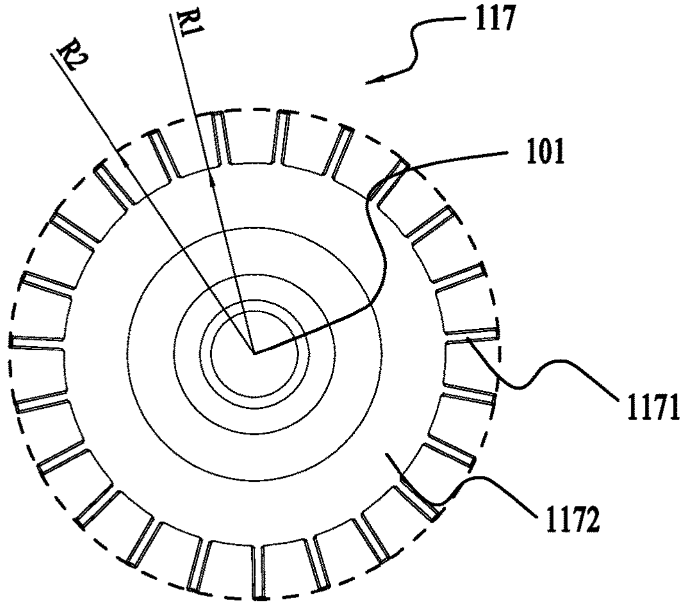
FIG. 7 is a structural view of a fan of the first example in FIG. 1.

As shown in FIG. 7, in this example, the fan baseplate 1172 covers part of the fan blades 1171 along a direction perpendicular to the first axis 101. Specifically, in a length direction of the fan blade 1171, the fan baseplate 1172 semi-covers the fan blade 1171, all the fan blades 1171 form a circular or circular-like outer contour, and an edge contour forming a circumference of the fan baseplate 1172 is located within the outer contour formed by the fan blades. Along the direction of the first axis 101, with the first axis 101 as a center, in a second projection plane perpendicular to the first axis 101, a smallest circle containing the outer contour of the fan baseplate 1172 is drawn and has a radius of R1. With the first axis 101 as the center, in the second projection plane perpendicular to the first axis 101, a smallest circle containing the outer contour of the fan blades 1171 is drawn and has a radius of R2. R1<R2. In this example, edges of the fan blades 1171 of the fan 117 on a rear side of the fan blades 1171 are flush or basically flush (with "basically" in this context meaning within conventional manufacturing tolerances), with a rear end surface of the fan baseplate 1172. In this example, the structure of the fan 117 in which the fan baseplate 1172 partially covers the fan blades 1171 and the fan baseplate 1172 is embedded with the fan blades 1171 is adopted so that front-to-rear dimensions of the fan blades 1171 along the direction of the first axis are ensured. At the same time, a front-to-rear plate thickness of the fan baseplate 1172 along the direction of the first axis is reduced. In this example, a front-to-rear dimension of the fan blade 1171 along the direction of the first axis is a height of the fan blade 1171. In this example, the height of the fan blade 1171 is 2.5 mm. A front-to-rear length of the fan 117 along the direction of the first axis is shorter and may be reduced by at least 1.2 mm along the direction of the first axis according to the dimension specification of the existing fan baseplate 1172.

Figure 3:
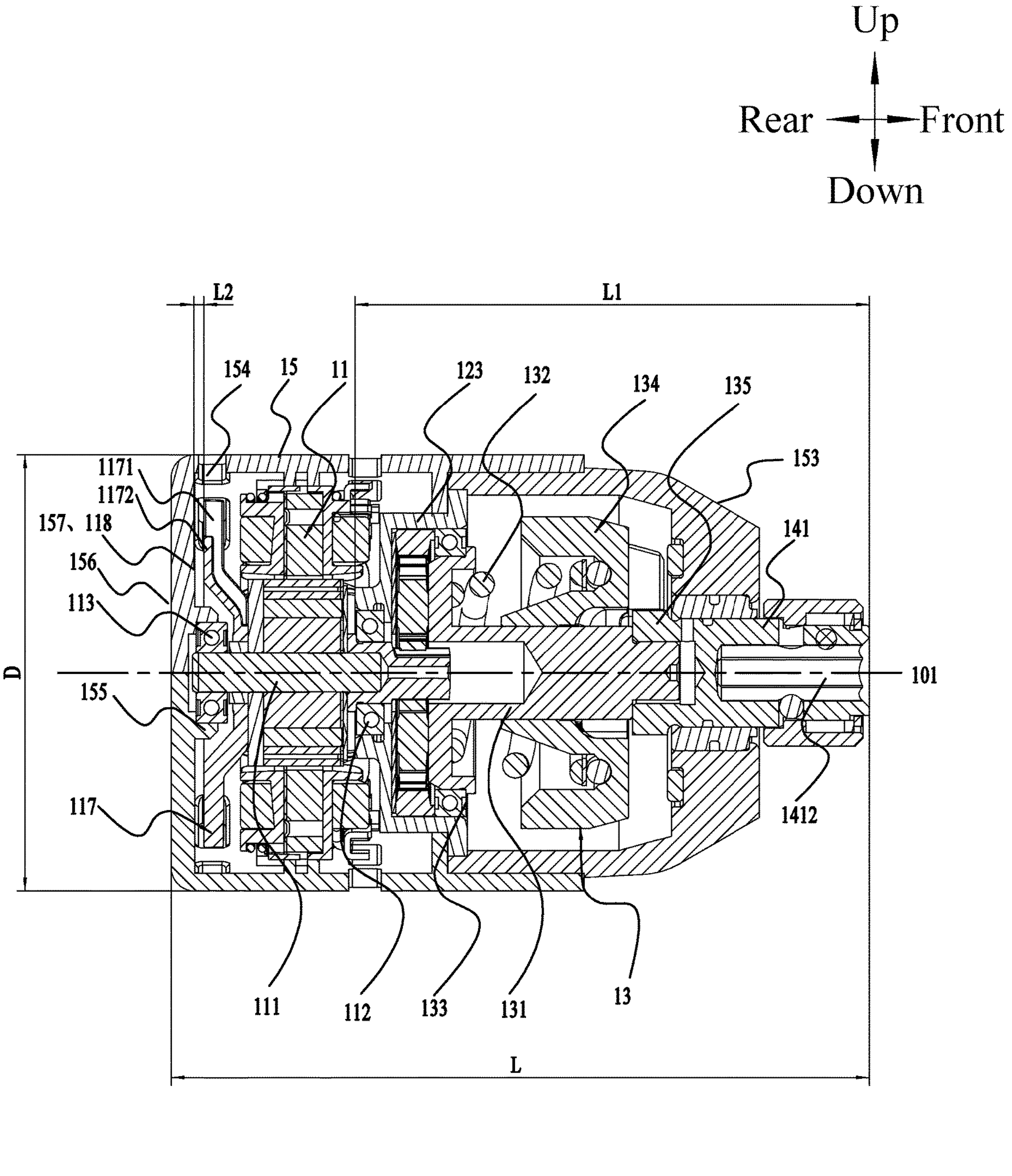
FIG. 3 is a partial sectional view of the first example in FIG. 1.
Figure 4:
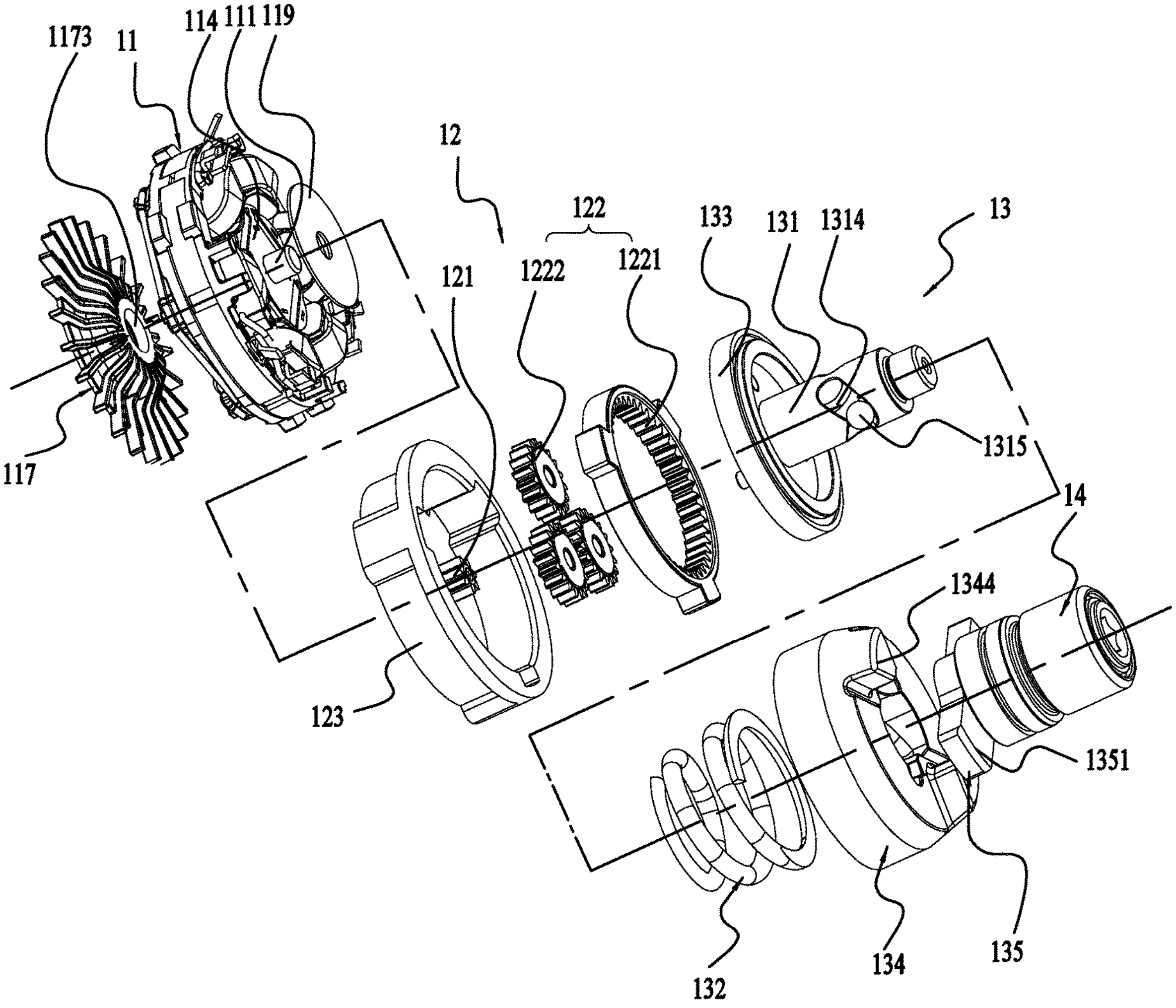
FIG. 4 is a partial exploded view of the first example in FIG. 3 with a housing and a hammer housing removed.
Figure 5:
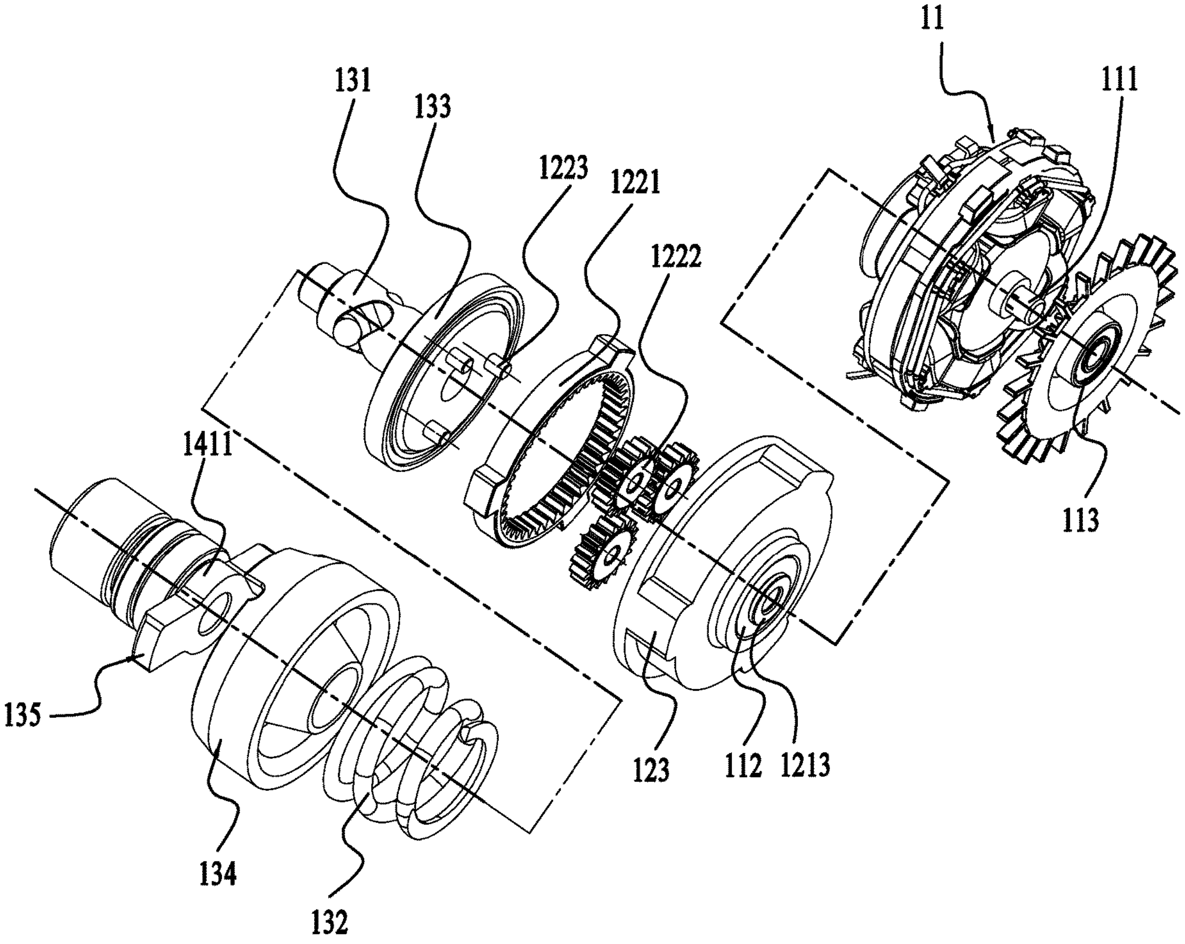
FIG. 5 is a view of FIG. 4 from another perspective.
Figure 6:
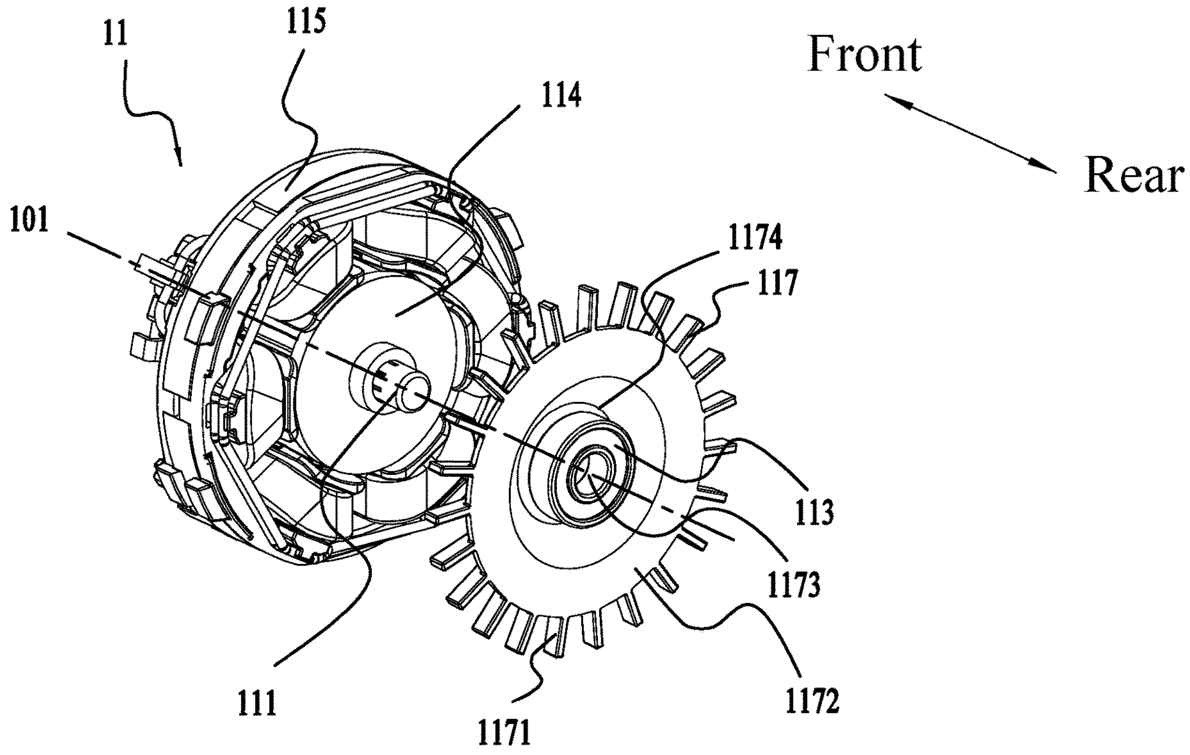
FIG. 6 is a partial exploded view of an electric motor of the first example in FIG. 5, which is used for illustrating a fan of the electric motor.

In this example, the fan 117 is a centrifugal fan. Specifically, the fan 117 is a centrifugal fan in which the fan baseplate 1172 partially covers the fan blades 1171. It is found that when the structure of the fan in which the fan baseplate 1172 partially covers the fan blades 1171 and the fan baseplate 1172 is embedded in the fan blades 1171 along the first axis is adopted, the amount of air generated by the rotation of the centrifugal fan is small, deteriorating the heat dissipation performance of the electric motor 11. However, although the amount of air of the fan is increased and the heat dissipation performance is improved in the manners of increasing a diameter of the fan and increasing the height of the fan blade, the overall volume of the impact tool is increased, which does not satisfy the requirements for miniaturization of the product. After research and experimentation, the applicant has found that, as shown in FIG. 3, an auxiliary windshield surface 118 is provided on a side of the fan baseplate 1172 facing away from the fan blades 1171 and a gap distance L2 between the fan 117 and the auxiliary windshield surface 118 is adjusted so that the amount of air flow in the electric motor, which is generated by the rotation of the centrifugal fan, can be changed, thereby improving the heat dissipation performance of the electric motor. The heat dissipation hole 154 is opened at a side of a plane where the auxiliary windshield surface 118 is located facing the fan. In this example, the heat dissipation hole 154 is opened at a front side of the auxiliary windshield surface 118.

In this example, to miniaturize the product, the auxiliary windshield surface 118 is disposed on the inner sidewall 157 at the rear end of the housing, the auxiliary windshield surface 118 is perpendicular to the first axis 101, and the heat dissipation hole 154 is opened on a front side of the inner sidewall 157 at the rear end of the housing. A vertical distance L2 between the auxiliary windshield surface 118 and an end surface of the fan 117 facing the housing is configured to be greater than or equal to 0.9 mm and less than or equal to 1.2 mm. In this example, L2 denotes a vertical distance between a rear end surface of the fan 117 and the inner sidewall 157 at the rear end of the housing.

Specifically, in conjunction with Table 1, sample 1 is a power tool with a fan of the related art, where a air gap flow of the electric motor is an air flow between a rotor 114 of the electric motor and a stator 115 of the electric motor. Specifically, the fan in the related art is a centrifugal fan in which the fan baseplate completely covers the fan blades, the height of the fan blade 1171 is 2.5 mm, and R2=R1=22.4 mm. Since the fan baseplate completely covers the fan blades, the fan in the related art has no auxiliary windshield surface. Samples 2 to 9 are power tools with the fan whose the fan baseplate partially covers the fan blades, where the height of the fan blade 1171 is 2.5 mm, R2=22.4 mm, and R1=17.5 mm. According to the manufacturing controllable tolerance, the vertical distance L2 between the rear end surface of the fan 117 and the auxiliary windshield surface 118 is separately adjusted to be 0.6 mm, 0.8 mm, 1.0 mm, 1.1 mm, 1.2 mm, 1.5 mm, 1.8 mm, and 2.0 mm. When rotational speeds of the electric motors are the same and rotational speeds of the fans 117 driven by the electric motors are the same, the air gap flows of the electric motors are recorded within the same time.

TABLE 1

| Sample | L2 mm | Air Gap Flow Kg/s |
|---|---|---|
| 1 | Fan in the related art | 0.002891 |
| 2 | 0.6 mm | 0.002424 |
| 3 | 0.8 mm | 0.002447 |
| 4 | 1.0 mm | 0.002477 |
| 5 | 1.1 mm | 0.00248 |
| 6 | 1.2 mm | 0.00247 |
| 7 | 1.5 mm | 0.002413 |
| 8 | 1.8 mm | 0.002387 |
| 9 | 2.0 mm | 0.002351 |

When L2 is 0.6 mm to 1.0 mm, as the gap distance increases, the air gap flow increases correspondingly. When L2 is 1.0 mm to 1.1 mm, as the gap distance increases, the air gap flow increases correspondingly. When L2 is 1.1 mm to 1.2 mm, the air gap flow begins to decrease as L2 increases. When L2 is 1.2 mm to 2.0 mm, as the gap distance increases, the air gap flow decreases continuously. It can be seen that the relationship between the gap between the auxiliary windshield surface 118 and the rear end surface of the fan 117 and the air gap flow is not a pure positive correlation or negative correlation, and the gap needs to be adjusted within a suitable distance range, so as to ensure the heat dissipation efficiency of the electric motor. However, in the related art, a function of an inner sidewall of a housing in an impact tool or a power tool is to support, fix, or accommodate a component. A gap exists between the inner sidewall and the rear end surface of the fan 117, so as to comply with the tolerance level of design or assembly. In this case, the inner sidewall of the housing or another plane cannot be construed as or does not belong to the auxiliary windshield surface.

In the present application, the applicant has found through research that when the distance range is greater than or equal to 0.9 mm and less than or equal to 1.2 mm, a plane is provided so that it can be ensured that the amount of air of the fan for the heat dissipation of the electric motor still satisfies the heat dissipation requirement of the electric motor in the case where a length of the fan 117 in the front and rear direction is shorter than that of the existing fan 117. In this case, a plane provided according to design requirements and within the distance range is the auxiliary windshield surface. In this case, in the case where the length of the fan 117 in the front and rear direction is 40% shorter than that of the existing fan 117, the amount of air of the fan 117 in this example can still reach 85% of the amount of air of the existing fan, and when L2=1.1 mm, the amount of air of the fan 117 in this example can still reach 86% of the amount of air of the existing fan.

On the premise that the dimension of the fan 117 is not changed and the product miniaturization of the impact tool 1 is not affected, after research and experimentation, the applicant has found that a length of the fan baseplate 1172 covering the fan blades 1171 is adjusted so that the effect of ensuring the amount of heat dissipation air can also be achieved. In conjunction with Table 2, sample 1 is a power tool with a fan of the related art. Specifically, the fan in the related art is the centrifugal fan in which the fan baseplate completely covers the fan blades, where the radius R2 of the fan blade is 22.4 mm, the fan baseplate completely covers the fan blades, and the fan baseplate is not embedded with the fan blades, that is to say, the fan blades are completely disposed on a front side of the fan baseplate, and the height of the fan blade is 2.5 mm. Samples 2 to 10 are power tools with the fan whose the fan baseplate partially covers the fan blades, the fan baseplate is embedded with the fan blades, and the edges of the fan blades 1171 on the rear side of the fan blades 1171 are flush with the rear end surface of the fan baseplate 1172. Specifically, R2=22.4 mm, L2=1.1 mm, and the height of the fan blade is 2.5 mm; the radius R1 of the used fan baseplate 1172 is 11.5 mm, 12.5 mm, 13.5 mm, 14.5 mm, 15.5 mm, 16.5 mm, 17.5 mm, 18.5 mm, and 19.5 mm separately. When the rotational speeds of the electric motors are the same and the rotational speeds of the fans 117 driven by the electric motors are the same, the air gap flows of the electric motors are recorded within the same time.

TABLE 2

| Sampler | R2: Radius of the Fan Blade mm | R1: Radius of the Fan Baseplate mm | Air Gap Flow Kg/s |
|---|---|---|---|
| 1 | Fan in the related art | | 0.002891 |
| 2 | 22.4 | 19.5 | 0.00233 |
| 3 | 22.4 | 18.5 | 0.002415 |
| 4 | 22.4 | 17.5 | 0.00248 |
| 5 | 22.4 | 16.5 | 0.002514 |
| 6 | 22.4 | 15.5 | 0.002531 |
| 7 | 22.4 | 14.5 | 0.002533 |
| 8 | 22.4 | 13.5 | 0.002514 |
| 9 | 22.4 | 12.5 | 0.002495 |
| 10 | 22.4 | 11.5 | 0.002505 |

It can be seen that when R1 is 11.5 mm to 12.5 mm, the air gap flow decreases as R1 increases; when R1 is 12.5 mm to 14.5 mm, the air gap flow increases as R1 increases; and when R1 is 14.5 mm to 19.5 mm, the air gap flow decreases as R1 increases. It can be seen that the relationship between the radius R1 of the fan and the air gap flow is not a pure positive correlation or negative correlation, and R1 needs to be adjusted within a suitable distance range, so as to ensure the heat dissipation efficiency of the electric motor. At the same time, to ensure the structural strength of the fan 117, when the radius R1 of the fan is greater than or equal to 11.5 mm and less than or equal to 17.5 mm, the air gap flow of the electric motor is greater than or equal to 85% of the air gap flow of the electric motor in the related art, which can satisfy the actual requirements of the impact tool. That is to say, the relationship between the radius R1 of R2 is that R1<R2 and 4.1:8≤R1:R2≤6.3:8. Preferably, R1:R2=5:8. In this case, L2=1.1 mm, and the air gap flow reaches 88% of the air gap flow in the related art.

It is to be understood that the specific structures of the fan 117, the auxiliary windshield surface 118, and the electric motor 11 and the positional relationship and the connection manner between the fan 117, the auxiliary windshield surface 118, and the electric motor 11 in this example may be applied to other power tools, for example, hand-held power tools such as an electric drill, an impact drill, an electric screwdriver, a grinding power tool (a sander, a flat sander, or an angle grinder), a reciprocating saw, and a multifunctional tool and outdoor power tools such as a grass trimmer, a lawn mower, a pruner, and an electric saw. In an application working condition in which a miniaturized product is required, the specific structures of the fan 117, the auxiliary windshield surface 118, and the electric motor 11 and the positional relationship and the connection manner between the fan 117, the auxiliary windshield surface 118, and the electric motor 11 in this example may be used, and the technical inspiration of such use and substitutions is provided in the present application.

As shown in FIGS. 1 to 11, the rotor 114 of the electric motor 11 is coaxially sleeved in the stator 115, that is to say, the electric motor 11 is an inrunner. The rotor 114 further includes a rotor body 1141 disposed inside the stator 115 and multiple permanent magnets 116. The permanent magnets 116 are accommodated in corresponding magnet accommodating grooves 1142 formed on the rotor body 1141. The magnet accommodating groove 1142 and the permanent magnet 116 have basically the same contour and extend basically along the direction of the first axis 101.

The stator 115 includes a stator core 1151 and stator windings 1152 wound on the stator core, where the stator core 1151 is provided with a through hole 1153 and the rotor 114 is disposed inside the stator core 1151. When energized, the stator windings 1152 generate a magnetic field that interacts with the permanent magnets 116 in the rotor 114 to cause the rotor 114 to rotate relative to the stator 115.

Figure 8:
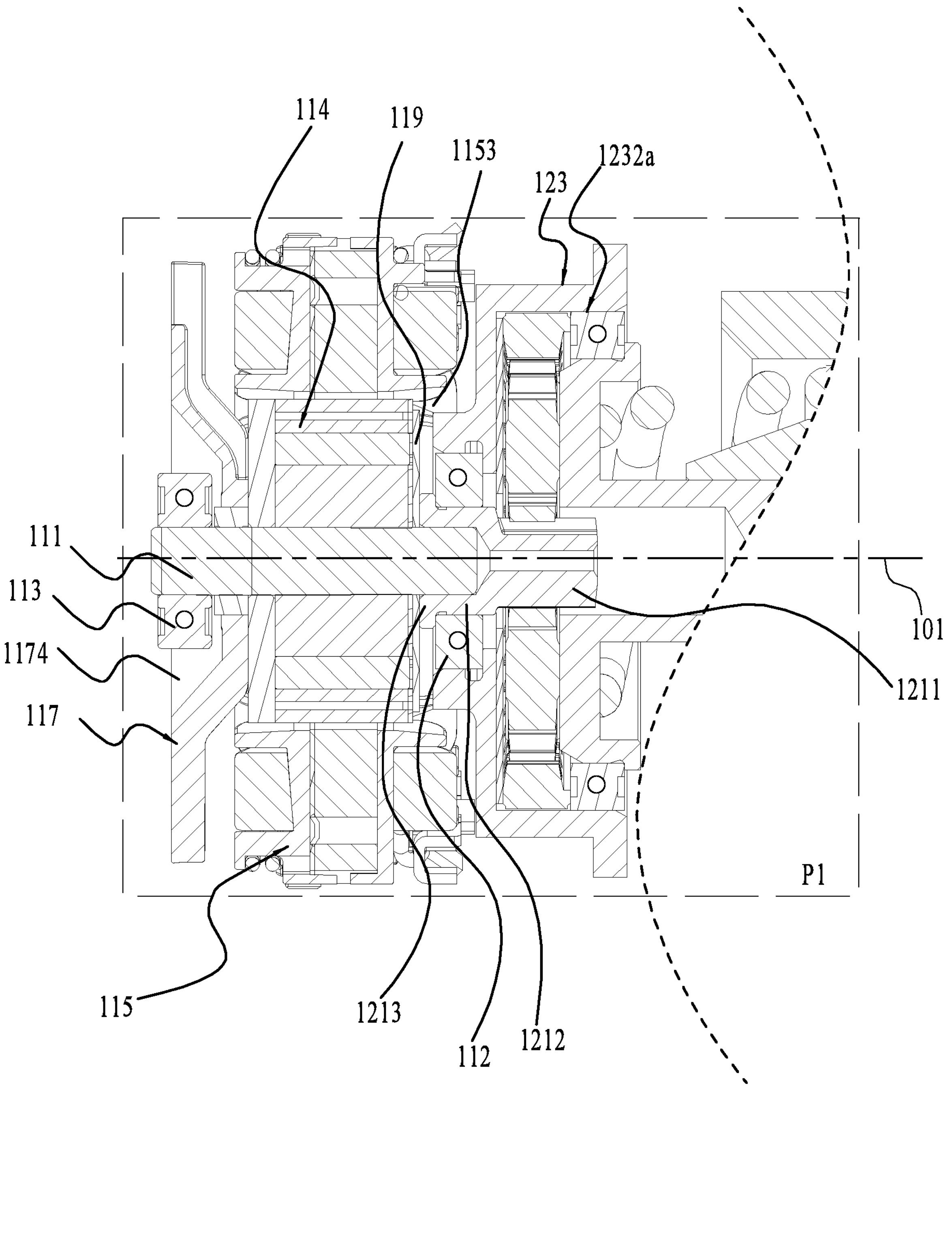
FIG. 8 is a partial view of FIG. 3 with a housing removed.
Figure 9:
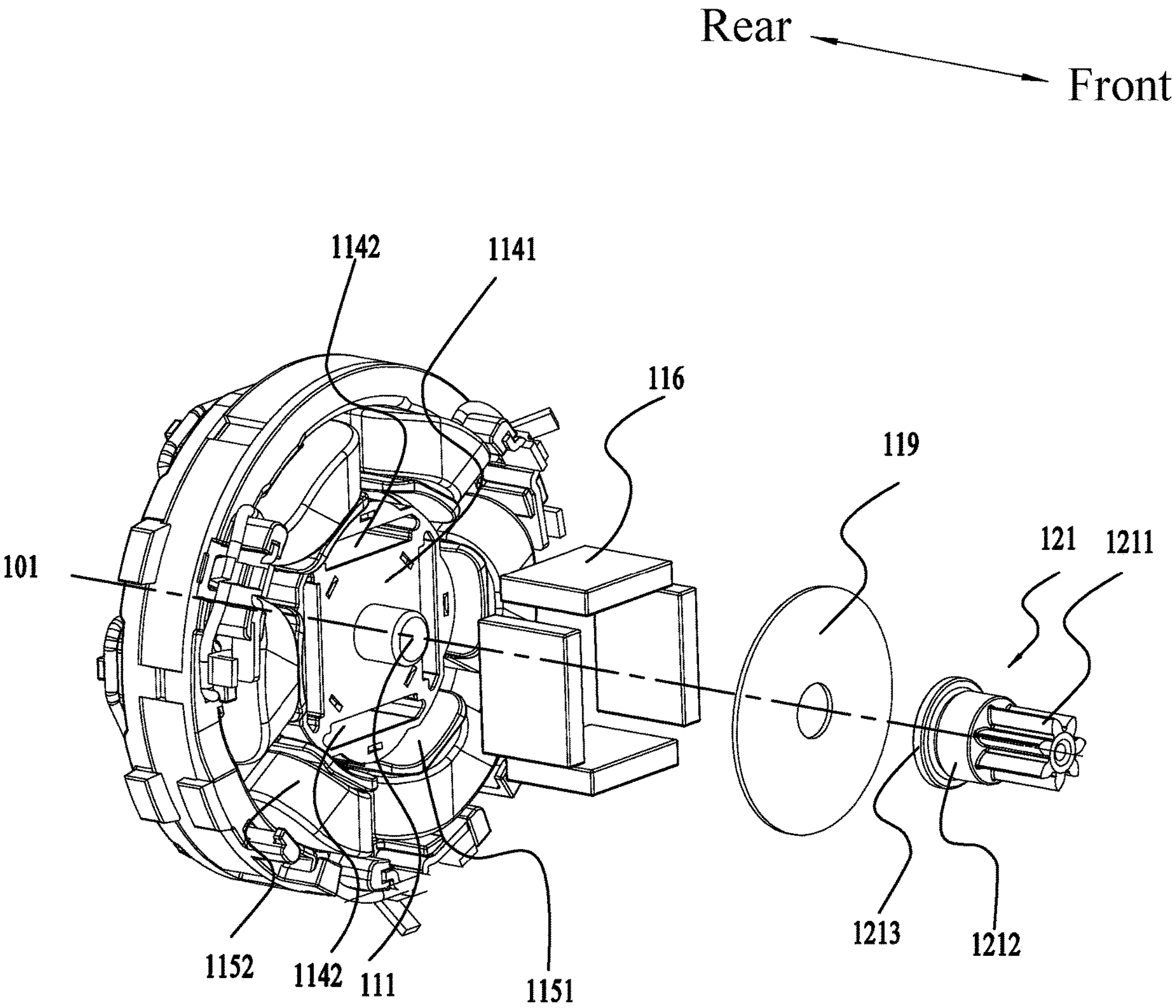
FIG. 9 is a partial exploded view of an electric motor and a sun gear of the first example in FIG. 4.
Figure 10:
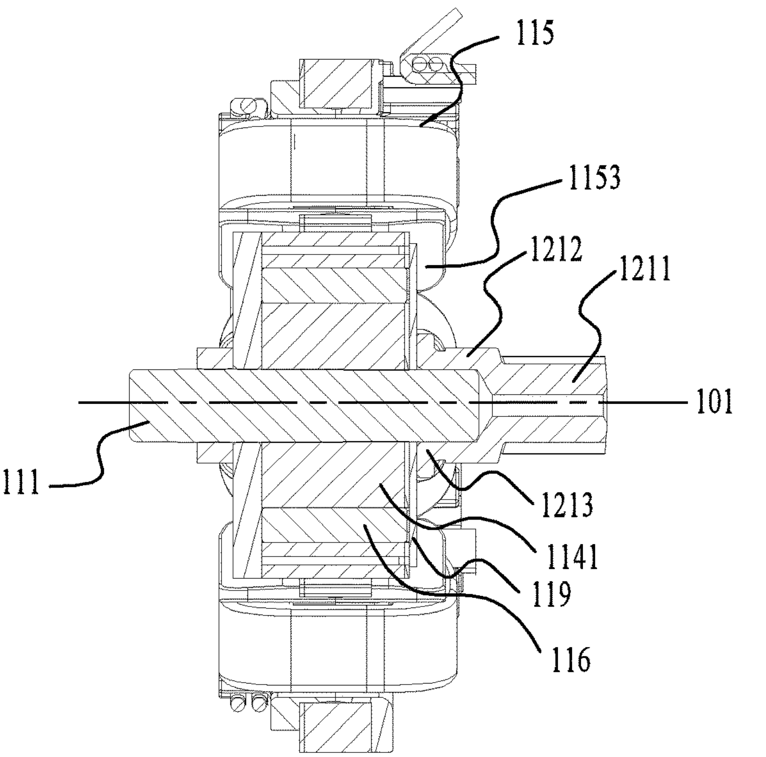
FIG. 10 is a sectional view of FIG. 9 after assembly.
Figure 11:
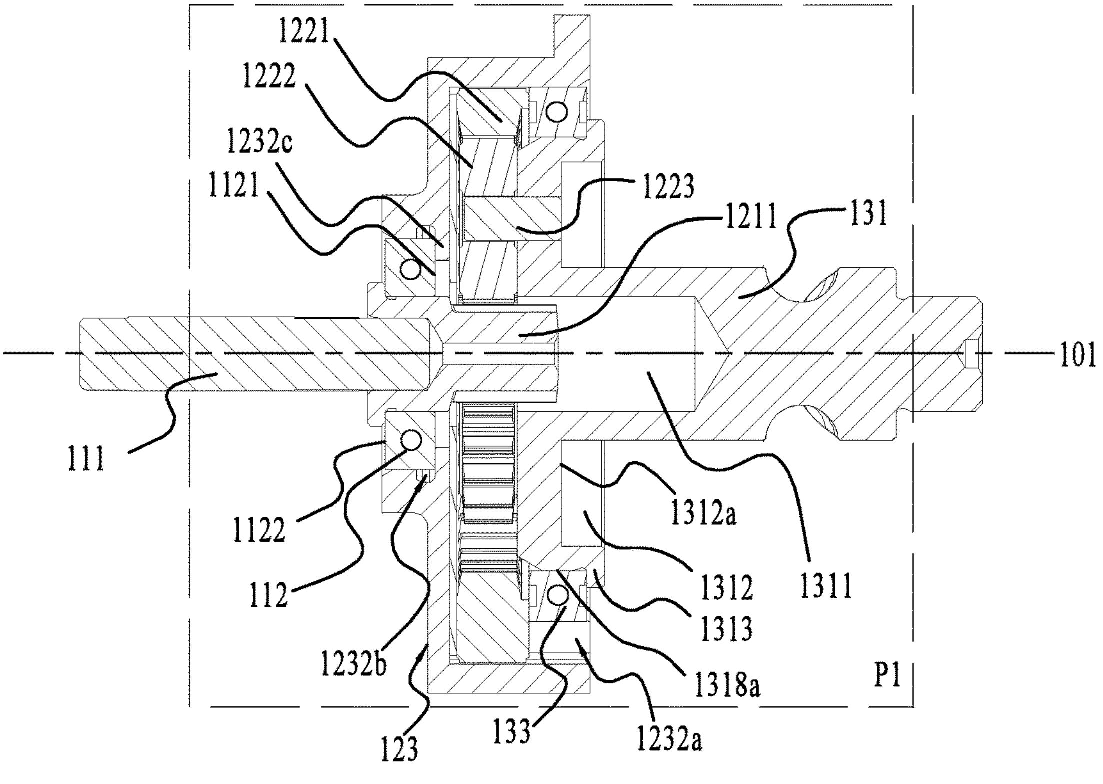
FIG. 11 is a partial view of FIG. 3, which is used for illustrating a drive shaft, a front bearing of an electric motor, a transmission assembly, a main shaft, and a main shaft bearing of an impact tool.

As shown in FIG. 8, the drive shaft 111 penetrates through the rotor 114, and two ends of the drive shaft 111 both exceed end surfaces of the rotor 114. A part of a front end of the drive shaft 111 that exceeds a front end surface of the rotor 114 is supported by a second bearing 112. A part of the rear end of the drive shaft 111 that exceeds a rear end surface of the rotor 114 is connected to the fan 117 and supported by the first bearing 113 which is positioned by the housing structure. The second bearing 112 at least partially overlaps with the electric motor 11 along the direction of the first axis 101. In this example, the second bearing 112 at least partially overlaps with the stator 115 along the direction of the first axis 101. That is to say, a straight line perpendicular to the first axis 101 at least exists, which penetrates through both the second bearing 112 and the stator 115. Specifically, the second bearing 112 is at least partially disposed in the through hole 1153 of the stator core 1151.

As shown in FIGS. 8 to 11, the part of the front end of the drive shaft 111 that exceeds the front end surface of the rotor 114 is connected to the transmission assembly. The transmission assembly includes a gearbox housing 123, a sun gear 121 at least partially disposed within the gearbox housing 123, and a planetary gearset 122 that rotates in mesh with the sun gear 121. In this example, the gearbox housing 123 is separately formed with a first accommodating space **1232*a* disposed at a front end of the gearbox housing 123 and a second accommodating space 1232*b* disposed at a rear end of the gearbox housing 123. Part of a main shaft 131 is disposed in the first accommodating space 1232*a*. The second bearing 112 is disposed in the second accommodating space 1232*b*. Specifically, an outer race of the second bearing 112 abuts against an inner wall of the second accommodating space 1232*b*, and an inner race of the second bearing 112 abuts against the drive shaft 111, thereby circumferentially limiting the drive shaft 111. A first protrusion 1232*c* extending along the direction perpendicular to the first axis 101 is disposed in the second accommodating space 1232*b*, and the first protrusion 1232*c* extends inwards along a circumferential direction of the second accommodating space 1232*b*. The first protrusion 1232*c* may continuously form a complete flange along the circumferential direction of the second accommodating space 1232*b*, or multiple first protrusions 1232*c* may be arranged at intervals along the circumferential direction of the second accommodating space 1232*b*. A rear end surface of the first protrusion 1232*c* abuts against a front end surface 1121 of the second bearing 112. The gearbox housing 123 at least partially overlaps with the electric motor 11 along the direction of the first axis 101. In this example, the gearbox housing 123 at least partially overlaps with the stator 115 along the direction of the first axis 101. That is to say, a straight line perpendicular to the first axis 101 at least exists, which penetrates through both the gearbox housing 123 and the stator 115. Specifically, the second accommodating space 1232*b* is at least partially disposed in the through hole 1153 of the stator core 1151**.

The sun gear 121 is connected to the front end of the drive shaft 111 and rotates coaxially with the drive shaft 111. The second bearing 112 is sleeved on the sun gear 121. The sun gear 121 includes an engaging tooth portion 1211 disposed at a front end of the sun gear 121 and used for transmitting power to the planetary gearset 122. The sun gear 121 further includes a shoulder 1212 disposed at a rear end of the engaging tooth portion 1211 and used for the second bearing 112 to be sleeved on and a second protrusion 1213 disposed at a rear end of the shoulder 1212, where the second protrusion 1213 is connected to the rear end of the shoulder 1212 and extends radially outwards. The second protrusion 1213 and the shoulder 1212 form an L-shaped groove into which the second bearing 112 is mounted, that is to say, a rear end surface 1122 of the second bearing 112 abuts against a front end surface of the second protrusion 1213. The second bearing 112 is axially positioned through the first protrusion **1232*c* and the second protrusion 1213. The shoulder 1212 of the sun gear 121 is at least partially disposed in the through hole 1153 of the stator core 1151**.

The second bearing 112 is positioned axially by using the first protrusion **1232*c* in the gearbox housing and the second protrusion 1213 on the sun gear. At the same time, projections of the second bearing 112, the gearbox housing 123, and the stator 115 on a reference plane P1 along the the first axis 101 along the direction perpendicular to the first axis 101** have an overlapping region, thereby reducing the length of the impact tool in the front and rear direction while an internal structure of the impact tool is simplified.

A retaining member 119 is disposed between the sun gear 121 and a front end of the rotor body 1141 and sleeved at the front end of the drive shaft 111. The retaining member 119 is clamped by a rear end surface of the sun gear 121 and a front end surface of the rotor body 1141. That is to say, an end of the retaining member 119 abuts against a rear end surface of the second protrusion 1213 on the sun gear 121, and the other end of the retaining member 119 abuts against the front end surface of the rotor body 1141. The retaining member 119 extends along a radial direction of the drive shaft 111 to retain the permanent magnets 116 in the corresponding magnet accommodating grooves 1142, and a diameter of the retaining member 119 is greater than or equal to a vertical distance between two magnet accommodating grooves 1142 disposed opposite to each other. Specifically, the retaining member 119 is an integral structure, and the retaining member 119 is engaged with the ends of the permanent magnets 116 so as to prevent the permanent magnets 116 from sliding out of the magnet accommodating grooves 1142 or from moving out of the magnet accommodating grooves 1142 along an axial direction of the drive shaft 111. In this example, the retaining member 119 includes an epoxy plate, where a front-to-rear dimension of the epoxy plate along the direction of the first axis 101 is 0.3 mm to 0.5 mm. In other alternative examples, the retaining member 119 includes multiple epoxy plates with the same diameter or multiple epoxy plates with different diameters, and a diameter of an end of the retaining member 119 that abuts against the rotor body 1141 is greater than or equal to the vertical distance between two magnet accommodating grooves 1142 disposed opposite to each other; and the front-to-rear dimension of the retaining member 119 along the direction of the first axis is greater than or equal to 0.3 mm and less than or equal to 1 mm.

The retaining member 119 is used instead of a rotor front end plate to prevent the permanent magnets from falling out of the rotor body so that not only is the length of the impact tool in the front and rear direction reduced, but also the installation process of the impact tool is simplified, the product structure is simplified, and the cost is saved. The retaining member is clamped by the sun gear and the rotor body so that the length of the impact tool in the front and rear direction is further reduced.

It is to be understood that the specific structures of the sun gear, the electric motor, and the retaining member and the positional relationship and the connection manner between the sun gear, the electric motor, and the retaining member in this example may be applied to other power tools, for example, hand-held power tools such as an electric drill, an impact drill, an electric screwdriver, a grinding power tool (a sander, a flat sander, or an angle grinder), a reciprocating saw, and a multifunctional tool and outdoor power tools such as a grass trimmer, a lawn mower, a pruner, and an electric saw. In an application working condition in which a miniaturized product is required, the specific structures of the sun gear, the electric motor, and the retaining member and the positional relationship and the connection manner between the sun gear, the electric motor, and the retaining member in this example may be used, and the technical inspiration of such use and substitutions is provided in the present application.

As shown in FIGS. 1 to 5 and FIGS. 11 to 18, the impact assembly 13 is used for providing an impact force. The impact assembly 13 includes the main shaft 131, an impact block 134 sleeved on an outer circumference of the main shaft 131, and a hammer anvil 135 disposed at a front end of the impact block 134. The hammer anvil 135 includes an anvil 1411 and the output shaft 141. The impact block 134 is driven by the main shaft 131. The anvil 1411 mates with and is struck by the impact block 134, and the anvil 1411 drives the output shaft 141 to rotate. The impact block 134 includes an impact block body 134*a* and first end teeth 1344 which are radially symmetrical and protrude from a front end surface 134*b* of the impact block body. Second end teeth 1351 are radially symmetrical and protrude from a rear end surface of the anvil 1411 opposite to the impact block 134. The output shaft 141 extends out of the hammer housing 153. The output shaft 141 is connected to the anvil 1411. It is to be understood that the anvil 1411 and the output shaft 141 may be integrally formed or separately formed as separate parts.

The main shaft 131 is formed with a first groove 1311 into which the engaging tooth portion 1211 of the sun gear 121 partially extends. Preferably, the first groove 1311 is circular. The main shaft 131 is formed with a first surface 1318*a* on a circumferential outer side of the main shaft 131. The first surface 1318*a* extends along the front and rear direction and is disposed in the first accommodating space 1232*a*.

The impact tool 1 further includes a main shaft bearing 133 for supporting the main shaft 131 and disposed in the first accommodating space 1232*a*. Specifically, an outer race of the main shaft bearing 133 abuts against an inner wall of the first accommodating space 1232*a*, and an inner race of the main shaft bearing 133 abuts against the first surface 1318*a*, thereby circumferentially limiting the main shaft 131. The main shaft 131 is formed with a flange 1313 perpendicular to the first axis 101 along the circumferential outer side of the main shaft 131, and a front end surface of the main shaft bearing 133 abuts against the flange 1313, thereby axially limiting the main shaft 131.

In this example, both the engaging tooth portion 1211 of the sun gear 121 and the planetary gearset 122 that rotates in mesh with the sun gear 121 are disposed in the first accommodating space 1232*a*. The number of engaging teeth of the planetary gearset 122 is greater than the number of teeth of the engaging tooth portion 1211 of the sun gear 121. The planetary gearset 122 includes an inner ring gear 1221 and multiple planet gears 1222 engaged with the inner ring gear 1221. The inner ring gear 1221 is engaged around the multiple planet gears 1222. The inner ring gear 1221 is connected to the gearbox housing 123, and a front end surface of the inner ring gear 1221 abuts against a rear end surface of the main shaft bearing 133. The planetary gearset 122 further includes multiple planet gear pins 1223. The planet gear 1222 is sleeved on the planet gear pin 1223. The planet gear pins 1223 are fixedly connected to the main shaft 131 to transmit the power outputted by the drive shaft 111 to the main shaft 131.

In this example, the planet gear pins 1223 are fixedly connected to the main shaft 131 in a cantilever beam manner. The planetary gearset 122 is provided with the multiple planet gears 1222, where each planet gear 1222 is sleeved at an end of the planet gear pin 1223 extending along the front and rear direction so that power on the planet gear 1222 is transmitted to the planet gear pin 1223. Specifically, the planet gear 1222 is rotatably connected to the planet gear pin 1223. The other end of the planet gear pin 1223 is fixedly disposed in the main shaft 131 so that the main shaft 131 can rotate simultaneously with the planet gear pin 1223.

As shown in FIGS. 1 to 5 and FIGS. 11 to 18, the impact assembly 13 further includes a resilient element. The impact block 134 is supported on the main shaft 131 and can reciprocally slide relative to the main shaft 131 in the front and rear direction. The resilient element provides a force for the impact block 134 to approach the hammer anvil 135. In the second projection plane perpendicular to the first axis 101, a projection of a rear end of the resilient element along the direction of the first axis 101 on the second projection plane is located within a projection of a front end of the resilient element along the direction of the first axis 101 on the second projection plane. That is to say, the front end of the resilient element has a greater dimension than the rear end of the resilient element. In this example, the resilient element is a spring 132 sleeved on an outer side of the main shaft. The spring 132 extends along the front and rear direction and connects the main shaft 131 to the impact block 134 to implement a buffering function during an impact process and reset the impact block 134. Further, the spring 132 is a conical coil spring, and an outer diameter of a rear end 132*a* of the spring 132 is less than an outer diameter of a front end 132*b* of the spring 132.

In other alternative examples, the resilient element is a non-circular spring as long as the resilient element satisfies that the projection of the rear end of the resilient element along the direction of the first axis 101 on the second projection plane is located within the projection of the front end of the resilient element along the direction of the first axis 101 on the second projection plane.

In this example, the main shaft 131 is further formed with a second groove 1312. Specifically, the second groove 1312 is annular and formed on a radial outer side of the first groove 1311. An opening direction of the second groove 1312 is opposite to an opening direction of the first groove 1311 in the front and rear direction and faces the impact block 134. Projections of the first groove 1311 and the second groove 1312 on the reference plane P1 along the first axis 101 along the direction perpendicular to the first axis 101 have an overlapping region. The rear end 132*a* of the spring 132 is disposed in the second groove 1312 and abuts against a bottom surface 1312*a* of the second groove 1312, thereby positioning the rear end 132*a* of the spring 132. The front end 132*b* of the spring 132 is fitted into a rear end of the impact block 134, an annular groove 1341 opened backwards is formed at the rear end of the impact block 134, the annular groove 1341 is coaxial with the impact block 134, and the front end 132*b* of the spring 132 is embedded in the annular groove 1341, thereby positioning the front end 132*b* of the spring 132. The annular groove 1341 includes an inner annular portion 1342 on an inner side of the spring 132 and an outer annular portion 1343 on an outer side of the spring 132. An outer diameter of the inner annular portion 1342 is less than an inner diameter of the second groove 1312, and an inner diameter of the outer annular portion 1343 is greater than an outer diameter of the second groove 1312.

An outer diameter of the front end 132*b* of the spring 132 is greater than an outer diameter of the rear end 132*a* of the spring 132. In this manner, a diameter of the second groove 1312 can be reduced, thereby reducing a diameter of the impact tool, that is, the outer circumferential diameter of the housing 15, by 1.0 to 4.0 mm.

Figure 12:
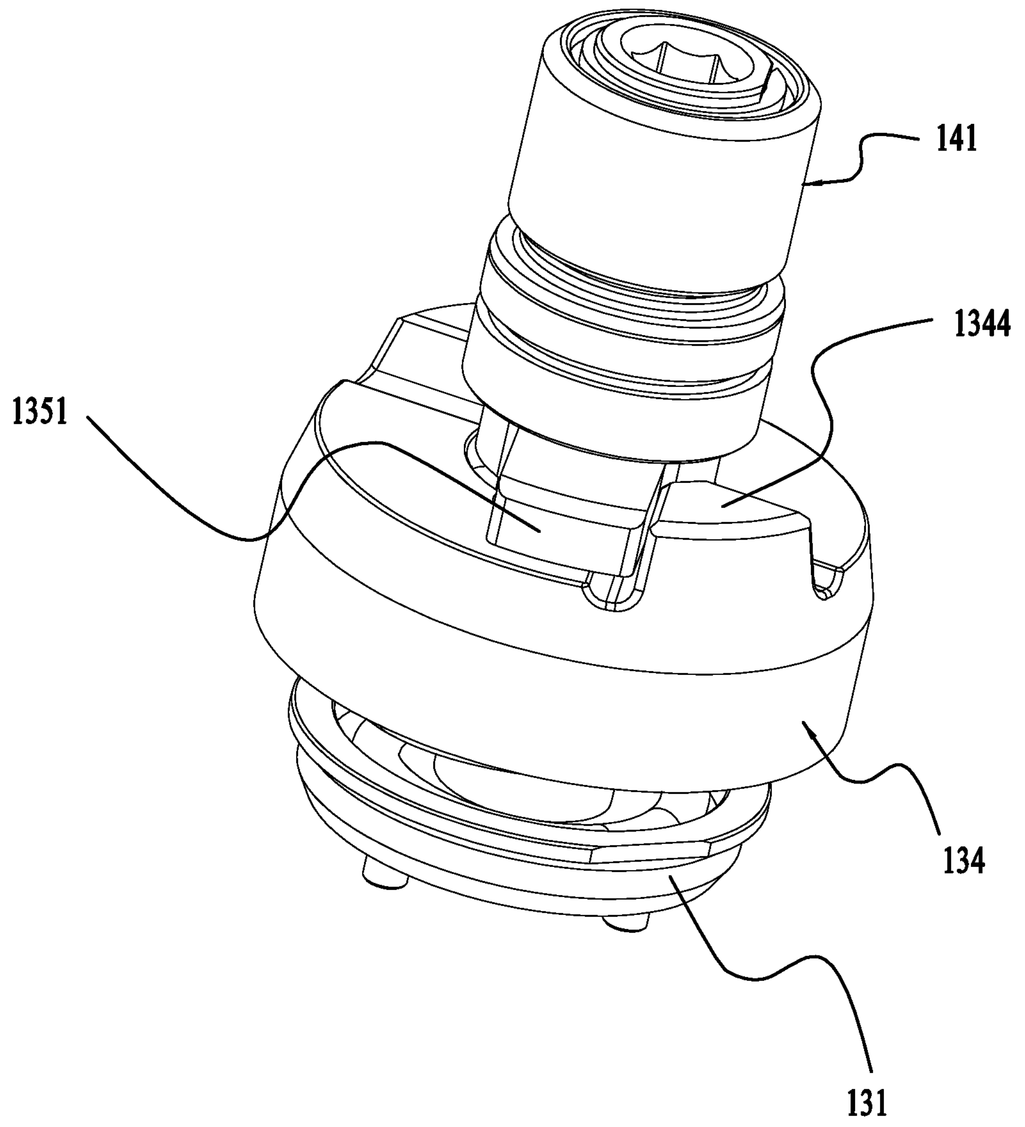
FIG. 12 is a schematic view of a second position of an impact block of the first example in FIG. 1.
Figure 13A:
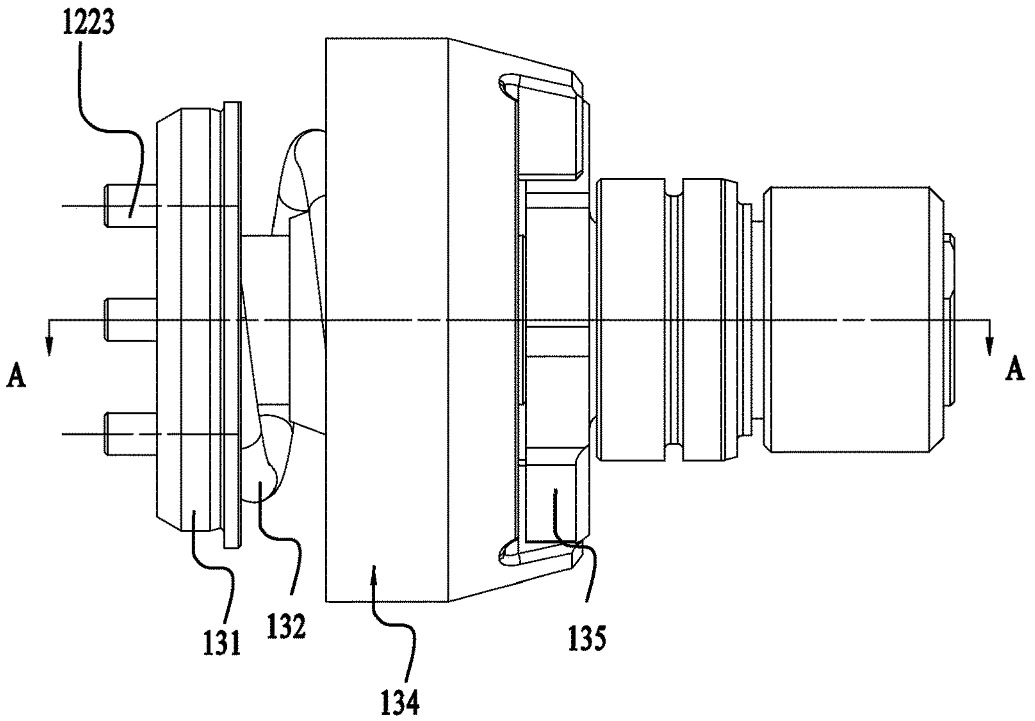
FIG. 13A is a plan view of FIG. 1 from another perspective.
Figure 13B:
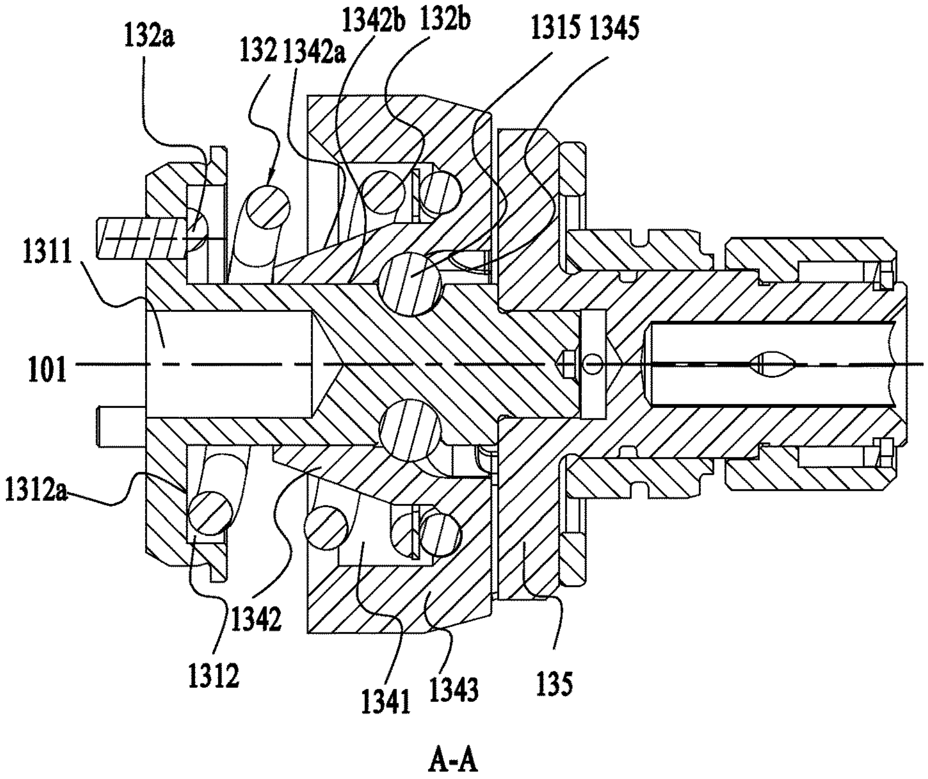
FIG. 13B is a sectional view of FIG. 13A taken along A-A.
Figure 14:
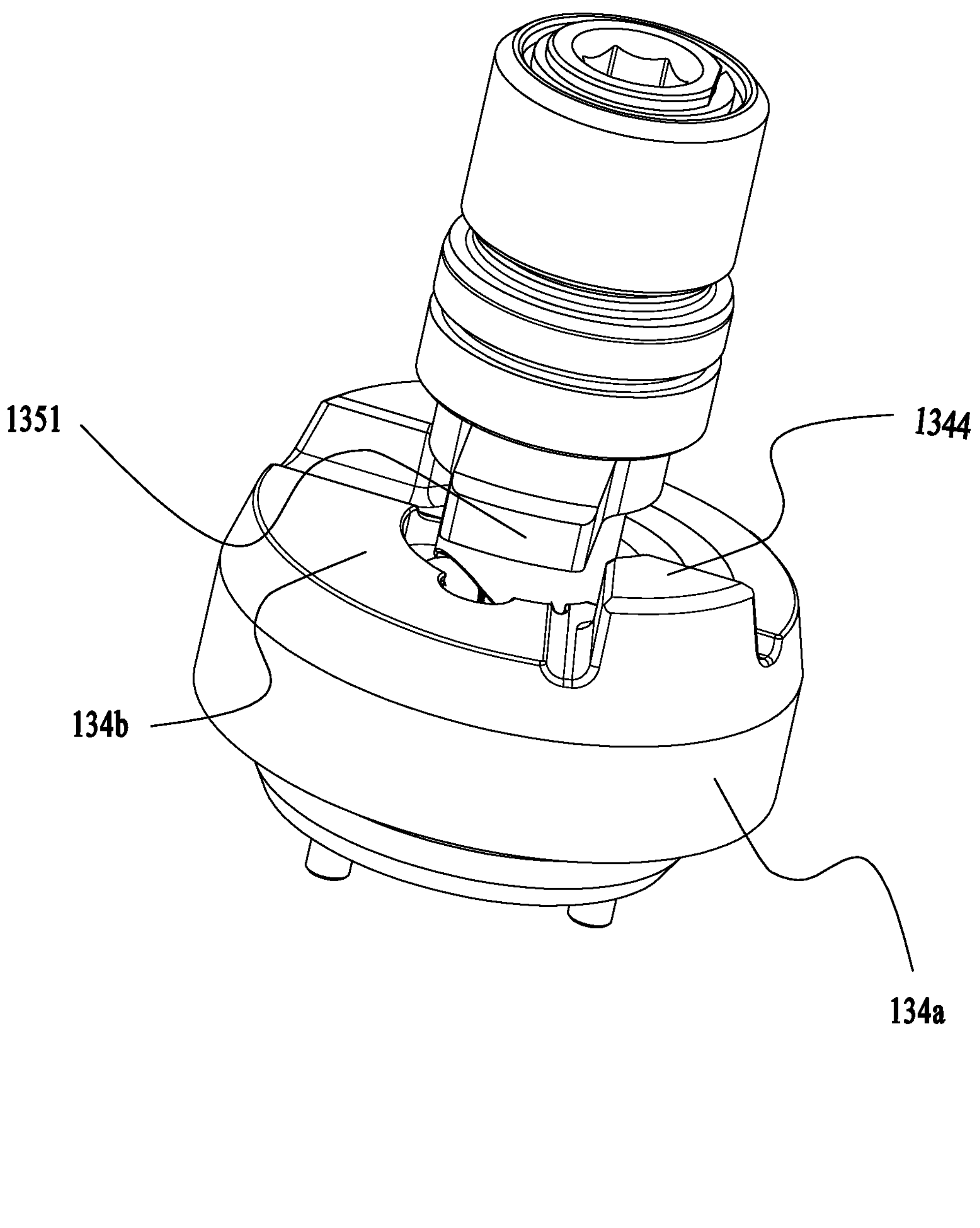
FIG. 14 is a schematic view of a first position of an impact block of the first example in FIG. 1.
Figure 15A:
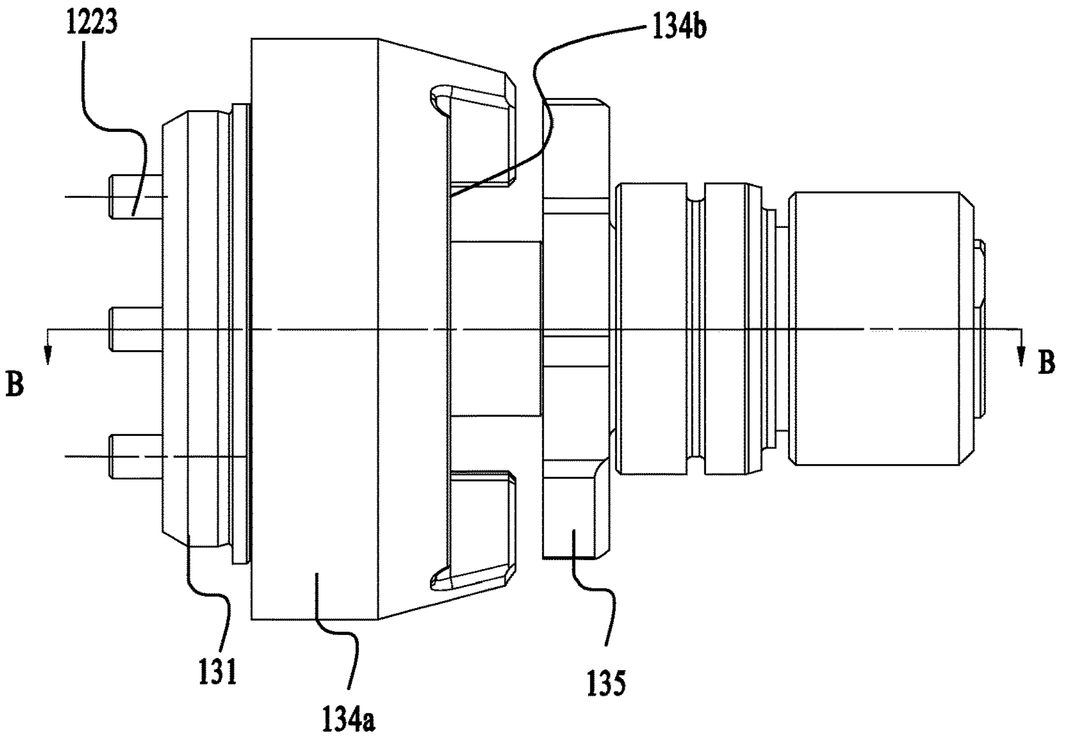
FIG. 15A is a plan view of FIG. 14 from another perspective.
Figure 15B:
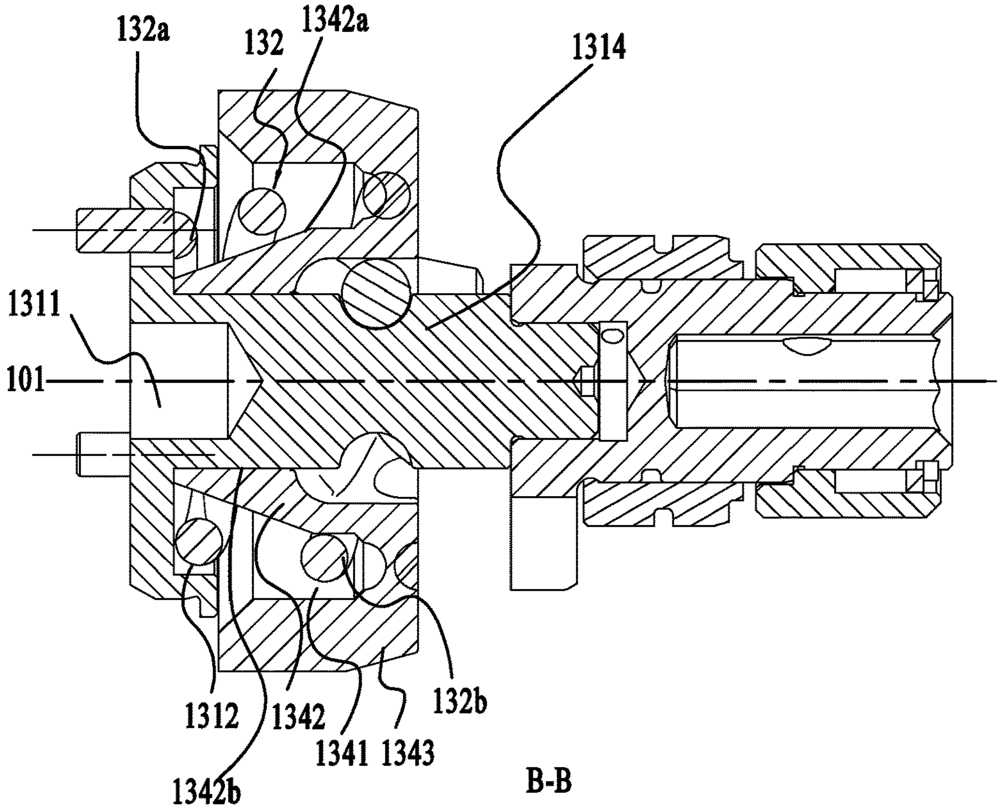
FIG. 15B is a sectional view of FIG. 15A taken along B-B.

In the working process of the impact tool 1, the impact block 134 reciprocates back and forth relative to the main shaft along a direction of an axis of the main shaft by a prescribed stroke while rotating integrally with the main shaft. In this example, the axis of the main shaft coincides with the first axis; and the impact block 134 includes a first position where the impact block 134 moves backwards to a distal-most end and a second position where the impact block 134 moves forwards to a distal-most end, where when the impact block 134 is at the second position, the first end teeth 1344 of the impact block 134 are engaged with the hammer anvil 135, that is, a front end of the stroke of the impact block 134 is stopped by the hammer anvil 135. FIGS. 14 to 15B show the first position and FIGS. 12 to 13B show the second position. The inner annular portion 1342 is always disposed on the inner side of the spring 132 during movement of the impact block 134 between the first position and the second position. When the impact block 134 is at the first position, in a first projection plane parallel to the first axis 101, a projection of the spring 132 along the direction perpendicular to the first axis 101 on the first projection plane is located within a projection of the impact block 134 along the direction perpendicular to the first axis 101 on the first projection plane.

In this example, the second groove 1312 is at least partially embedded in the annular groove 1341, and a rear end of the inner annular portion 1342 of the impact block 134 abuts against the bottom surface 1312*a* of the second groove 1312. Specifically, the inner annular portion 1342 includes an outer sidewall 1342*a* on a side of the spring 132 and an inner sidewall 1342*b* for the main shaft to penetrate through the impact block 134. The outer sidewall 1342*a* is tapered and an outer diameter of a rear end of the outer sidewall 1342*a* is less than an inner diameter of the rear end 132*a* of the spring 132, thereby ensuring that the inner annular portion 1342 is always located on the inner side of the spring 132 during the movement of the impact block 134 between the first position and the second position.

A pair of first ball grooves 1345 opened forwards and extending backwards along the front and rear direction are disposed on a front end surface of the impact block body 134*a*. A V-shaped second ball groove 1314 is disposed on an outer surface of the main shaft 131.

The impact assembly further includes a roller ball 1315, which spans the first ball grooves 1345 and the second ball groove 1314 such that the impact block 134 is connected to the main shaft 131. In this example, the roller ball 1315 is a steel ball.

When the main shaft 131 rotates, the movement of the roller ball 1315 in the second ball groove 1314 allows the impact block 134 to move relative to the main shaft 131 in the front and rear direction. Specifically, when the impact tool 1 is load-free or lightly loaded, the impact assembly 13 performs no impact and performs transmission, the impact block 134 is at the second position, and the rotation of the drive shaft 111 is transmitted to the main shaft 131 through the transmission assembly 12, thereby rotating the main shaft 131. Since the main shaft 131 rotates the impact block 134 by use of the roller ball 1315 and the first end teeth 1344 of the impact block 134 are engaged with the second end teeth 1351 of the anvil 1411 so that the hammer anvil 135 rotates, and the output shaft 141 and the working head mounted on the output shaft 141 rotate. When a load is applied to the impact tool 1, the rotation of the output shaft 141 is blocked, and the output shaft 141 cannot rotate with the main shaft 131 and may rotate at a lower rotational speed or completely stop rotating due to different magnitudes of the load. However, the main shaft 131 continues to rotate so that the roller ball 1315 at rear ends of the first ball grooves 1345 rolls backwards along the second ball groove 1314 of the main shaft 131, thereby driving the impact block 134 to displace backwards axially, that is, to move towards the first position of the impact block 134. At the same time, the impact block 134 presses the spring 132 until the impact block 134 is completely disengaged from the hammer anvil 135, and at this time, the impact block 134 is at the first position. The spring 132 rebounds along the axial direction to apply a force to the impact block 134, and the roller ball 1315 rolls along the second ball groove 1314 so that the roller ball 1315 advances while rotating. At this time, a relative rotational speed between the impact block 134 and the hammer anvil 135 is a rotational speed of the impact block 134. When the impact block 134 rotates to be in contact with the hammer anvil 135, an impact force is applied to the hammer anvil 135. Under the action of the impact force, the output shaft 141 continues to rotate by a certain angle against the load, and then the output shaft 141 stops rotating again. The preceding process is repeated so that the impact block 134 continually applies a rotary impact force to increase the output of an output force.

Figure 16:
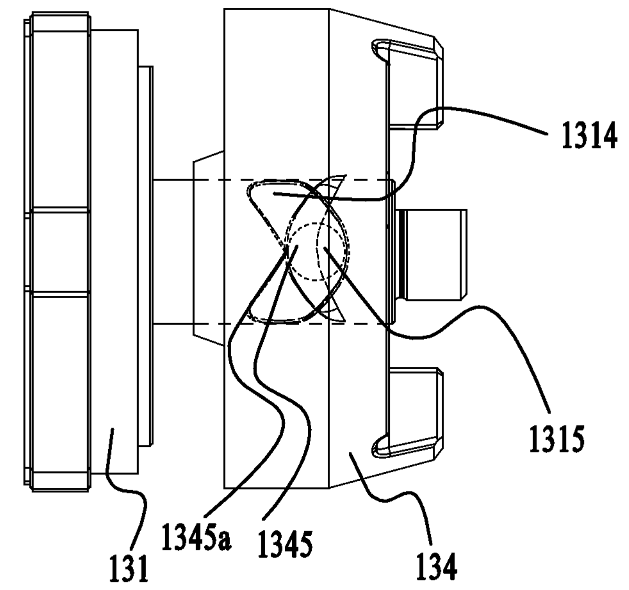
FIG. 16 is a partial perspective view of a main shaft and an impact block at a second position of the impact block of the first example in FIG. 1, which is used for illustrating a first ball groove, a second ball groove, and a roller ball.
Figure 17:
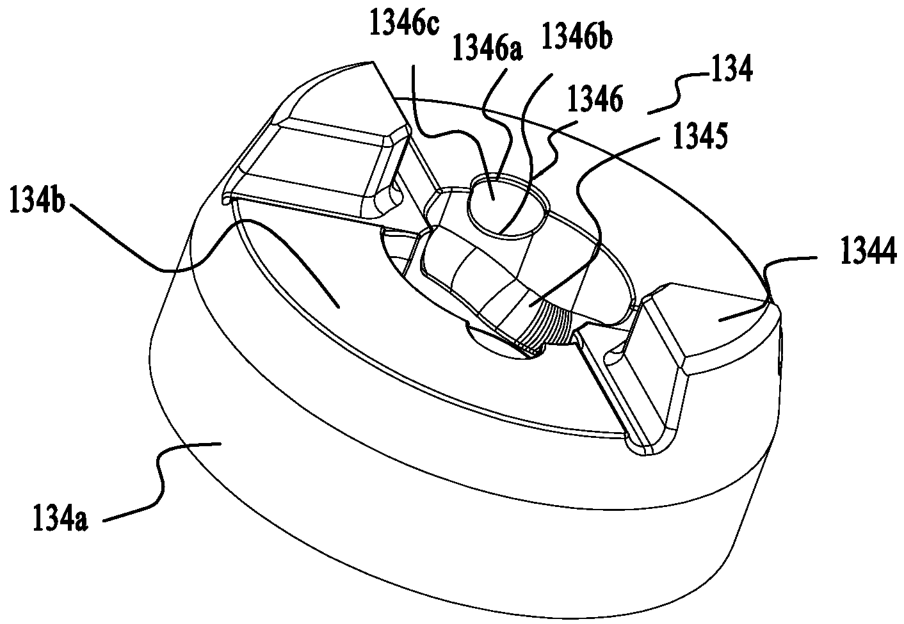
FIG. 17 is a structural view of an impact block of the first example in FIG. 1.
Figure 18:
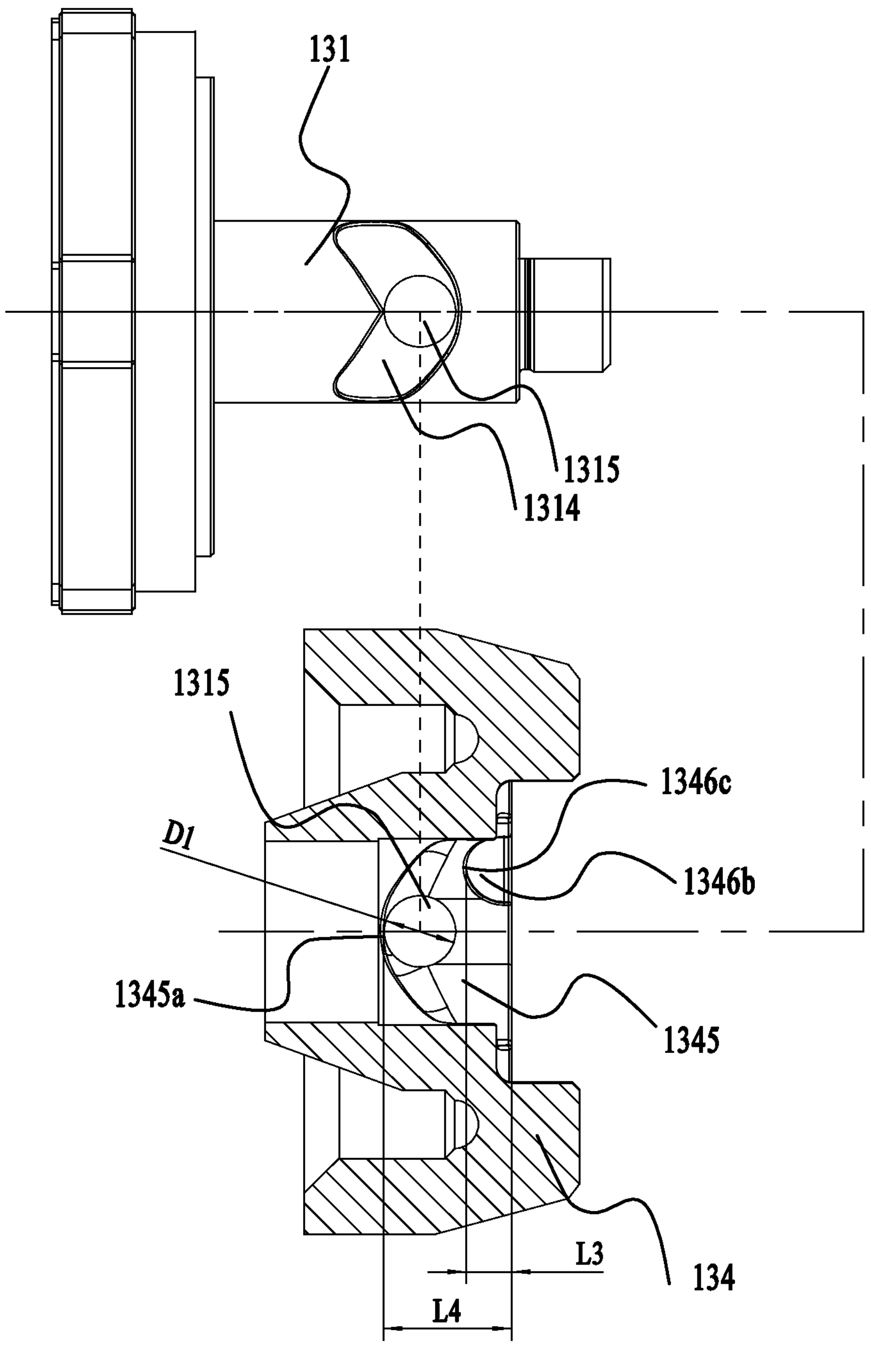
FIG. 18 is a partial sectional view of an exploded view of FIG. 16 with portion of a roller ball located in the first ball groove and another portion of the roller ball located in the second ball groove.
Figure 19:
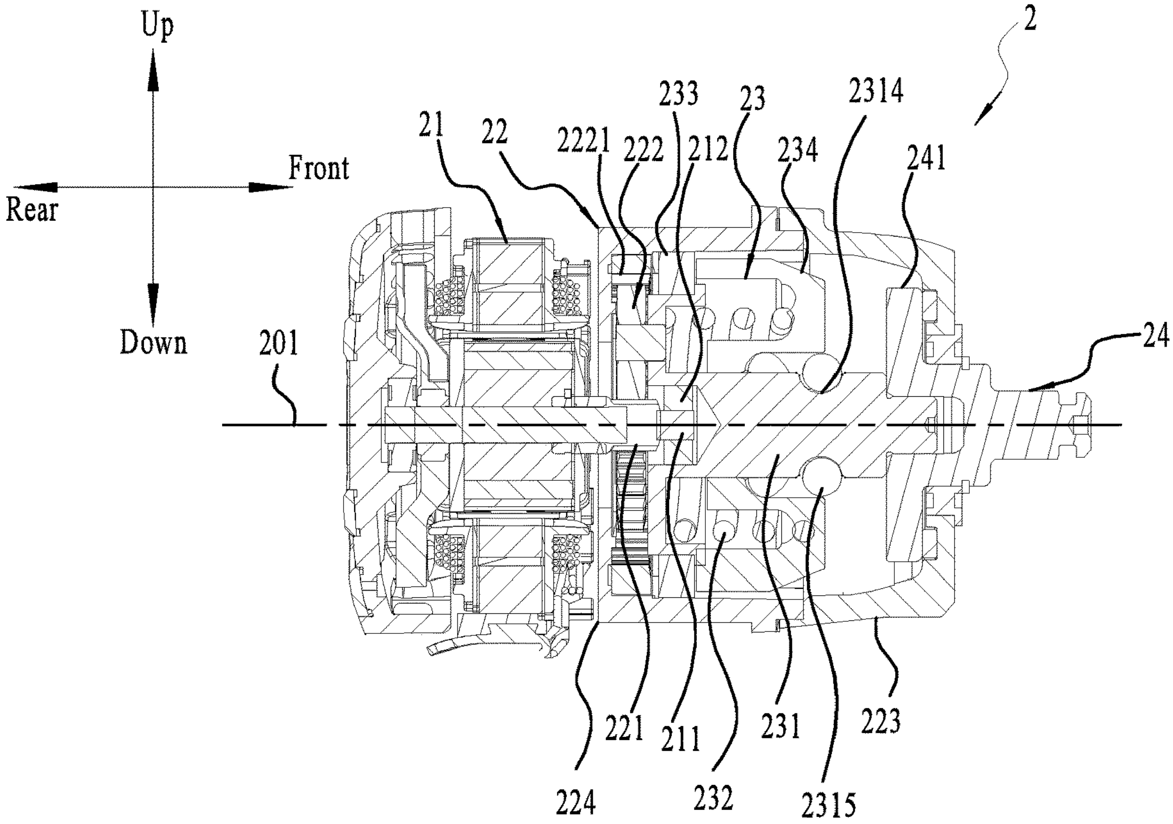
FIG. 19 is a partial sectional view of a second example of the present application.
Figure 20:
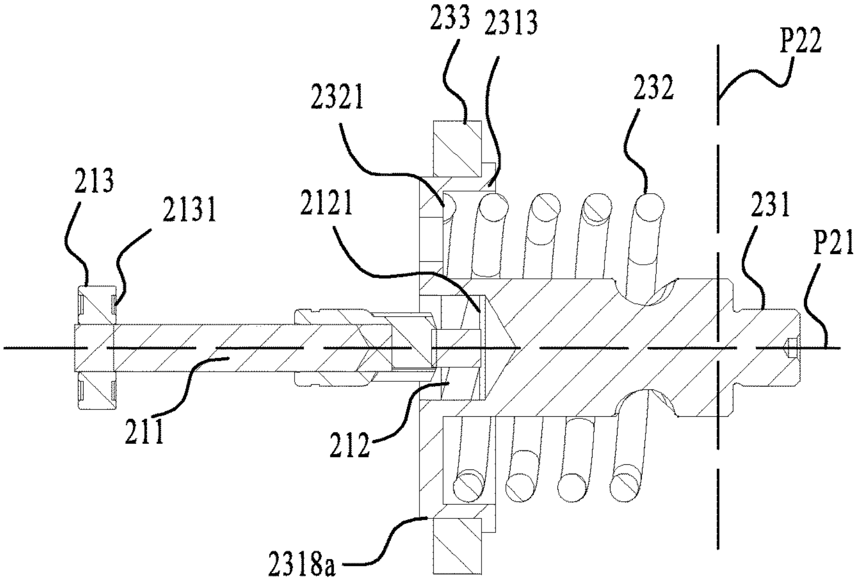
FIG. 20 is a cross-sectional view of a part of the structure shown in FIG. 19.
Figure 21A:
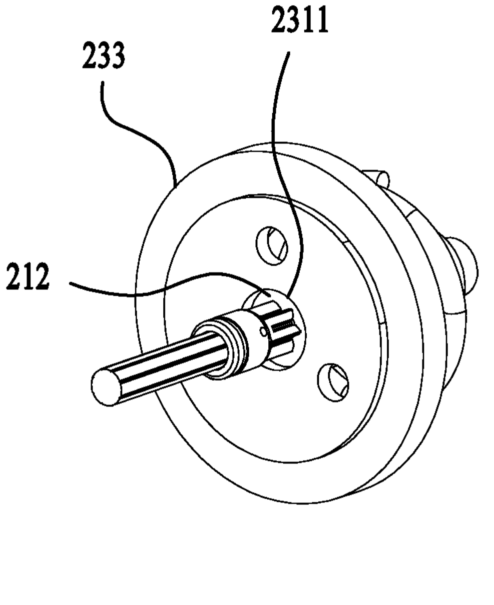
FIG. 21A is a structural view of a main shaft in FIG. 19.
Figure 21B:
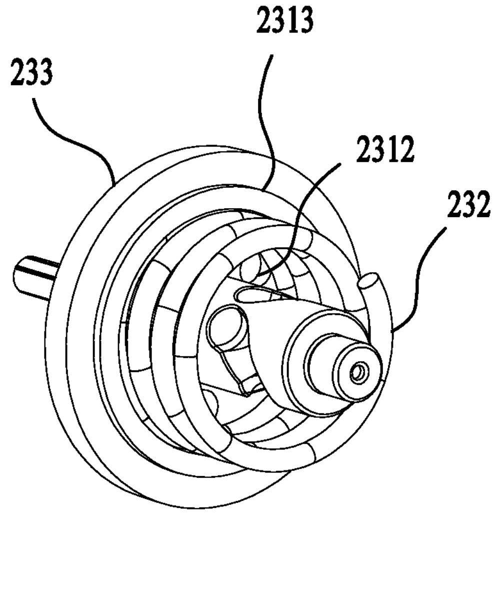
FIG. 21B is a structural view of a main shaft in FIG. 19 from another perspective.

As shown in FIGS. 16 to 18, in this example, the second ball groove 1314 on the main shaft 131 is recessed inwards and disposed on an outer sidewall of the main shaft 131 opposite to the inner sidewall 1342*b* of the impact block 134. The first ball grooves 1345 of the impact block 134 extend backwards along the inner sidewall 1342*b* along the front and rear direction.

The second ball groove 1314 is always located behind the front end surface 134*b* of the impact block body 134*a* during the movement of the impact block 134 between the first position and the second position. In this example, when the impact block 134 moves to the first position, a distal-most end of a front end of the second ball groove 1314 is at least flush with the front end surface 134*b* of the impact block body 134*a*. Preferably, the distal-most end of the front end of the second ball groove 1314 is disposed at a rear end of the front end surface 134*b* of the impact block body 134*a*.

Further, a roller ball mounting groove 1346 is disposed at a front end of the first ball groove 1345. The roller ball mounting groove 1346 guides the roller ball 1315 into the first ball groove 1345 and the second ball groove 1314. The roller ball mounting groove 1346 includes a first opening 1346*a* facing a front side of the impact block, a second opening 1346*b* for the roller ball 1315 to leave the roller ball mounting groove 1346, and a connecting groove 1346*c* communicating the first opening 1346*a* with the second opening 1346*b*. Specifically, the roller ball mounting groove 1346 extends along the direction of the first axis 101 and is recessed along a radial direction of the impact block 134, and a recess depth of the roller ball mounting groove 1346 is greater than a recess depth of the first ball groove 1345. The first opening 1346*a* is opened on the front end surface 134*b* of the impact block body and used for the roller ball 1315 to enter the roller ball mounting groove 1346. The second opening 1346*b* is opened on a sidewall of the first ball groove 1345 and used for the roller ball 1315 to enter an impact ball channel composed of the first ball grooves 1345 and the second ball groove 1314. In this example, the first opening 1346*a* communicates with the second opening 1346*b* so as to simplify a part mold and a mounting process of parts. A vertical distance from a rear end of the second opening 1346*b* to the front end surface 134*b* of the impact block body is L3, and a vertical distance from the rear end of the first ball groove 1345 to the front end surface 134*b* of the impact block body is L4. When the impact block 134 moves to the second position, the roller ball 1315 is located at the rear end of the first ball groove 1345. A diameter of the roller ball is D1, and $0.5+D1 \leq L4-L3 \leq 1.5D1$. Further, $L4-L3=D1+0.5$.

When the roller ball is mounted into the impact ball channel composed of the first ball grooves 1345 and the second ball groove 1314, the roller ball needs to be mounted in the roller ball mounting groove 1346, and then the roller ball mounting groove 1346 is rotated and moved backwards, that is, the impact block 134 is rotated and moved backwards. When the roller ball mounting groove 1346 is aligned with the second ball groove 1314, the roller ball 1315 enters the impact ball channel. The optimization of a distance between the roller ball mounting groove 1346 and the first ball groove 1345 is equivalent to the optimization of a mounting dimension reserved for the impact block 134 to mate with the main shaft 131 during a process of the roller ball 1315 entering the impact ball channel. The mounting dimension makes basically no contribution to the impact process. Therefore, the mounting dimension is reduced so that a length of the main shaft 131 can be reduced, and when the impact block 134 moves to the first position, the rear end of the inner annular portion 1342 of the impact block 134 can abut against the bottom surface 1312*a* of the second groove 1312. Therefore, a contact length of the main shaft 131 and the impact block 134 can be sufficiently increased. Further, the length of the main shaft may be reduced, thereby reducing the length of the impact tool in the front and rear direction. At the same time, an effect on a total length of the second ball groove 1314 and the first ball groove 1345 is reduced or eliminated, thereby reducing an effect on the impact force of the impact assembly.

As shown in FIGS. 19 to 24, the second example of this solution differs from the first example in mounting positions of the main shaft bearing and the second bearing, a relationship between the main shaft bearing and the second bearing, and the mounting manner of the output shaft.

An electric motor 21 of an impact tool 2 includes or is connected to a drive shaft 211 that is rotatable relative to the housing about a first axis 201 and used for outputting power. A transmission assembly 22 includes a gearbox housing 223, a gearbox rear cover 224, a sun gear 221 disposed in the gearbox housing 223, and a planetary gearset 222 that rotates in mesh with the sun gear 221. The planetary gearset 222 includes an inner ring gear 2221 and multiple planet gears 2222 engaged with the inner ring gear 2221, where the inner ring gear 2221 is engaged around the multiple planet gears 2222.

The impact tool 2 further includes a second bearing 212 and a main shaft bearing 233. The second bearing 212 is used for supporting the drive shaft 211, and the main shaft bearing 233 is used for supporting a main shaft 231. Projections of the second bearing 212 and the main shaft bearing 233 on a reference plane P21 perpendicular to an up and down direction have an overlapping region. In this example, the second bearing 212 and the main shaft bearing 233 are disposed on a front side of the planetary gearset 222 in the front and rear direction, and the planetary gearset 222 is disposed between the electric motor 21 and the second bearing 212. The main shaft 231 is formed with a first groove 2311, where the drive shaft 211 partially extends into the first groove 2311 and is positioned in the first groove 2311 through the second bearing 212. In this example, the first groove 2311 is circular. The main shaft bearing 233 is distributed along a circumferential direction of the main shaft 231 and disposed between the main shaft 231 and the gearbox rear cover 224. Specifically, the main shaft 231 has a first surface 2318*a*, an inner race of the main shaft bearing 233 abuts against the first surface 2318*a* of the main shaft 231, and an outer race of the main shaft bearing 233 abuts against the gearbox rear cover 224. The main shaft 231 is formed with a flange 2313 along a circumferential outer side of the main shaft 231, and the main shaft bearing 233 abuts against the flange 2313, thereby axially limiting the main shaft 231.

The main shaft 231 is further formed with a second groove 2312. Specifically, the second groove 2312 is annular and formed on a radial outer side of the first groove 2311. An opening direction of the second groove 2312 is opposite to an opening direction of the first groove 2311 in the front and rear direction. A spring 232 sleeved on the main shaft 231 is at least partially disposed in the second groove 2312. Specifically, a projection of the spring 232 on a reference plane P22 perpendicular to the front and rear direction is located between a projection of the second bearing 212 on the reference plane P22 perpendicular to the front and rear direction and a projection of the main shaft bearing 233 on the reference plane P22 perpendicular to the front and rear direction. Projections of the first groove 2311 and the second groove 2312 on the reference plane P21 perpendicular to the up and down direction have an overlapping region. Therefore, projections of the second bearing 212, the main shaft bearing 233, and the spring 232 on the reference plane P21 perpendicular to the up and down direction have an overlapping region. With the preceding improvement in structure, a length of a gearbox of the impact tool 2 in the front and rear direction is reduced.

In some examples, the electric motor 21 further includes a first bearing 213, and the second bearing 112 in the preceding example is the second bearing 212 in this example. Specifically, referring to FIG. 20, a ratio of a distance from a rear end surface 2321 of the spring 232 to a front end surface 2131 of the first bearing 213 to a distance from a front end surface 2121 of the second bearing 212 to the front end surface 2131 of the first bearing 213 is less than or equal to 1. The main shaft bearing 233 is formed with an accommodating space (not shown in the figure) extending along the front and rear direction in which the spring 232 is at least partially disposed along the front and rear direction.

When the impact tool 2 implements an impact function, a reaction force applied to the main shaft 231 along the front and rear direction is transmitted to the main shaft bearing 233, and then the force is transmitted to the gearbox rear cover 224 through the main shaft bearing 233. Specifically, the main shaft 231 is formed with the flange 2313 along the circumferential outer side of the main shaft 231. The flange 2313 abuts against the main shaft bearing 233, thereby axially limiting the main shaft 231.

Figure 22A:
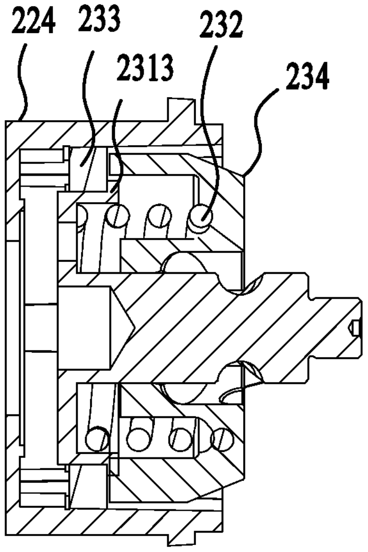
FIG. 22A is a schematic view of a first position of an impact block in FIG. 19.
Figure 22B:
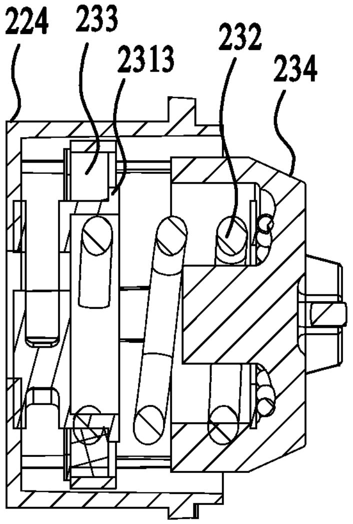
FIG. 22B is a schematic view of a second position of an impact block in FIG. 19.

As for an impact assembly 23, when the main shaft 231 rotates, the movement of a cam ball 2315 in a cam groove 2314 allows an impact block 234 to move relative to the main shaft 231 in the front and rear direction. Specifically, in the working process of the impact tool 2, the impact block 234 has a first position close to the main shaft bearing 233 and a second position away from the main shaft bearing 233. FIG. 22A shows the first position and FIG. 22B shows the second position. A length of the spring 232 in the front and rear direction is the shortest when the impact block 234 is at the first position. The length of the spring 232 in the front and rear direction is the longest when the impact block 234 is at the second position. When the impact block 234 is at the first position, projections of the impact block 234 and the flange 2313 of the main shaft 231 on the reference plane P21 perpendicular to the up and down direction have an overlapping region.

Figure 23:
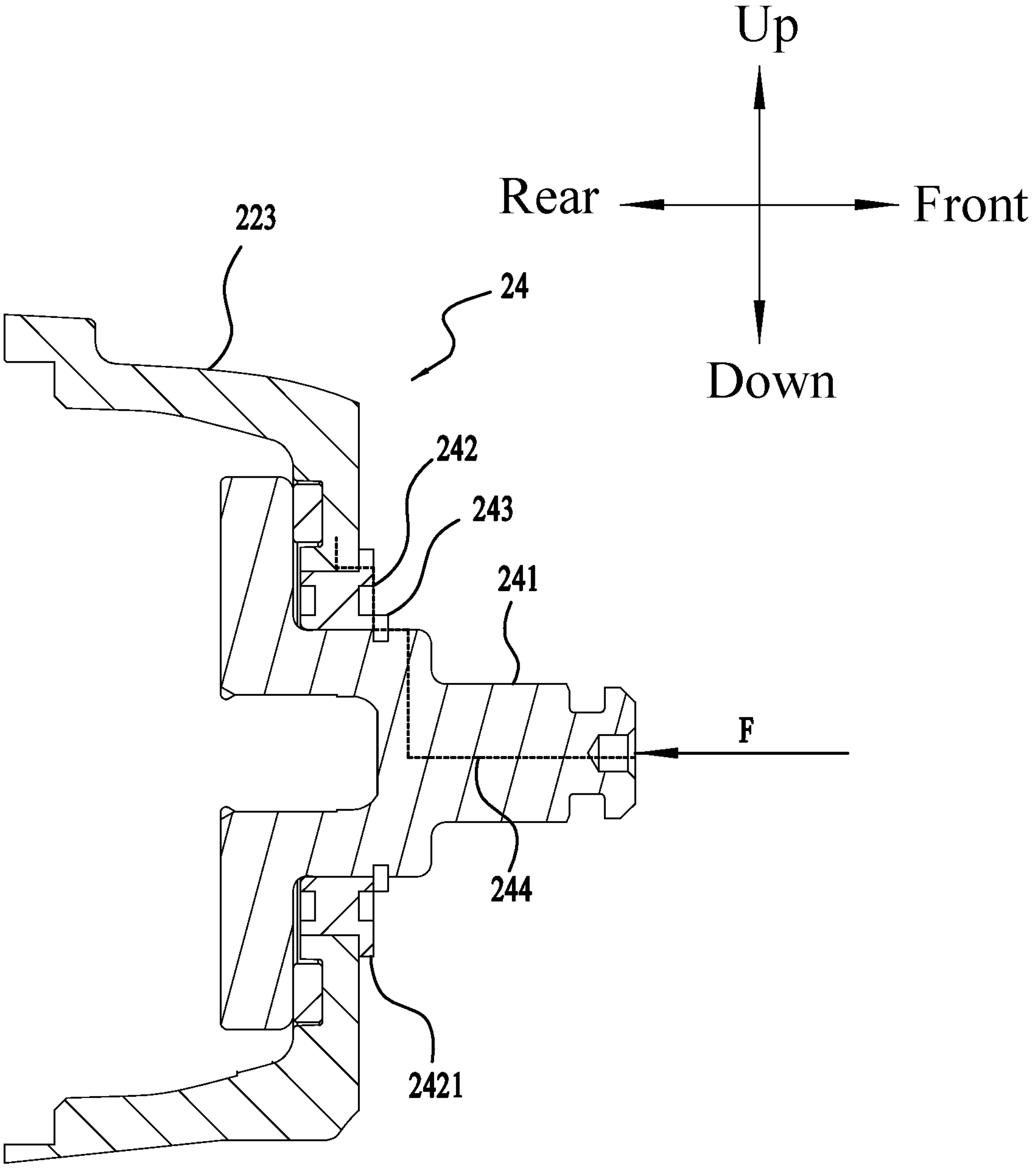
FIG. 23 is a structural view of an output shaft, an output shaft bearing, and a gearbox housing in FIG. 19.

As shown in FIG. 23, in this example, a power output assembly 24 further includes an output shaft bearing 242 for supporting an output shaft 241 and a limiting member 243 for axially limiting the output shaft 241. The output shaft bearing 242 is directly sleeved on the output shaft 241. When the impact tool performs an impact operation, the output shaft 241 receives an axial reaction force F. A line of action 244 of the axial reaction force F is guided by the output shaft 241 to the limiting member 243 and finally onto the gearbox housing 223 through the output shaft bearing 242.

Figure 24:
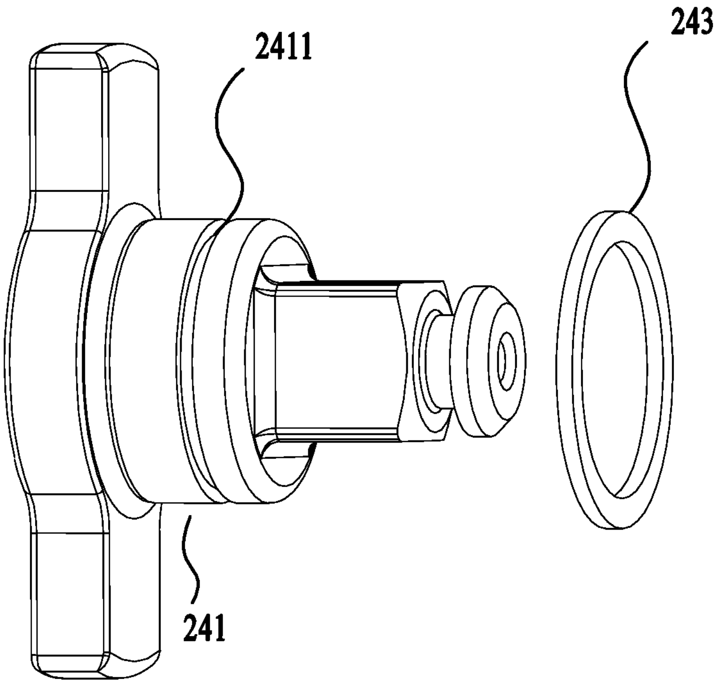
FIG. 24 is a structural view of the output shaft and a limiting member in FIG. 23.

Specifically, as shown in FIG. 24, the output shaft 241 is formed with a circumferentially distributed first groove 2411 in which the limiting member 243 is partially disposed. In this example, the limiting member 243 is configured to be a circlip such as a C-shaped circlip or a circular circlip. Referring to FIG. 23, the output shaft bearing 242 is formed with a limiting portion 2421 capable of limiting the output shaft 241 in the front and rear direction. Specifically, in this example, a boss, that is, the limiting portion 2421, is formed on an outer side of the output shaft bearing 242, and the boss is disposed on a front side of the gearbox housing 223 and abuts against the gearbox housing 223 in the front and rear direction. When the impact tool 2 works, the axial reaction force F applied to the output shaft 241 is transmitted to the gearbox housing 223 through the limiting member 243 and the limiting portion 2421 on the output shaft bearing 242. Since the axial reaction force F applied to the output shaft 241 is transmitted to the gearbox housing 223 through the limiting member 243 and the limiting portion 2421 of the output shaft bearing 242, the main shaft does not receive the axial reaction force from the output shaft. During assembly, the output shaft 241 is mounted into the gearbox housing 223 from the rear to the front, the output shaft bearing 242 is mounted between the output shaft 241 and the gearbox housing 223 from the front to the rear, and the limiting member 243 is mounted in the first groove 2411 on the output shaft 241. In this example, projections of the output shaft bearing 242, the gearbox housing 223, and the output shaft 241 on the reference plane P21 perpendicular to the up and down direction have an overlapping region. Further, a length of the overlapping region in the front and rear direction is greater than or equal to 1 mm and less than or equal to 8 mm.

Figure 25:
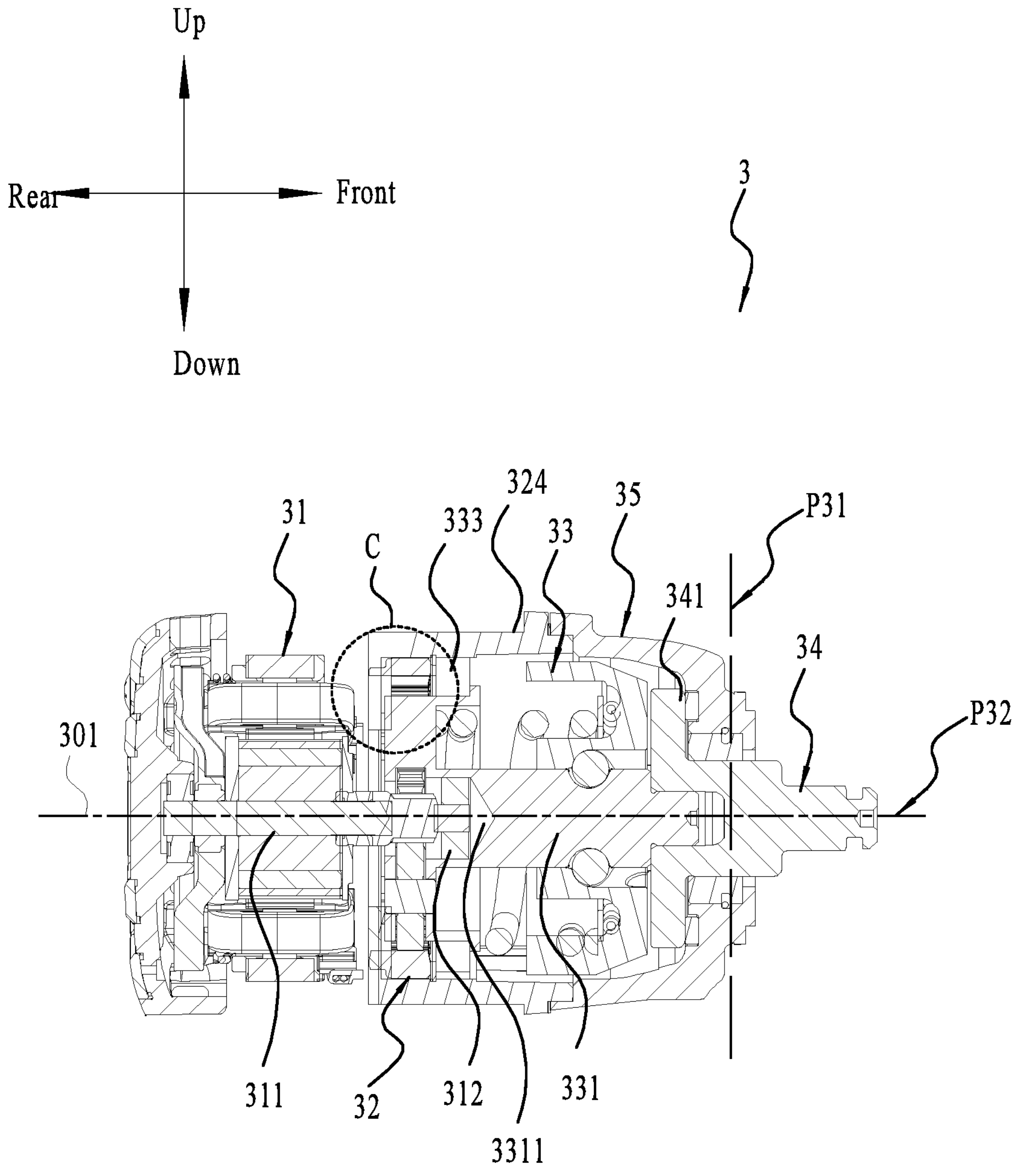
FIG. 25 is a partial sectional view of a third example of the present application.
Figure 26:
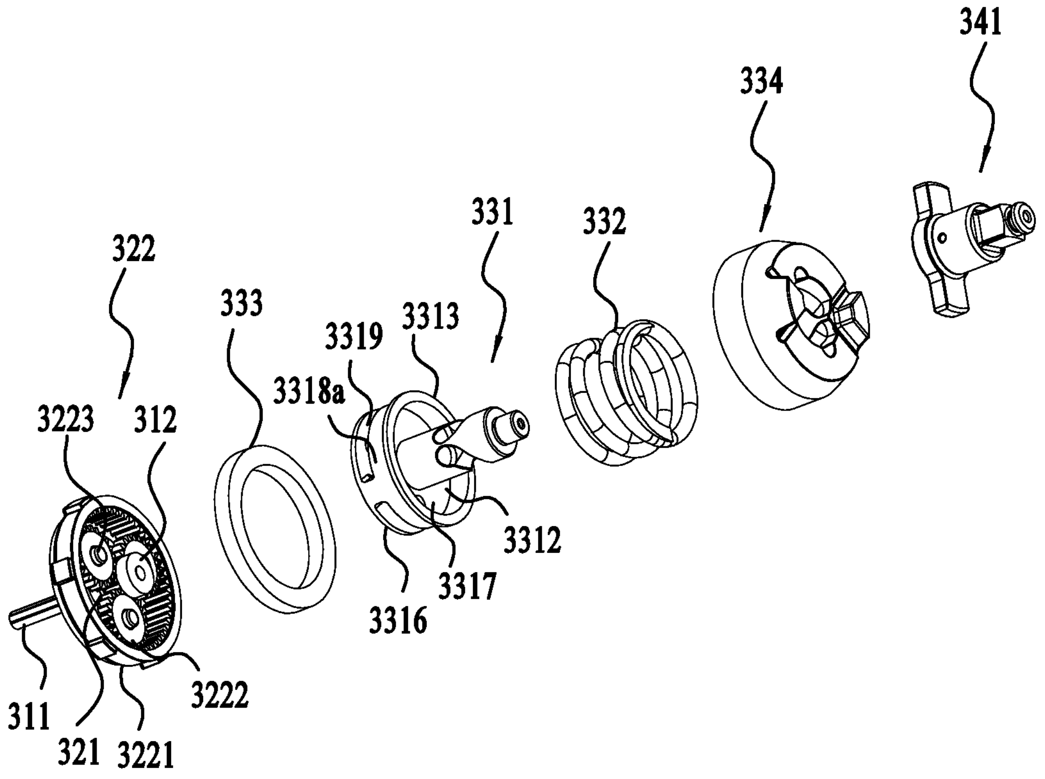
FIG. 26 is a partial structural view of a third example of the present application.
Figure 27:
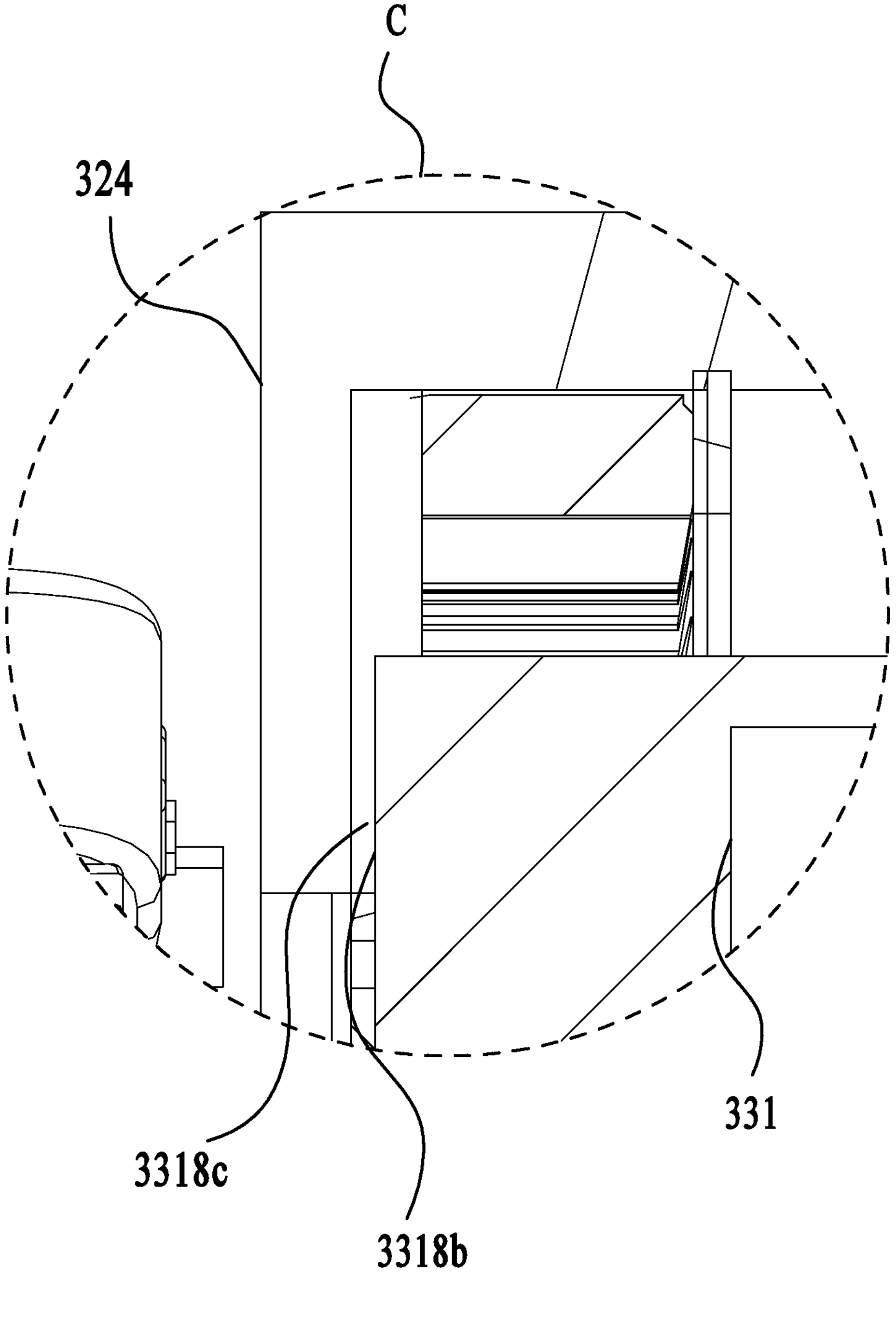
FIG. 27 is a partial enlarged view of part C in FIG. 25.

FIGS. 25 to 27 show a third example of the present disclosure. An impact tool 3 includes an electric motor 31, a transmission assembly 32, an impact assembly 33, a power output assembly 34, and a housing 35. The electric motor 31, the transmission assembly 32, the impact assembly 33, and the power output assembly 34 are arranged in sequence along the front and rear direction in the housing.

Referring to FIGS. 25 and 26, the transmission assembly 32 includes at least a planetary gearset 322, where the planetary gearset 322 includes planet gear pins 3223, an inner ring gear 3221, and multiple planet gears 3222 engaged with the inner ring gear 3221, and the inner ring gear 3221 is engaged around the multiple planet gears 3222. A difference from the second example is that a main shaft 331 is formed with an accommodating space 3319 in which the planet gears 3222 and the planet gear pins 3223 are at least partially disposed. Specifically, an end of the planet gear pin 3223 is fixedly connected to a first side portion 3316 of the main shaft 331, and the other end of the planet gear pin 3223 is fixedly connected to a second side portion 3317 of the main shaft 331. It is to be understood that when a drive shaft 311 drives a sun gear 321 to rotate, the sun gear 321 drives the planet gears 3222 to rotate, and the planet gears 3222 drive the planet gear pins 3223 to rotate. Since the planet gear pins 3223 are fixedly connected to the first side portion 3316 and the second side portion 3317 of the main shaft 331, the main shaft 331 can rotate synchronously with the planet gear pins 3223.

The impact tool 3 includes a second bearing 312 for supporting the drive shaft 311 and a main shaft bearing 333 for supporting the main shaft 331. The second bearing 312 and the main shaft bearing 333 are disposed on a front side of the planetary gearset 322 in the front and rear direction, and the planetary gearset 322 is disposed between the electric motor 31 and the second bearing 312. The main shaft 331 is formed with a first groove 3311, where the drive shaft 311 partially extends into the first groove 3311 and is positioned in the first groove 3311 through the second bearing 312. The first groove 3311 communicates with the accommodating space 3319 and is disposed on a front side of the accommodating space 3319. Preferably, the first groove 3311 is circular. It is to be understood that the drive shaft 311 passes through the accommodating space 3319 and then extends into the first groove 3311 for positioning along the front and rear direction.

The main shaft bearing 333 is distributed along a circumferential direction of the main shaft 331 and disposed between the main shaft 331 and a gearbox rear cover 324. Specifically, the main shaft 331 has a first surface 3318*a*, and the main shaft bearing 333 abuts against the first surface 3318*a* of the main shaft 331 and the gearbox rear cover 324. The main shaft 331 is formed with a flange 3313 along a circumferential outer side of the main shaft 331, and the main shaft bearing 333 abuts against the flange 3313, thereby axially limiting the main shaft 331. The main shaft 331 is further formed with a second groove 3312. Specifically, the second groove 3312 is annular and formed on a radial outer side of the first groove 3311. A spring 332 sleeved on the main shaft 331 is at least partially disposed in the second groove 3312.

In this example, a projection of the spring 332 on a reference plane P31 perpendicular to the front and rear direction is located between a projection of the second bearing 312 on the reference plane P31 perpendicular to the front and rear direction and a projection of the main shaft bearing 333 on the reference plane P31 perpendicular to the front and rear direction. On the other hand, projections of the second bearing 312, the main shaft bearing 333, and the spring 332 on the reference plane P32 perpendicular to the up and down direction have an overlapping region. The structure in this example can reduce an axial dimension of an assembly structure between the drive shaft and the main shaft to a large extent, thereby reducing an axial dimension of the impact tool.

In this example, as shown in FIG. 27, a gap 3318*c* is reserved between the gearbox rear cover 324 and a second surface 3318*b* of the main shaft 331 in the front and rear direction. When the impact tool 3 implements the impact function, the main shaft 331 receives a force in the front and rear direction. Due to the existence of the reserved gap 3318*c*, the main shaft 331 is not in contact with the gearbox rear cover 324 when receiving an axial force, thereby preventing a relatively large frictional force from being generated between the main shaft 331 and the gearbox rear cover 324, where the frictional force reduces the service life of the gearbox rear cover and affects an output function of the impact tool and the user's feel.

Figure 28:
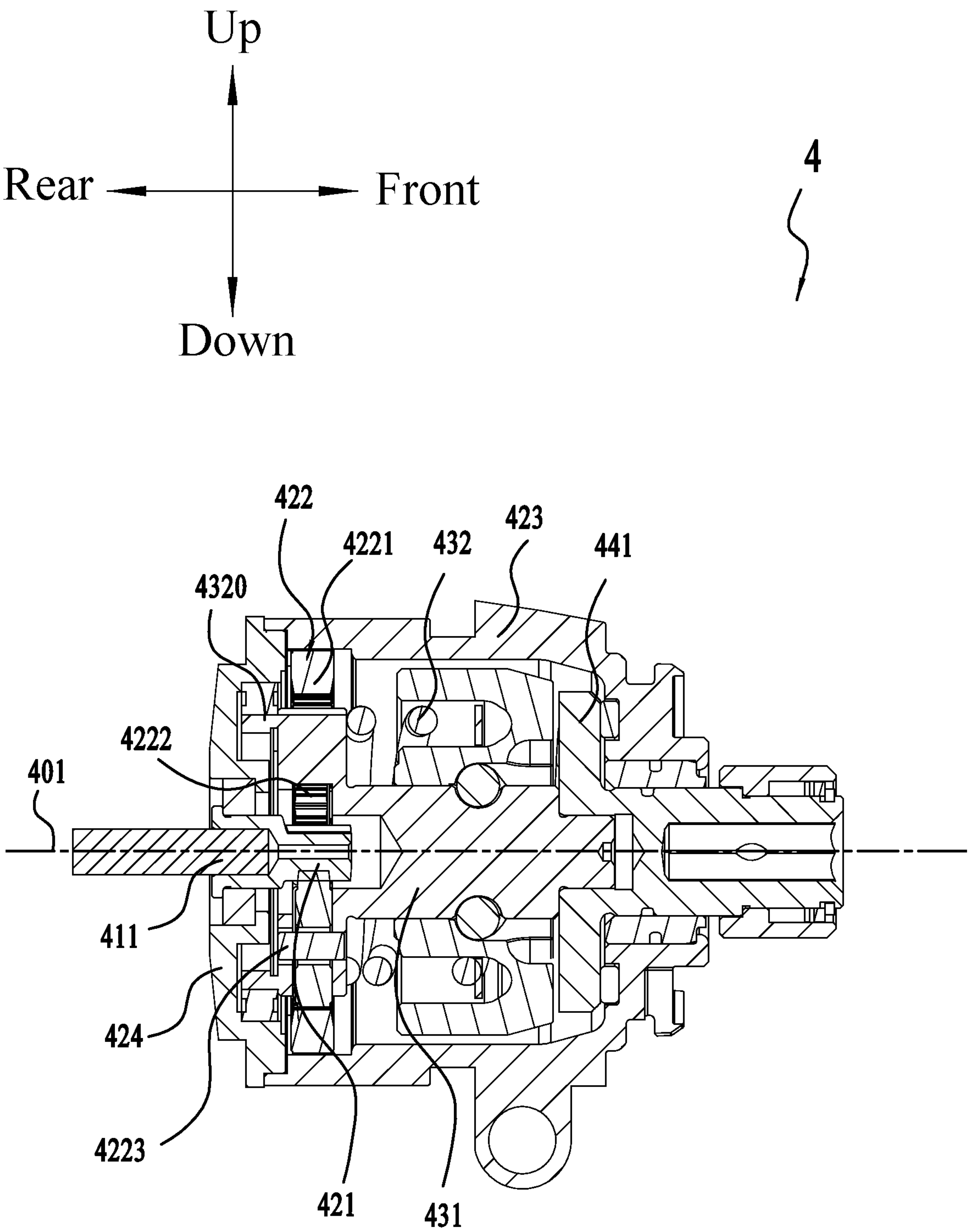
FIG. 28 is a partial sectional view of a fourth example of the present application.
Figure 29A:
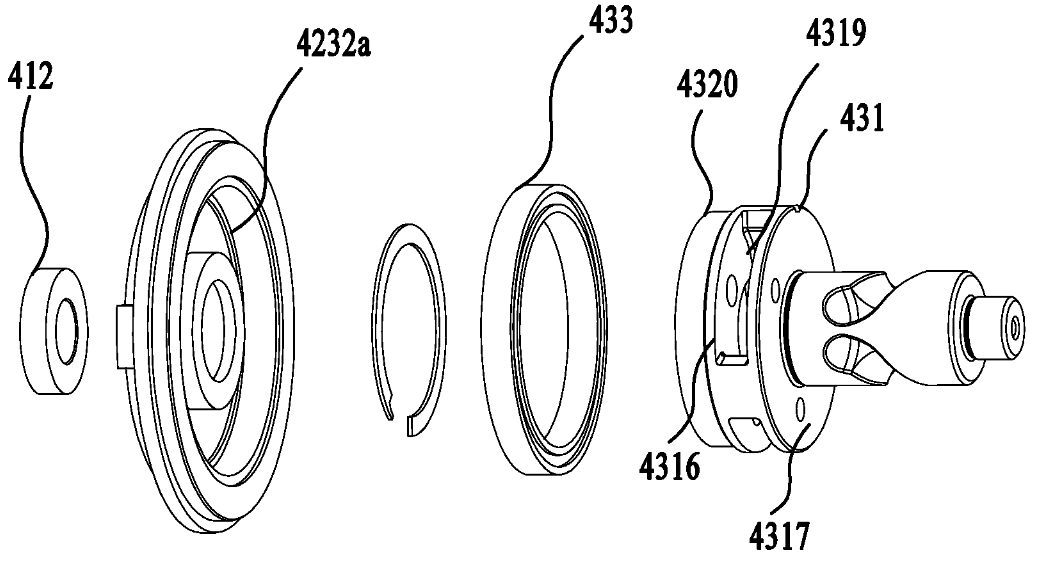
FIG. 29A is a partial exploded view of FIG. 28.

FIGS. 28 and 29 show a fourth example of the present disclosure. An impact tool 4 includes an electric motor, a transmission assembly, an impact assembly, a power output assembly, and a housing. The electric motor includes a drive shaft 411 rotatable relative to the housing about a first axis 401. The transmission assembly includes a sun gear 421 and a planetary gearset 422 that rotates in mesh with the sun gear 421. The sun gear 421 is fixedly connected to the drive shaft 411 so that the sun gear 421 rotates synchronously with the drive shaft 411. The sun gear 421 and the planetary gearset 422 form engaging teeth for transmitting power. The electric motor drives the planetary gearset 422 to rotate through the sun gear 421. The planetary gearset 422 includes an inner ring gear 4221 and planet gears 4222 engaged with the inner ring gear 4221, where multiple planet gears 4222 are provided, and the inner ring gear 4221 is engaged around the multiple planet gears 4222.

The impact assembly is used for outputting an impact force and includes a main shaft 431 rotatable about the first axis 401 and a spring 432 sleeved on the main shaft 431. The spring 432 is used for buffering and resetting when the impact assembly outputs the impact force. The power output assembly is impacted by the impact assembly to output power, thereby implementing the function of the impact tool 4. The power output assembly includes an output shaft 441 disposed on a front side of the main shaft 431 along a direction of the first axis 401. The planetary gearset 422 further includes multiple planet gear pins. The planet gear pins are fixedly connected to the planet gears 4222 and the main shaft 431 to transmit power outputted by the drive shaft 411 to the main shaft 431. The planet gear pins described above are mounted in a manner similar to that in the second example, which is not described in detail here.

Figure 29B:
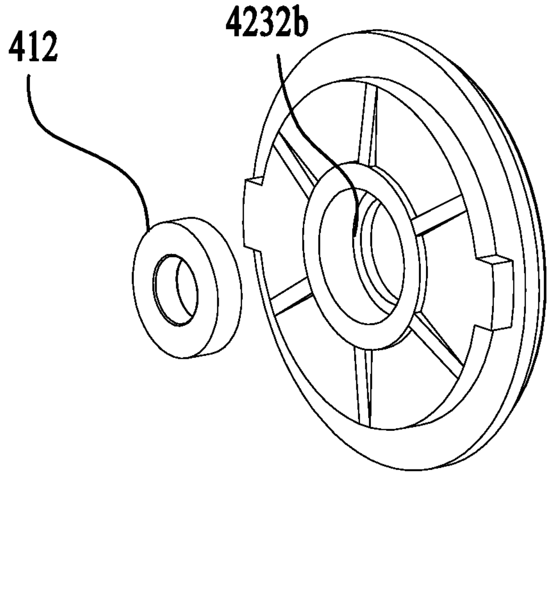
FIG. 29B is a partial exploded view of FIG. 28 from another perspective.

The impact tool 4 further includes a gearbox rear cover 424 and a gearbox housing 423. Referring to FIGS. 28 to 29B, in this example, the gearbox rear cover 424 is formed with a first accommodating space 4232*a* in which the main shaft 431 is partially disposed. Specifically, a support portion 4320 is formed on a circumferential outer side of the main shaft 431 and extends into the first accommodating space 4232*a* along the front and rear direction.

The impact assembly includes a main shaft bearing 433 that is used for supporting the main shaft 431 and also disposed in the preceding accommodating space. Specifically, an outer race of the main shaft bearing 433 abuts against an inner wall of the first accommodating space 4232*a*, and an inner race of the main shaft bearing 433 abuts against the support portion 4320, thereby circumferentially limiting the main shaft 431. Further, the gearbox rear cover 424 is formed with a second accommodating space 4232*b*. A second bearing 412 is disposed in the second accommodating space 4232*b*. Specifically, an outer race of the second bearing 412 abuts against an inner wall of the second accommodating space 4232*b*, and an inner race of the second bearing 412 abuts against the drive shaft 411, thereby circumferentially limiting the drive shaft 411. In this example, projections of the second accommodating space 4232*b* and the support portion 4320 on the reference plane perpendicular to the up and down direction have an overlapping region. Projections of the second bearing 412 and the main shaft bearing 433 on the reference plane perpendicular to the up and down direction have an overlapping region.

The planetary gearset 422 is provided with the multiple planet gears 4222, where each planet gear 4222 is sleeved on a planet gear pin 4223 extending along the front and rear direction so that power on the planet gear 4222 is transmitted to the planet gear pin 4223. Specifically, the planet gear 4222 and the planet gear pin 4223 are connected through an engaging teeth. The main shaft 431 is formed with an accommodating space 4319 for accommodating the planet gears 4222 and the planet gear pins 4223. An end of the planet gear pin 4223 is fixedly connected to a first side portion 4316 of the main shaft 431, and the other end of the planet gear pin 4223 is fixedly connected to a second side portion 4317 of the main shaft 431. It is to be understood that when the drive shaft 411 drives the sun gear 421 to rotate, the sun gear 421 drives the planet gears 4222 to rotate, and the planet gears 4222 drive the planet gear pins 4223 to rotate. Since the planet gear pins 4223 are fixedly connected to the first side portion 4316 and the second side portion 4317 of the main shaft 431, the main shaft 431 can rotate synchronously with the planet gear pins 4223. In this example, the planet gear pins 4223 are fixed to the main shaft 431 through a C-shaped ring, thereby preventing the planet gear pins 4223 from sliding relative to the main shaft 431 or even being disengaged from the main shaft 431 during the impact process of the impact tool.

In this example, the second bearing 412 is disposed in the second accommodating space 4232*b* formed by the gearbox rear cover 424, and the main shaft bearing 433 is disposed in the first accommodating space 4232*a* formed by the gearbox rear cover 424. On the other hand, the projections of the second bearing 412 and the main shaft bearing 433 on the reference plane perpendicular to the up and down direction have an overlapping region. With the preceding improvement in structure, the length of the impact tool in the front and rear direction can be reduced, and a positioning manner of the second bearing is improved so that the service life of the second bearing is improved and the second bearing is simpler during assembly.

Figure 30:
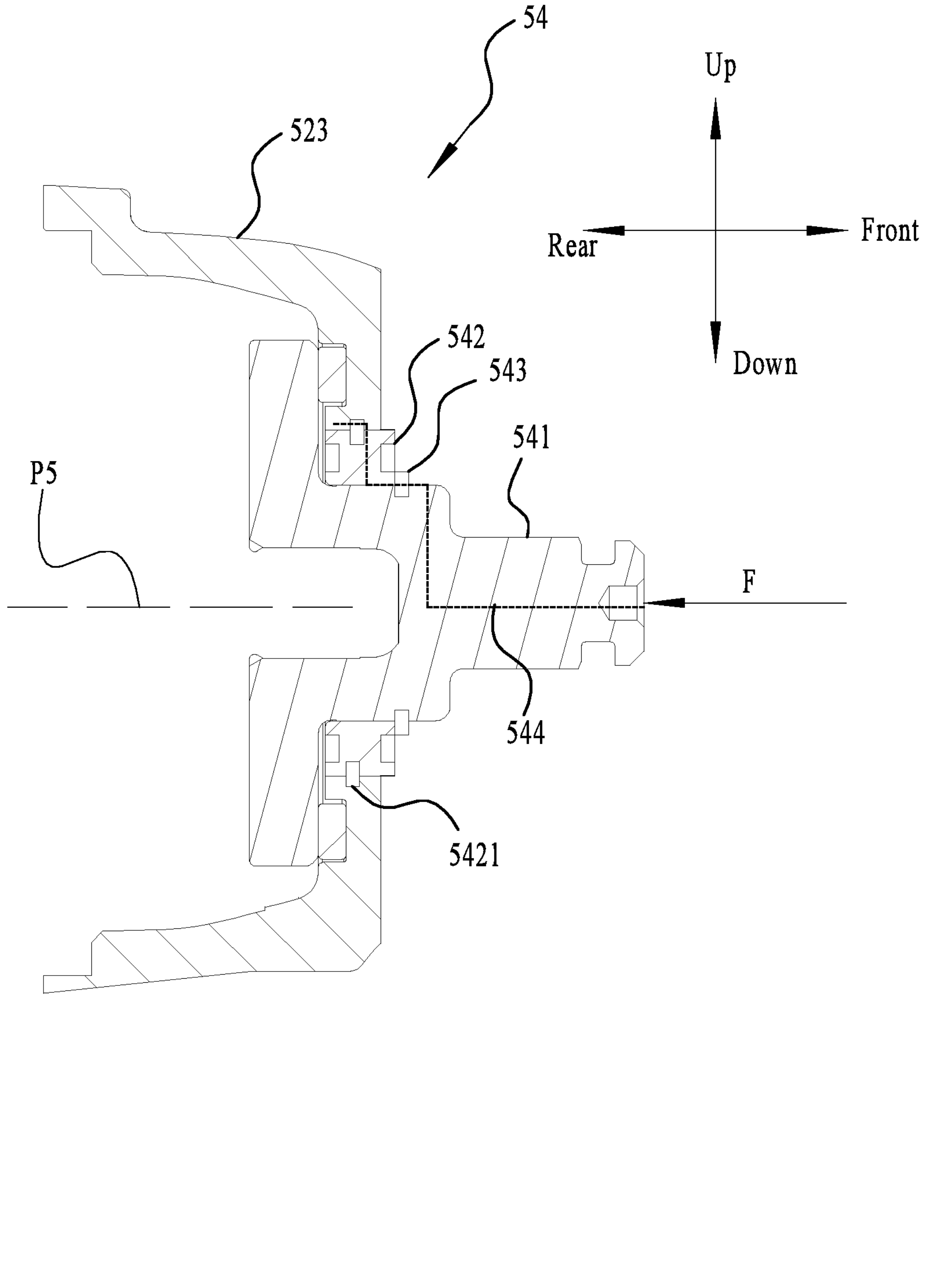
FIG. 30 is a partial sectional view of a fifth example of the present application.
Figure 31:
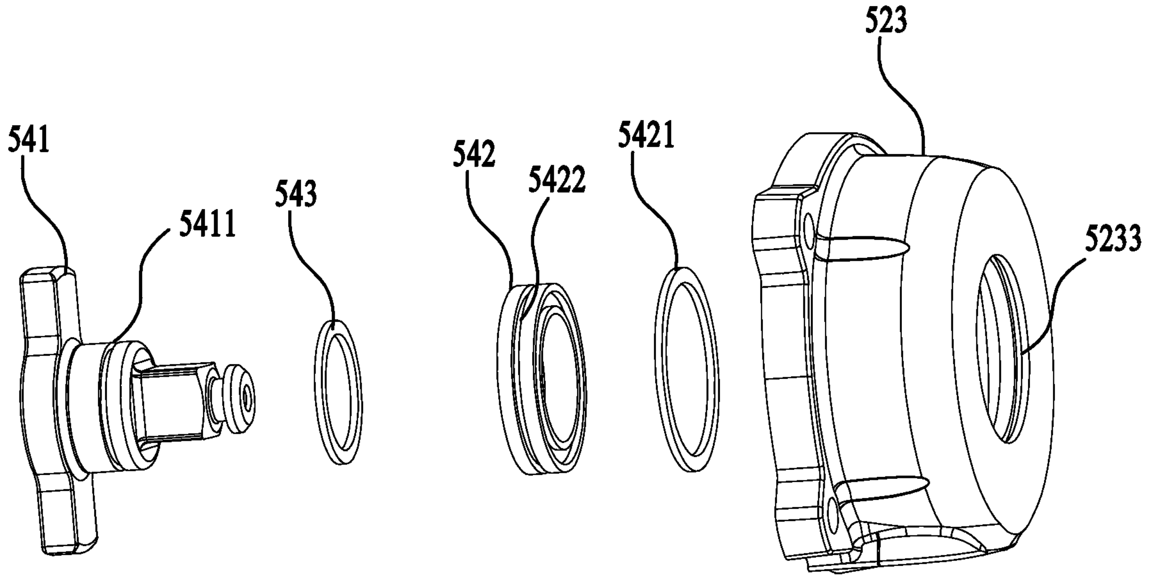
FIG. 31 is a partial exploded view of FIG. 30.

FIG. 30 shows a fifth example of the present disclosure. A power output assembly 54 further includes an output shaft bearing 542 for supporting an output shaft 541 and a limiting member 543 for axially limiting the output shaft 541. The output shaft bearing 542 is directly sleeved on the output shaft 541. As shown in FIG. 31, the output shaft 541 is formed with a circumferentially distributed first groove 5411 in which the limiting member 543 is partially disposed. In this example, the limiting member 543 is configured to be a circlip such as a C-shaped circlip or a circular circlip. The output shaft bearing 542 is connected to a limiting portion 5421 capable of limiting the output shaft 541 in the front and rear direction. In this example, the output shaft bearing 542 is formed with a second groove 5422, and a gearbox housing 523 is formed with a third groove 5233 disposed opposite to the second groove 5422. The limiting portion 5421 is disposed in the second groove 5422 and the third groove 5233, thereby axially limiting the gearbox housing 523 and the output shaft bearing 542. It is to be understood that the limiting portion 5421 is configured to be a circlip such as a C-shaped circlip or a circular circlip.

When the impact tool works, the axial reaction force F applied to the output shaft 541 is transmitted to the gearbox housing 523 through the limiting member 543 and the limiting portion 5421 on the output shaft bearing 542 and the gearbox housing 523, thereby ensuring that the main shaft does not receive the axial reaction force from the output shaft.

During assembly, the output shaft 541 is mounted into the gearbox housing 523 from the rear to the front, the output shaft bearing 542 is mounted between the output shaft 541 and the gearbox housing 523 from the front to the rear, and the limiting member 543 is mounted in the first groove 5411 on the output shaft 541. It is to be noted that when the output shaft bearing 542 is mounted between the output shaft 541 and the gearbox housing 523, the circlip needs to be mounted in the second groove 5422 firstly. Since the circlip can be deformed, the assembly can be completed through specific tooling.

In this example, projections of the output shaft bearing 542, the gearbox housing 523, and the output shaft 541 on a reference plane P5 perpendicular to the up and down direction have an overlapping region. A length of the overlapping region in the front and rear direction is greater than or equal to 1 mm and less than or equal to 8 mm.

Figure 32:
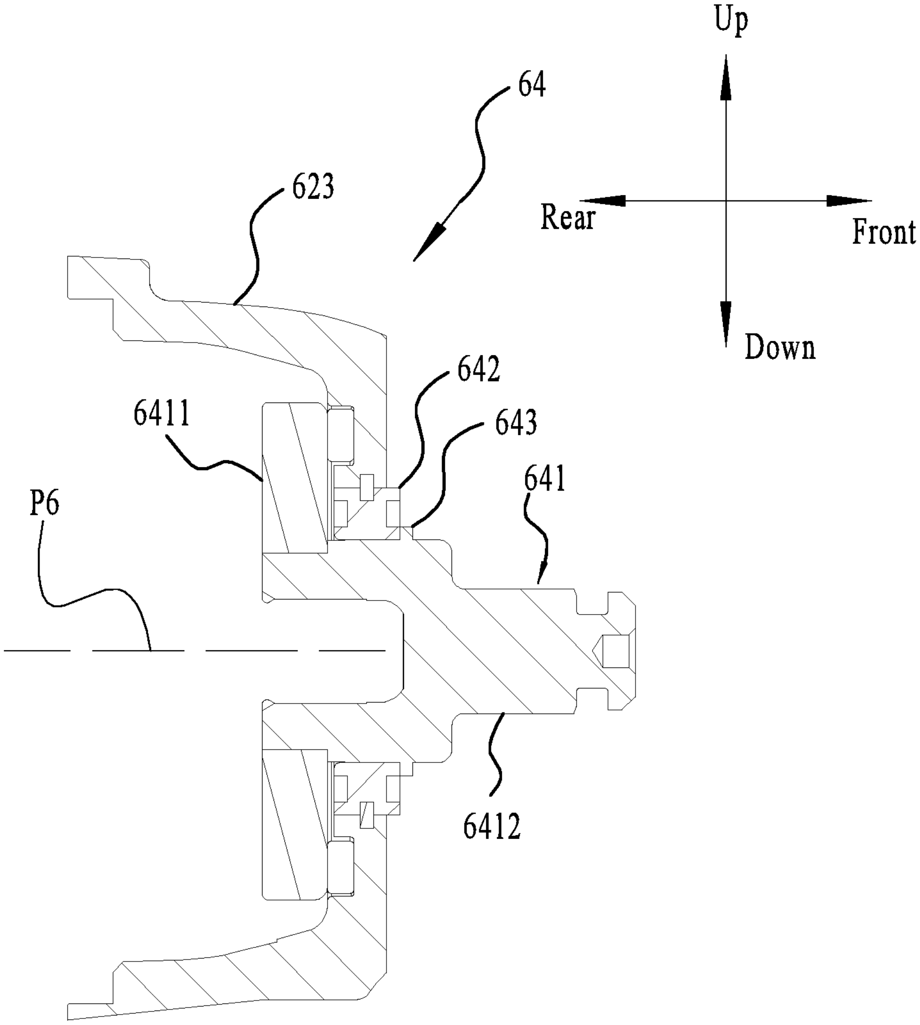
FIG. 32 is a partial sectional view of a sixth example of the present application.

FIG. 32 shows a sixth example of the present disclosure. A power output assembly 64 further includes an output shaft bearing 642 for supporting an output shaft 641 and a limiting member 643 for axially limiting the output shaft 641. The output shaft bearing 642 is directly sleeved on the output shaft 641. A difference from the second example or the fifth example is that the output shaft 641 is integrally formed with the limiting member 643. Specifically, the limiting member 643 on the output shaft 641 is a protrusion that extends along the radial direction and abuts against the output shaft bearing 642 in the front and rear direction. The output shaft bearing 642 is connected to a limiting portion 6421 capable of limiting the output shaft 641 in the front and rear direction.

Figure 33:
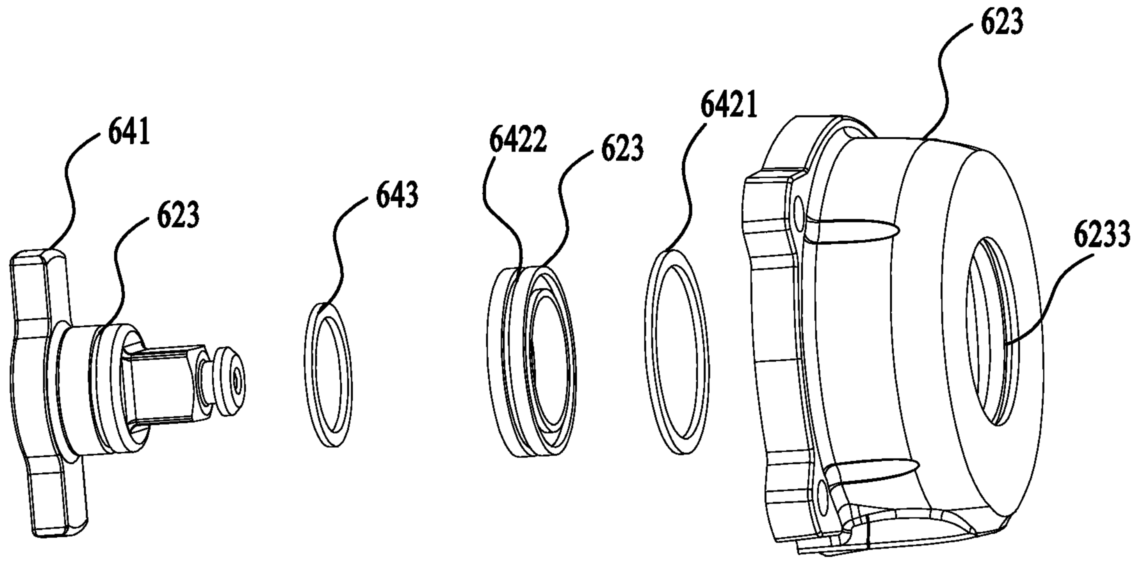
FIG. 33 is a partial exploded view of FIG. 32.

As shown in FIGS. 32 and 33, in this example, the output shaft bearing 642 is formed with a second groove 6422, and a gearbox housing 623 is formed with a third groove 6233 disposed opposite to the second groove 6422. The limiting portion 6421 is disposed in the second groove 6422 and the third groove 6233, thereby axially limiting the gearbox housing 623 and the output shaft bearing 642. It is to be understood that the limiting portion 6421 is configured to be a circlip such as a C-shaped circlip or a circular circlip. When the impact tool works, a line of action 564 of the axial reaction force F applied to the output shaft 641 is transmitted to the gearbox housing 623 through the protrusion on the output shaft 641 and the limiting portion 6421 on the output shaft bearing 642 and the gearbox housing 623, thereby ensuring that the main shaft does not receive the axial reaction force from the output shaft.

Further, this example differs from the preceding examples in that the output shaft 641 has a split structure, that is, includes an anvil 6411 and a shaft 6412. The anvil 6411 is sleeved on the shaft 6412 and keeps rotating synchronously with the shaft 6412. During assembly, the shaft 6412 is mounted into the gearbox housing 623 from the front to the rear and then connected to the anvil 6411. It is to be noted that before the shaft 6412 is mounted into the gearbox housing 623 from the front to the rear, the circlip needs to be mounted into the second groove 6422 of the output shaft bearing 642 and then sleeved on the shaft 6412. Since the circlip can be deformed, the assembly can be completed through specific tooling.

In this example, projections of the output shaft bearing 642, the gearbox housing 623, and the output shaft 641 on a reference plane P6 perpendicular to the up and down direction have an overlapping region. Further, a length of the overlapping region in the front and rear direction is greater than or equal to 1 mm and less than or equal to 8 mm.

Figure 34:
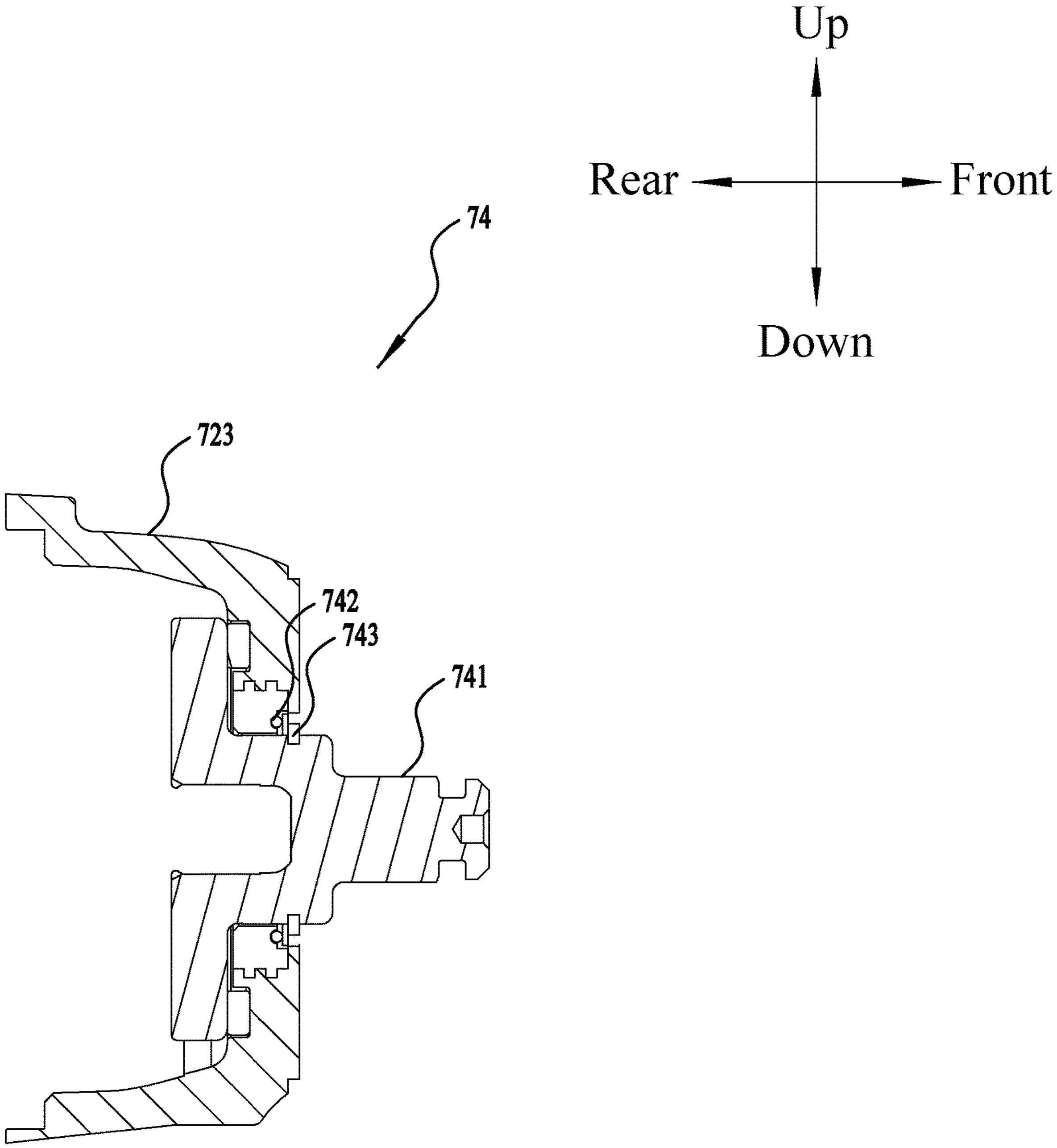
FIG. 34 is a partial sectional view of a seventh example of the present application.
Figure 35:
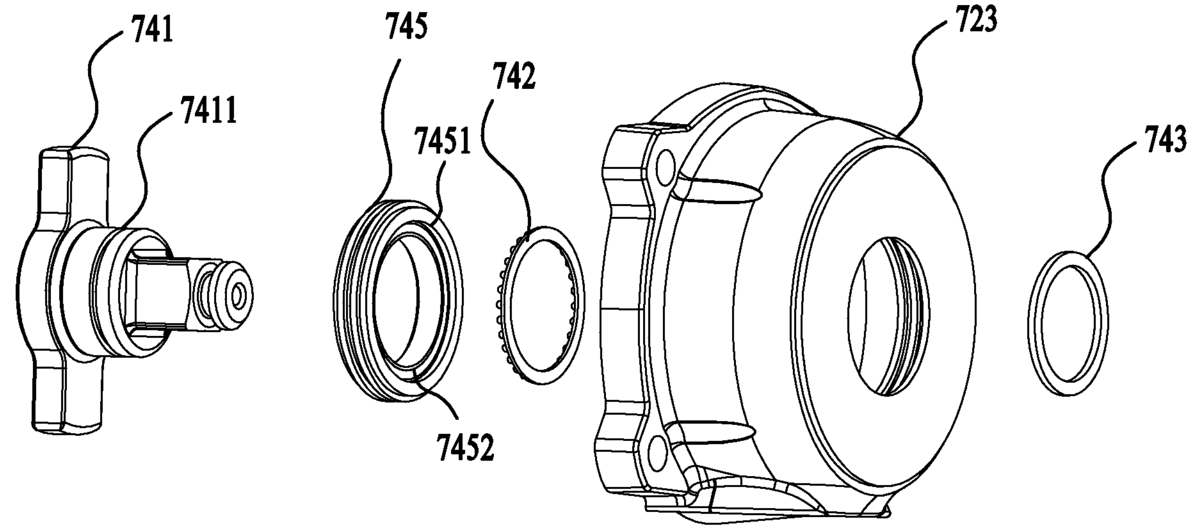
FIG. 35 is a partial exploded view of FIG. 34.
Figure 36:
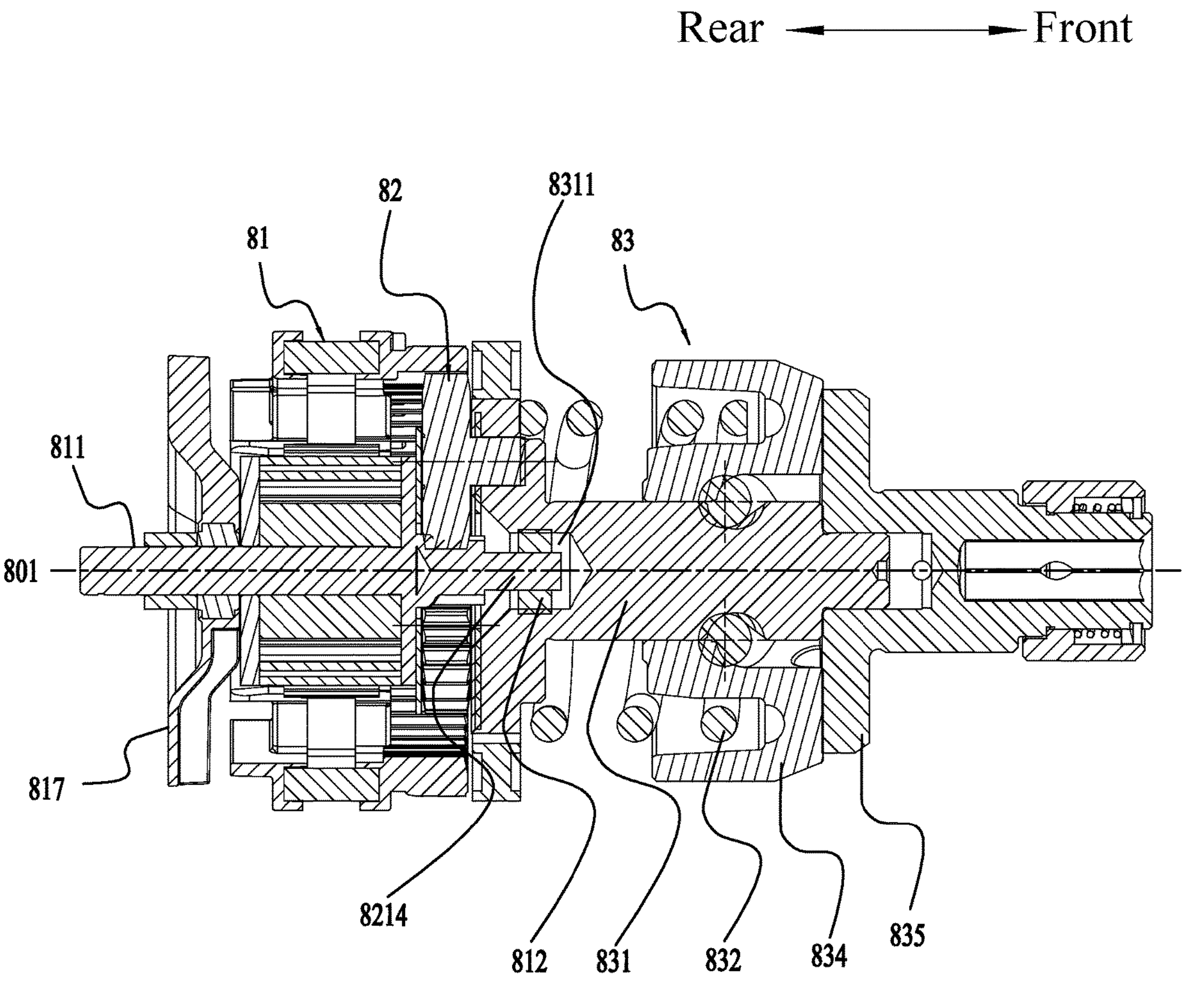
FIG. 36 is a partial sectional view of an eighth example of the present application.
Figure 37:
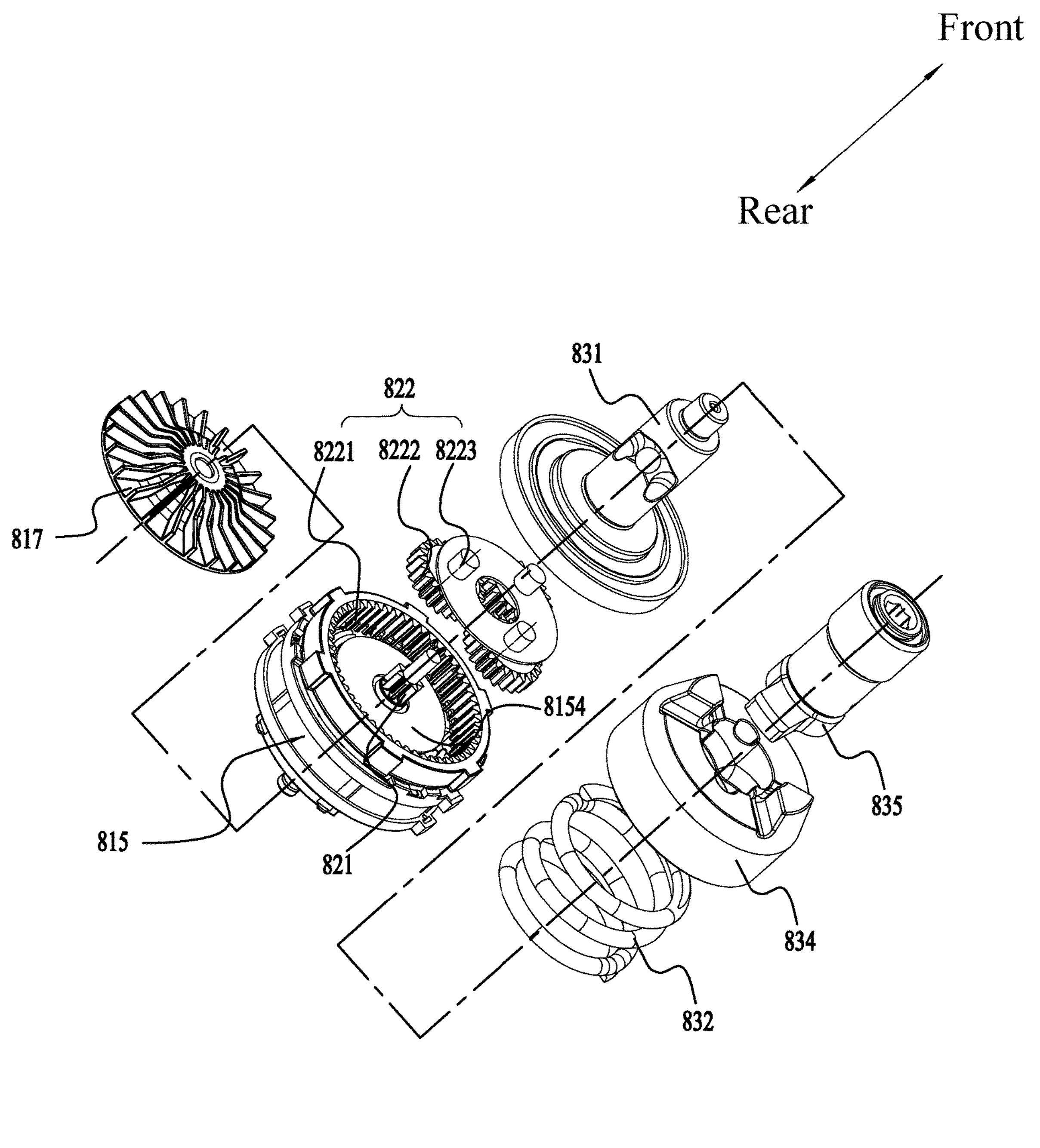
FIG. 37 is a partial exploded view of FIG. 36.
Figure 38:
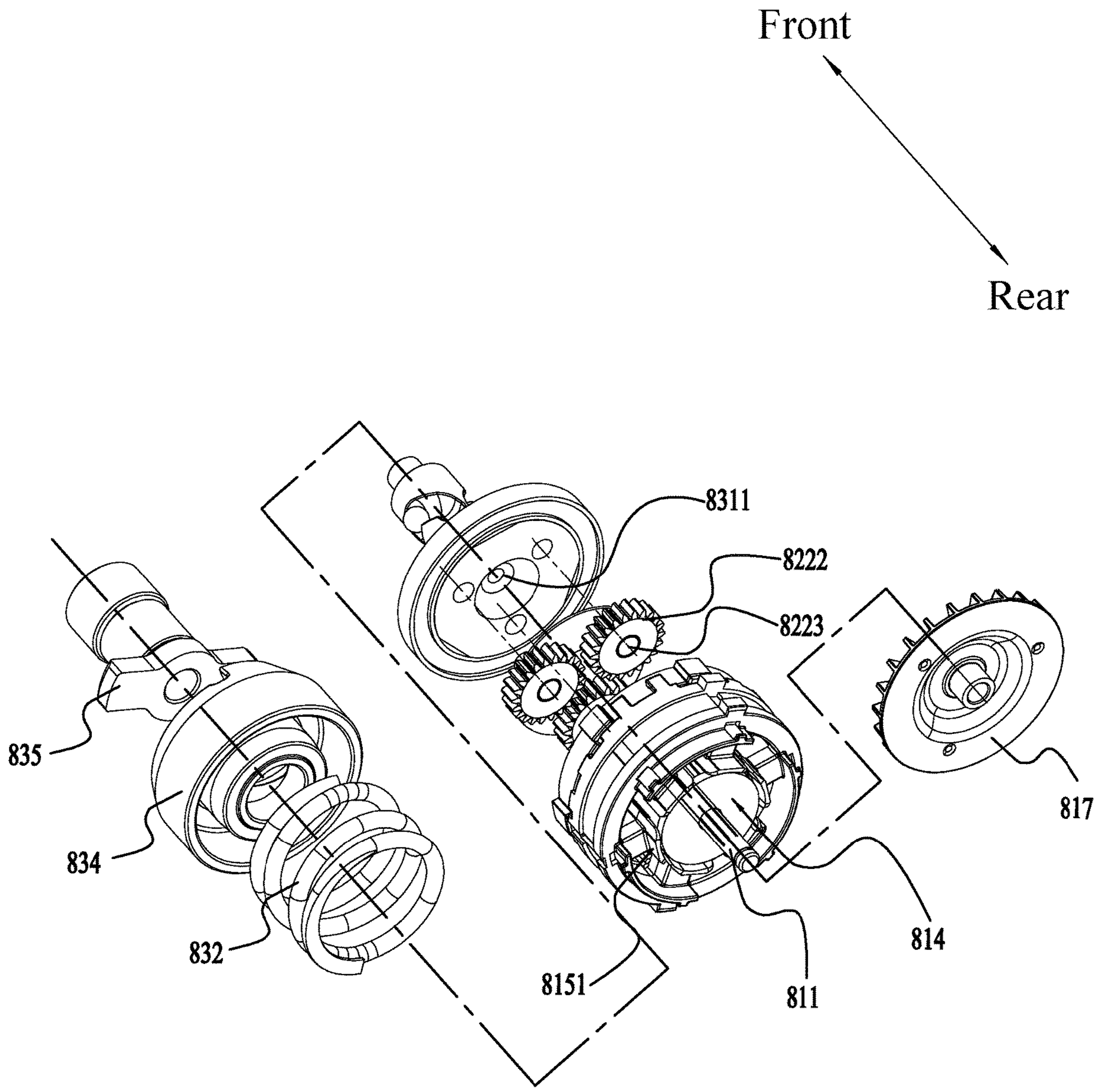
FIG. 38 is a view of FIG. 37 from another perspective.
Figure 39:
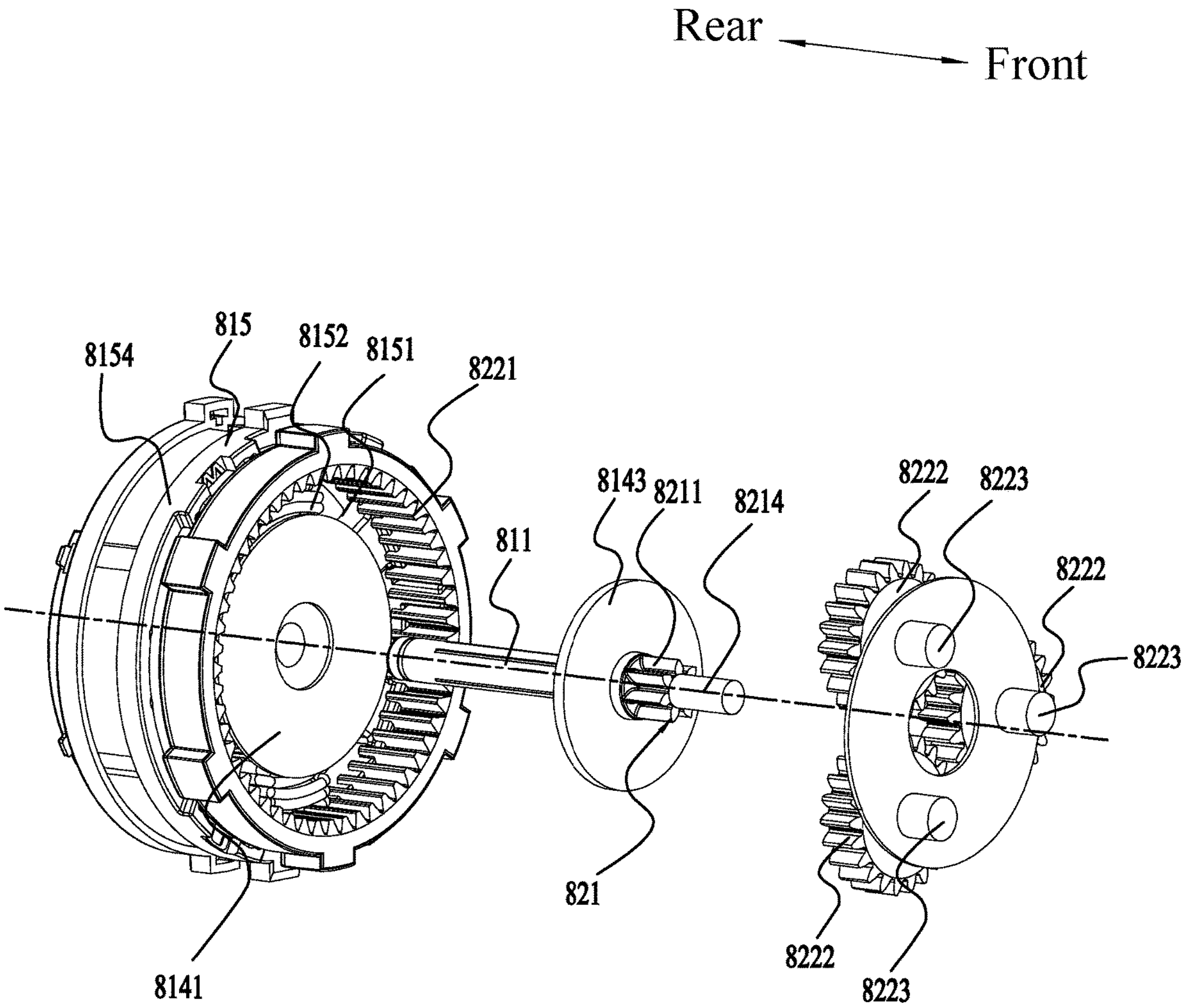
FIG. 39 is a partial exploded view of an electric motor and a transmission assembly in FIG. 36.

FIG. 34 shows a seventh example of the present disclosure. A power output assembly 74 includes an output shaft bearing 742 for supporting an output shaft 741 and a limiting member 743 for axially limiting the output shaft 741. The output shaft bearing 742 is directly sleeved on the output shaft 741. A difference from the preceding examples is that the power output assembly 74 further includes a gearbox housing 723 and an integrally formed bushing 745, as shown in FIGS. 34 and 35. In this example, the bushing 745 is made of metal and is die cast as an insert onto the gearbox housing 723. A fourth groove 7452 is formed on a first end surface 7451 of the bushing 745. In this example, the output shaft bearing 742 is configured to be a planar bearing. Roller balls in the output shaft bearing 742 are disposed in the fourth groove 7452, and it is ensured that the roller balls of the output shaft bearing 742 can roll in the fourth groove 7452. The output shaft 741 is formed with a circumferentially distributed first groove 7411, and the limiting member 743 is partially disposed in the first groove 7411 and abuts against the output shaft bearing 742 in the front and rear direction. In this example, the limiting member 743 is configured to be a circlip such as a C-shaped circlip or a circular circlip.

During assembly, the output shaft bearing 742 is mounted into the bushing 745, then the limiting member 743 is mounted into the first groove 7411 on the output shaft 741, and finally the output shaft 741 is mounted into the gearbox housing 723 from the rear to the front. In this example, the gearbox housing has an anti-collision function when the impact tool performs impacting.

As shown in FIGS. 36 to 39, an eighth example of the solution differs from the first example in the connection manner between a transmission assembly 82, an electric motor 81, and an impact assembly 83 and specific structures of the transmission assembly 82 and the electric motor 81.

In this example, the electric motor 81 includes a stator 815, a rotor 814, and a drive shaft 811 connected to or formed on the rotor 814, where the drive shaft 811 rotates about a first axis 801. The rotor 814 of the electric motor 81 is coaxially sleeved in the stator 815, that is to say, the electric motor 81 is an inrunner.

The transmission assembly 82 is disposed between the electric motor 81 and the impact assembly 83. The transmission assembly 82 includes a sun gear 821 and a planetary gearset 822 that rotates in mesh with the sun gear 821.

The stator 815 includes a stator core 8151, stator windings 8152 wound on the stator core, and a stator front end plate 8154 disposed at a front end of the stator core 8151, where the stator core 8151 is provided with a through hole 8153, and the rotor 814 is disposed in the through hole.

The rotor 814 includes a rotor body 8141 and a rotor front end plate 8143 that are disposed inside the through hole of the stator 815. The rotor front end plate 8143 is disposed at a front end of the rotor body 8141, and two ends of the drive shaft 811 penetrate through the rotor body 8141. A part of a front end of the drive shaft 811 that exceeds a rear end of the rotor body 8141 is connected to a fan 817 for heat dissipation of the electric motor 81. The drive shaft 811 penetrates through the rotor front end plate 8143, and the drive shaft 811 is fixedly connected to or integrally formed with the rotor front end plate 8143. The sun gear 821 is connected to or formed at the front end of the drive shaft 811. In this example, the sun gear 821 is disposed on a front end surface of the rotor front end plate 8143. The sun gear 821 rotates coaxially with the drive shaft 811. Specifically, the sun gear 821 is fixedly connected to or integrally formed with the drive shaft 811, or the sun gear 821 is fixedly connected to or integrally formed with the rotor front end plate 8143, or the sun gear 821, the drive shaft 811, and the rotor front end plate 8143 are fixedly connected to or integrally formed with each other. A part of the front end of the drive shaft 811 that exceeds the rotor front end plate 8143 is supported by a second bearing 812. The second bearing 812 is disposed at a front end of the sun gear 821. In this example, the sun gear 821 includes an engaging tooth portion 8211 engaged with the planetary gearset 822 and a connecting shaft 8214 disposed on a front side of the engaging tooth portion 8211. The connecting shaft 8214 rotates coaxially with the drive shaft 811, and the second bearing 812 is sleeved on the connecting shaft 8214.

The impact assembly 83 is used for outputting an impact force. The impact assembly 83 includes a main shaft 831, an impact block 834 sleeved on an outer circumference of the main shaft 831, a hammer anvil 835 disposed at a front end of the impact block 834, and a spring 832.

The planetary gearset 822 includes an inner ring gear 8221 and multiple planet gears 8222 engaged with the inner ring gear 8221. The inner ring gear 8221 is engaged around the multiple planet gears 8222. The inner ring gear 8221 is disposed on the stator 815. In this example, the inner ring gear 8221 is disposed on the stator front end plate 8154, and the inner ring gear 8221 is fixedly connected to or integrally formed with the stator front end plate 8154, that is to say, the inner ring gear 8221 and the stator front end plate 8154 may be two separate components or may be integrally formed into one integral component. Specifically, the stator front end plate 8154 is provided with internal teeth on an inner side of the stator front end plate 8154 through a powder metallurgy process, thereby forming the structure of the inner ring gear 8221.

The planetary gearset 822 further includes multiple planet gear pins 8223. The planet gear 8222 is sleeved on the planet gear pin 8223 and rotatably connected to the planet gear pin 8223. The planet gear pins 8223 are fixedly connected to the main shaft 831 to transmit the power outputted by the drive shaft 811 to the main shaft 831. In this example, the planet gear pins 8223 are fixedly connected to the main shaft 831 in a cantilever beam manner. Each planet gear 8222 is sleeved at an end of the planet gear pin 8223 extending along the front and rear direction so that power on the planet gear 8222 is transmitted to the planet gear pin 8223. The other end of the planet gear pin 8223 is fixedly disposed in the main shaft 831 so that the main shaft 831 can rotate simultaneously with the planet gear pin 8223.

In this example, the inner ring gear 8221 and the stator 815 are connected. More specifically, the inner ring gear 8221 and the stator 815 are integrally formed into one integral component so that an axial length of the impact tool is reduced, and the internal structure of the impact tool is more compact. Compared to the preceding examples, this example can reduce at least a wall thickness of the gearbox housing. Further, a distance from a rear end surface of the inner ring gear 8221 to a front end surface of the stator 815 can be reduced, and the axial length can be reduced by 6 mm to 11 mm according to the present product dimension.

The main shaft 831 is formed with a first groove opened backwards. In this example, the first groove is coaxial with the main shaft 831 and is circular. The second bearing 812 is embedded into the first groove. Specifically, an outer race of the second bearing 812 abuts against an inner wall of the first groove, and an inner race of the second bearing 812 abuts against the connecting shaft 8214 of the sun gear 821.

It is to be understood that this example may be applied to other power tools, for example, hand-held power tools such as an electric drill, an impact drill, an electric screwdriver, a grinding power tool (a sander, a flat sander, or an angle grinder), a reciprocating saw, and a multifunctional tool and outdoor power tools such as a grass trimmer, a lawn mower, a pruner, and an electric saw, especially a power tool using planet gears for rotary transmission.

Figure 40:
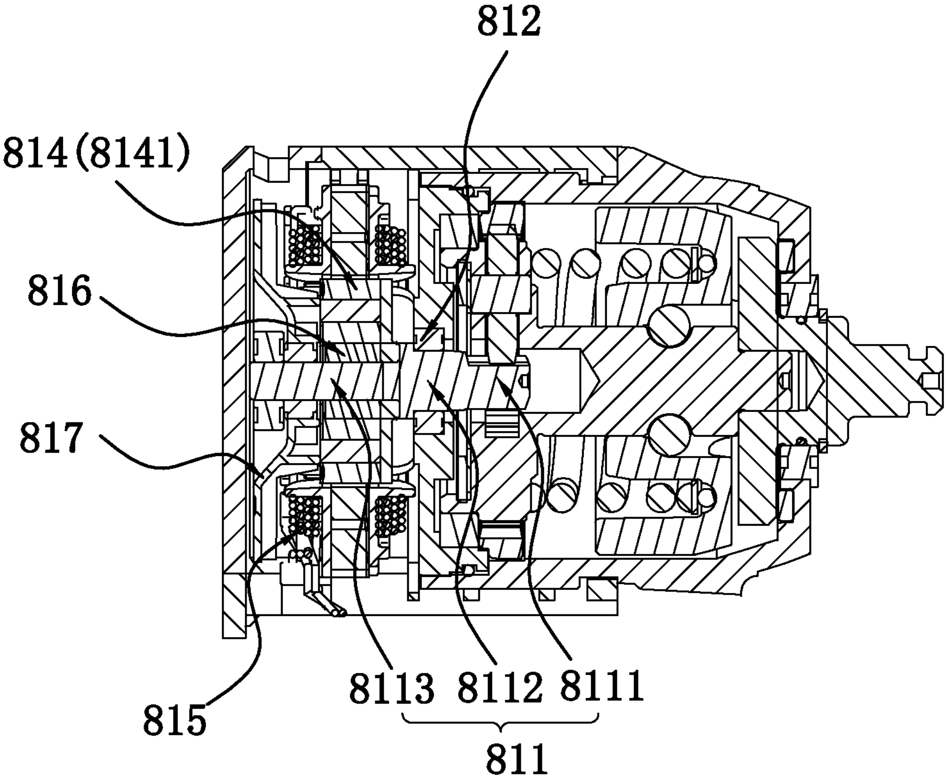
FIG. 40 is a partial sectional view of an alternative sun gear and an electric motor shaft according to the present application.
Figure 41:
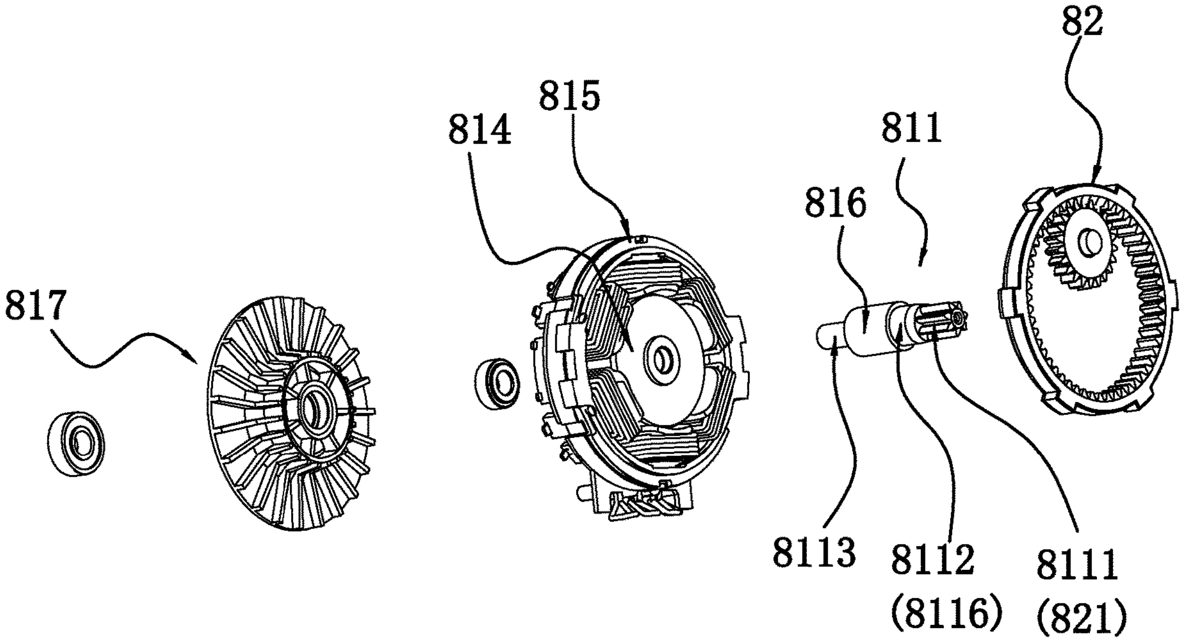
FIG. 41 is an exploded view of part of components in FIG. 40.
Figure 42:
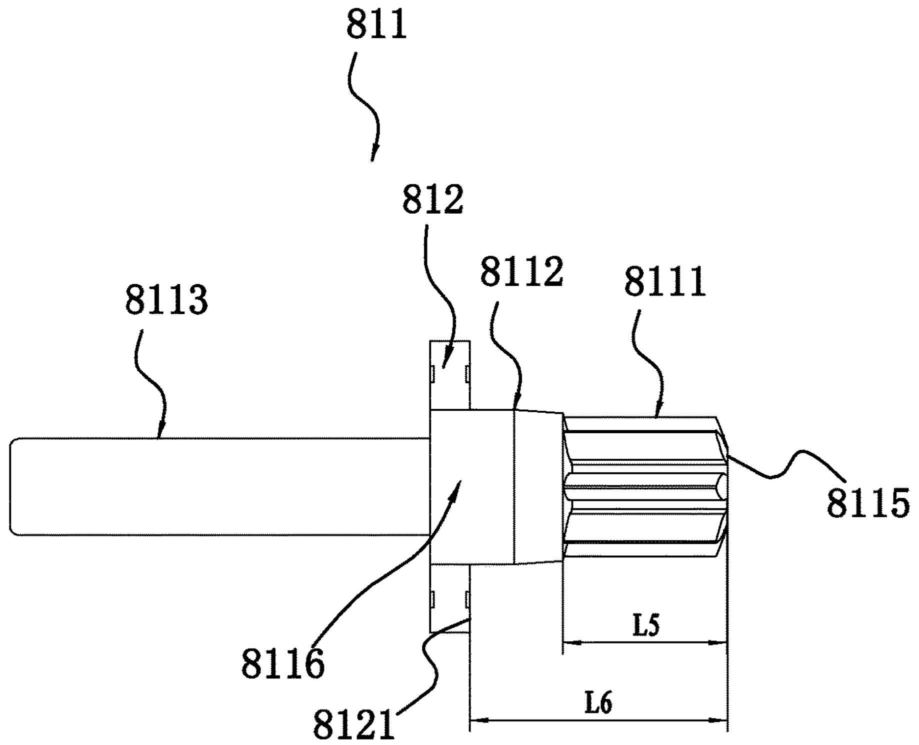
FIG. 42 is a structural view of the electric motor shaft and a bearing in FIG. 40.

As shown in FIGS. 40 to 42, in any one of the first example to the eighth example, an assembly manner and a relationship between the sun gear and the electric motor shaft are provided as an alternative. For convenience of reference, the reference numerals in the eighth example are still used below.

The electric motor of the impact tool includes the stator 815, the rotor 814, an electric motor shaft 811, and the fan 817. In this example, an axial direction of the electric motor shaft 811 is defined as a first direction, an end of the electric motor shaft 811 connected to the transmission assembly 82 is the front, and an end of the electric motor shaft 811 connected to the fan 817 is the rear.

The electric motor shaft 811 includes a first part 8111, a second part 8112, and a third part 8113 in sequence from the front to the rear. The third part 8113 penetrates through the rotor 814 and is fixedly connected to the rotor 814. Specifically, a sleeve 816 is fixed to the third part 8113 and connected to the rotor body 8141, thereby achieving the connection between the electric motor shaft 811 and the rotor 814. An end of the third part 8113 facing away from the first part 8111 and penetrating through the rotor 814 is used for mounting the fan 817. The second part 8112 of the electric motor shaft 811 has a greater diameter than the third part 8113, the second part 8112 is provided with a mounting portion 8116, the second bearing 812 for supporting the electric motor shaft 811 is disposed on the mounting portion 8116, and two end surfaces of the second bearing 812 may abut against the transmission assembly 82 and the stator 815 separately. The first part 8111 is formed with the sun gear 821 for drivingly mating with the transmission assembly 82. The second part 8112 is integrally formed with the third part 8113.

Preferably, in this example, the first part 8111 is integrally formed with the second part 8112, and an effective gear length of the first part 8111 is L5 (that is, a length of the sun gear 821 along the first direction). The second bearing 812 has a first end surface 8121 facing the sun gear 821, the first part 8111 has a second end surface 8115 facing away from the second bearing 812, and a distance between the first end surface 8121 and the second end surface 8115 in the first direction is L6, where a ratio of L5 to L6 is greater than or equal to 0.4 and less than or equal to 1. Further, the ratio of L5 to L6 is greater than or equal to 0.6 and less than or equal to 1.

On the premise that a certain effective gear length is required, a dimension of the electric motor shaft 811 and a dimension of the whole electric motor along the first direction can be reduced, the structural compactness of the electric motor along the first direction can be improved, the volume of the electric motor can be reduced, and the dimension of the power tool along the first direction can be more compact.

In the related art, in some examples, in order that the sun gear 821 on the first part 8111 is integrally formed with the second part 8112, machining is generally performed through a cutting tool with milled teeth, a hobbing machine, or a gear shaper. In the preceding machining manner, a relief cut needs to be reserved at an end of the first part 8111 facing the second part 8112, resulting in that the effective gear length L5 is less than a length of the first part 8111 to a large extent.

Preferably, in this example, the sun gear 821 is formed on the first part 8111 through a cold extrusion process. Cold extrusion refers to a process of placing a metal blank into a mold cavity in a cold state and forcing the metal to be extruded from the mold cavity under the action of strong pressure and a certain speed, so as to obtain an extrusion with a desired shape, a desired dimension, and certain mechanical properties. The relief cut does not need to be provided when the sun gear 821 on the first part 8111 is formed by using the cold extrusion process, thereby ensuring the structural compactness of the electric motor of the power tool. Specific process parameters for cold extrusion of the sun gear 821 may be appropriately adjusted according to various factors such as the specific shape and material of the sun gear 821 and are not specifically limited herein.

In other alternative examples, the sun gear 821 may be formed through a hot forging process or the like.

Figure 43:
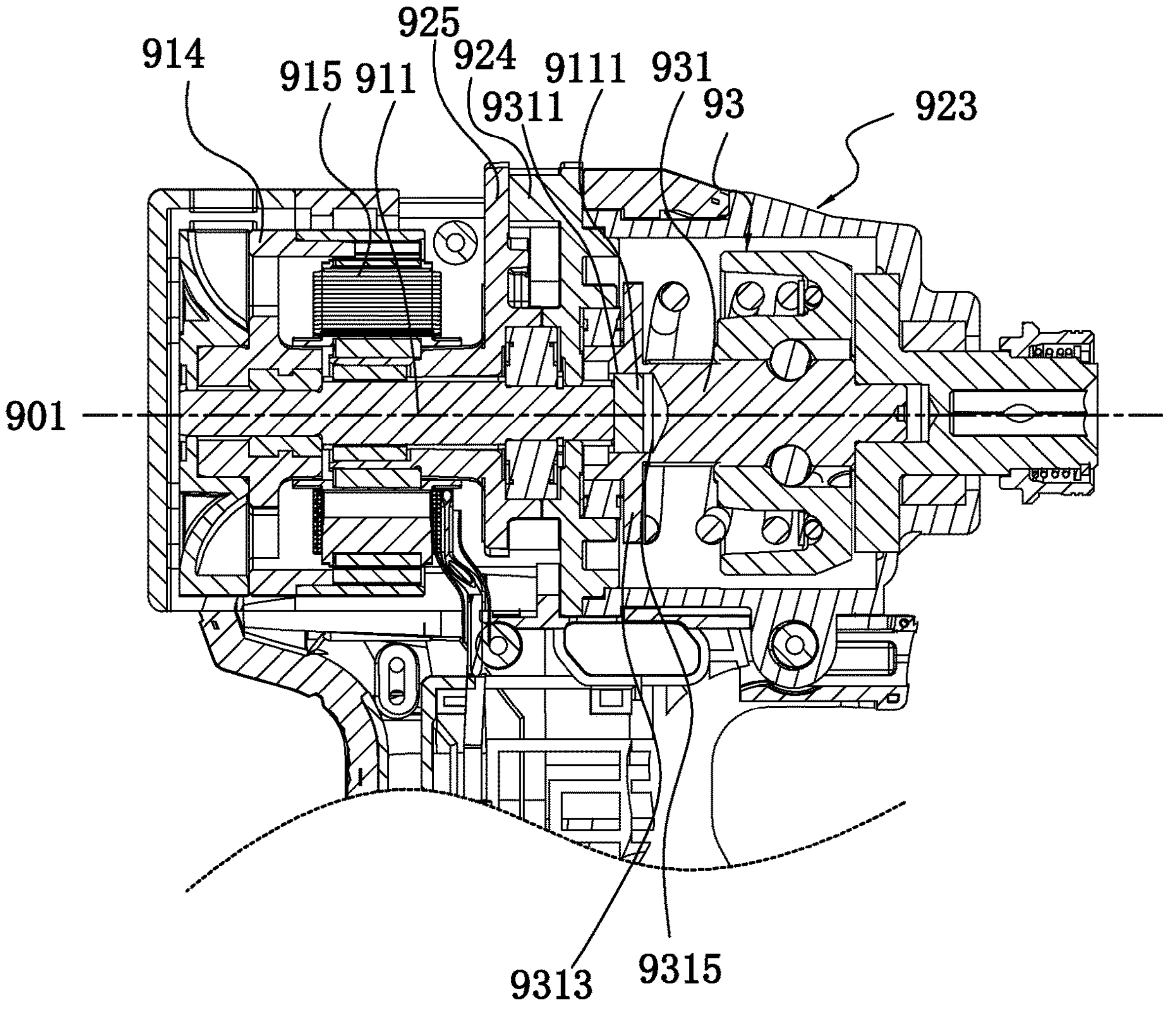
FIG. 43 is a partial sectional view of a ninth example of the present application.
Figure 44:
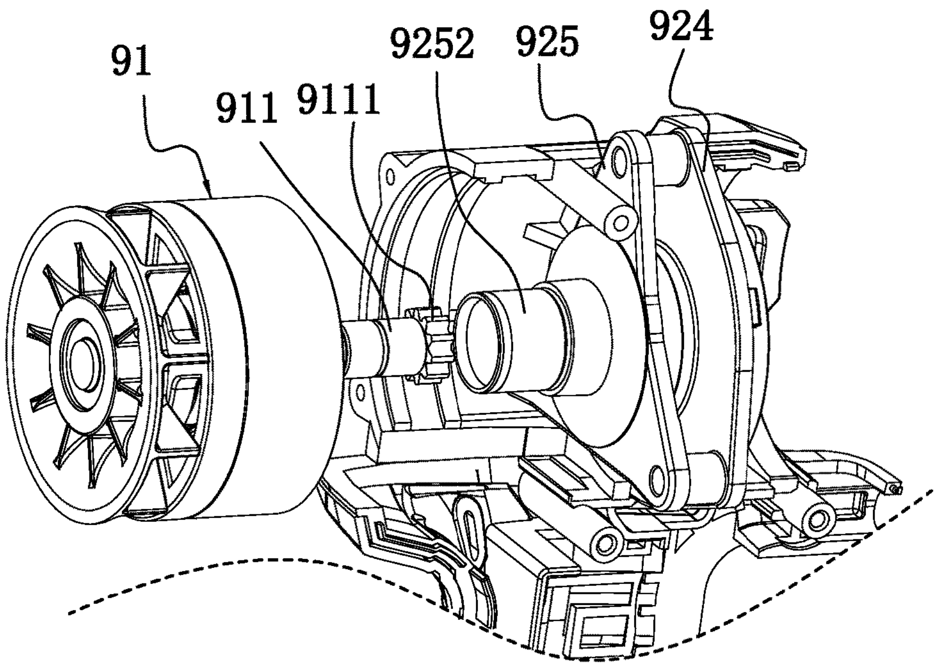
FIG. 44 is an exploded view of part of components in FIG. 43.
Figure 45:
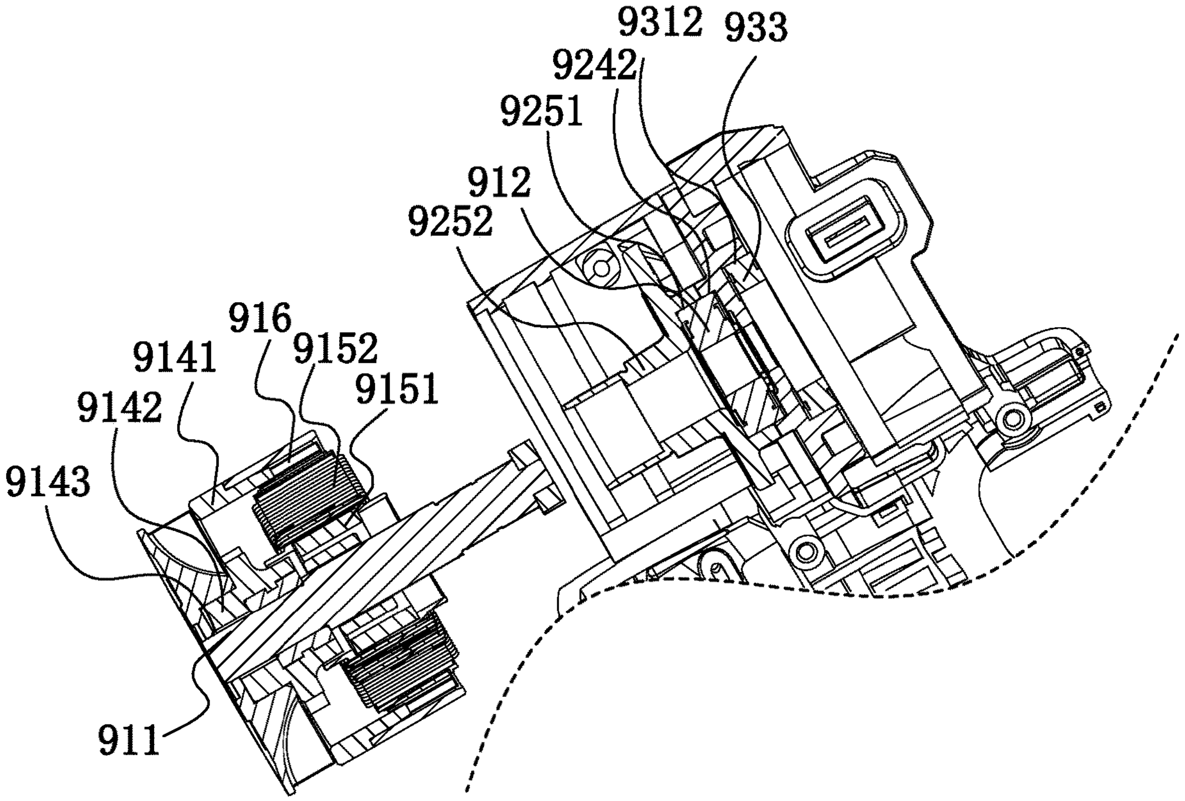
FIG. 45 is a sectional view of FIG. 44.

As shown in FIGS. 43 to 45, the ninth example of the solution differs from the first example in a specific structure of an electric motor 91, the direct connection between the electric motor and an impact assembly 93, and the removal of the transmission assembly.

The electric motor 91 includes a stator 915, a rotor 914, and a drive shaft 911 connected to or formed on the rotor 914, where the drive shaft 911 rotates about a first axis 901. In this example, the rotor 914 of the electric motor 91 is coaxially sleeved on an outer side of the stator 915, that is to say, the electric motor 91 is an outrunner. The rotor 914 forms a sleeve structure. The stator includes a stator core 9151 and stator windings 9152 wound on the stator core 9151. The stator core 9151 is disposed in the rotor 914, and the drive shaft 911 penetrates through the stator core 9151 and is connected to the rotor 914.

The rotor 914 includes a sleeve portion 9141 and an end cap portion 9142, where the sleeve portion 9141 and the end cap portion 9142 are separately formed and then fixed into a whole. It is to be understood that the sleeve portion 9141 and the end cap portion 9142 may be integrally formed, which is not limited here. Specifically, the sleeve portion 9141 surrounds an accommodating cavity in which the stator is accommodated. Multiple rotor permanent magnets 916 extending along the direction of the first axis are fixed on an inner wall of the sleeve portion 9141, that is, a cavity wall of the accommodating cavity and arranged circumferentially on the inner wall of the sleeve portion 9141. The end cap portion 9142 is fixed to an end of the sleeve portion 9141 and at least partially encloses the accommodating cavity. The end cap portion 9142 is further provided with a first through hole 9143, and the drive shaft 911 can penetrate through the accommodating cavity and be accommodated in the first through hole 9143. At the same time, the drive shaft 911 is fixedly connected to the rotor 914 so that when the rotor 914 rotates, the drive shaft 911 is driven to rotate about the first axis 901, thereby outputting torque.

The drive shaft 911 is directly connected to a main shaft 931 through a connector, that is, the drive shaft 911 is directly connected to the main shaft 931. A rotational speed of the electric motor 91 is basically the same as a rotational speed of the main shaft 931, and output torque of the drive shaft 911 is basically the same as torque inputted to the main shaft 931.

External splines 9111 are disposed at a front end of the drive shaft 911, and internal splines 9311 mating with the external splines 9111 are disposed at a rear end of the main shaft 931. The male shaft structure is formed on or connected to the front end of the drive shaft 911. The front end may be the foremost end or the relative front end, that is, the male shaft structure may be an edge of the front end of the drive shaft 911, or a structure having another function may be disposed at a front end of the male shaft structure. The female socket structure is engaged with the male shaft structure for at least radial and circumferential limiting. At the same time, basically no relative motion occurs between the male shaft structure and the female socket structure. It is to be understood that the male shaft structure and the female socket structure mate with each other stably and are driven synchronously by the drive shaft 911.

As an alternative example, a pin shaft connection structure, a flange connection structure, or a male and female shaft connection structure in which components mate with each other is disposed at the front end of the drive shaft 911 and the rear end of the main shaft 931, separately, and any connection structure between the drive shaft 911 and the main shaft 931 which coaxially rotate without a gear ratio is within the scope of this example.

The impact assembly 93 is disposed in an impact housing, where the impact housing includes a front housing 923, a first support cover 924, and a second support cover 925, where the front housing 923 is a hammer housing. In other alternative examples, the front housing 923 may be connected to the hammer housing, which is not intended to limit the substance. The first support cover 924 is connected to a rear end of the front housing 923 through a fastener, and the first support cover 924 remains stationary relative to the front housing 923. The second support cover 925 is connected to the first support cover 924. The first support cover 924 and the second support cover 925 may be split structures or an integrally formed structure. Further, positions of the drive shaft 911 and the main shaft 931 are positioned radially and axially by the first support cover 924 and the second support cover 925.

The first support cover 924 is close to the main shaft 931. The main shaft 931 is formed with a first groove 9315 into which the drive shaft 911 partially extends. The internal splines 9311 are formed in or connected to the first groove 9315. The first support cover 924 is formed with a second groove 9312. An opening direction of the first groove 9315 is opposite to an opening direction of the second groove 9312 in the front and rear direction. The second groove 9312 is configured to be a bearing support groove for accommodating a main shaft bearing 933. The main shaft bearing 933 is used for supporting the rotation of the main shaft 931. The main shaft 931 is formed with a flange 9313 along a circumferential outer side of the main shaft 931. The main shaft bearing 933 abuts against the main shaft 931 through the bearing support groove, thereby limiting axial and radial displacements of the main shaft 931.

Further, the first support cover 924 is formed with or connected to a third groove 9242 with an opening direction opposite to the opening direction of the second groove 9312 in the front and rear direction. The second support cover 925 is provided with a fourth groove 9251, where the fourth groove 9251 and the third groove 9242 form a second bearing support groove for accommodating a second bearing 912. It is to be understood that the second bearing support groove may be composed of the fourth groove 9251 and the third groove 9242, or the second bearing support groove may be accommodated only on the first support cover 924 or the second support cover 925, that is, one of the first support cover 924 or the second support cover 925 is used for limiting an axial displacement and the other one of the first support cover 924 or the second support cover 925 is used for limiting a radial displacement.

The second support cover 925 is close to the electric motor 91. The second support cover 925 extends along a direction of the first axis 901 to form a first channel 9252. The first channel 9252 surrounds the drive shaft 911. The drive shaft 911 is at least partially accommodated in the first channel 9252. The first channel 9252 at least partially extends into the electric motor. Specifically, the first channel 9252 at least partially extends between the stator core 9151 and the drive shaft 911.

It is to be understood that in the case where the output capability of the electric motor can satisfy torque requirements of the impact tool, in other alternative examples, the electric motor 91 is an inrunner, a brushed motor, or other electric motor structures, and the structure of the electric motor 91, as a power supply source, does not affect the scope of this example.

Figure 2:
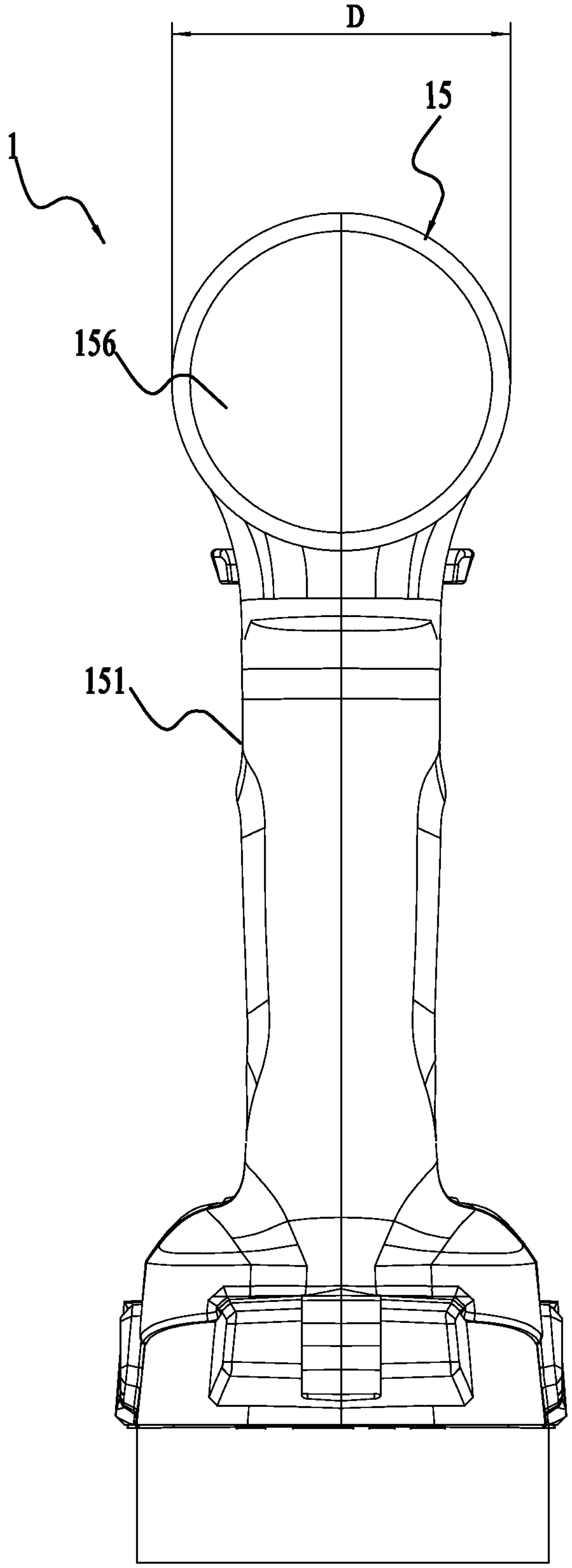
FIG. 2 is a view of FIG. 1 from another perspective.

In the impact tools described in the preceding examples, as shown in FIGS. 1 to 3, a length L from the outer sidewall 156 at the rear end of the housing to the front end of the output shaft 141, that is, an axial length L of the impact tool, may be reduced, and part of the technical solutions in the preceding examples may be used alone or a combination of several technical solutions may be used, so as to reduce the axial length of the impact tool according to actual requirements of the impact tool. Among the related products disclosed at present, the impact tool has an overall axial length of 120 mm and an outer circumferential diameter of 61 mm, but the dimensions of the related products still cannot satisfy the customer's requirements for product miniaturization. Specifically, in the examples of the present application, the length L from the outer sidewall 156 at the rear end of the housing to the front end of the output shaft 141 may be less than that (120 mm) in the related art. For example, the length L is less than 114 mm. Further, the length L is less than 97 mm, and still further, the length L is less than 90 mm. After an axial dimension of the electric motor is reduced, the length L from the outer sidewall 156 at the rear end of the housing to a front end of the hammer anvil 135 is greater than or equal to 84 mm and less than or equal to 86 mm.

In the examples of the present application, an axial length of the transmission assembly, in particular, a length L1 from a rear end surface of the gearbox housing 183 to the front end of the output shaft 141 is reduced. For example, the length L1 is less than 74 mm. Further, the length L1 is less than 66 mm, and still further, the length L1 is greater than or equal to 59 mm and less than or equal to 66 mm, so as to ensure that the outputted impact force satisfies the usage criteria.

The outer circumferential diameter D of the housing 15 may be less than that (61 mm) in the related art. When the length L from the outer sidewall 156 at the rear end of the housing to the front end of the hammer anvil 135 is less than or equal to 97 mm and greater than or equal to 84 mm, the outer circumferential diameter D of the housing 15 is less than or equal to 60 mm. Further, the outer circumferential diameter D of the housing 15 is less than or equal to 58 mm and greater than or equal to 56 mm. When the transmission assembly is removed, the length L from the outer sidewall 156 at the rear end of the housing to the front end of the hammer anvil 135 is further reduced than the length in the first example, where L is greater than or equal to 78 mm and less than or equal to 80 mm.

In an example, an impact wrench outputs a torque of at least 50 N·m. In an example, an impact wrench outputs a torque of at least 75 Nm. In an example, an impact wrench outputs a torque of at least 100 N·m. In an example, an impact wrench outputs a torque of at least 150 N·m, preferably more than 160 N·m.

What is claimed is:

1. An impact tool, comprising:

a motor comprising a drive shaft that rotates about a first axis;

an output shaft used for outputting power and rotating about an output axis;

an impact assembly used for applying an impact force to the output shaft and comprising a main shaft driven by the drive shaft, an impact block connected to the main shaft, and a hammer anvil mating with and struck by the impact block;

a housing in which the motor is at least partially accommodated;

a hammer housing formed on or connected to the housing, wherein the output shaft is at least partially accommodated in the hammer housing; and a grip connected to or formed on the housing;

wherein a length L from a rear end of the housing to a front end of the output shaft is greater than or equal to 78 mm and less than or equal to 97 mm and an outer circumferential diameter D of the housing is less than or equal to 60 mm.

2. The impact tool of claim 1, wherein the length L from the rear end of the housing to the front end of the output shaft is greater than or equal to 78 mm and less than or equal to 90 mm and the outer circumferential diameter D of the housing is less than or equal to 58 mm.

3. The impact tool of claim 1, further comprising a transmission assembly for transmitting power outputted by the drive shaft to the impact assembly, wherein the transmission assembly comprises a gearbox housing disposed inside the housing, a rear end of the gearbox housing faces the motor, and a length L1 from the rear end of the gearbox housing to the front end of the output shaft is less than or equal to 74 mm.

4. The impact tool of claim 1, further comprising a fan that rotates about a second axis and connected to the motor, wherein the fan comprises a fan baseplate and fan blades disposed on the fan baseplate, the fan blades are disposed on a side of the fan baseplate along a circumferential direction of the fan baseplate, and the fan baseplate covers part of the fan blades along a direction perpendicular to the second axis.

5. The impact tool of claim 4, wherein in a plane perpendicular to the second axis, a smallest circle with a point on the second axis as a center and containing an outer contour of the fan baseplate has a radius of R1, a smallest circle with the point on the second axis as a center and containing an outer contour of the fan blades has a radius of R2, R1<R2, and 4:8≤R1:R2≤6.5:8.

6. The impact tool of claim 4, wherein the fan is disposed on a side of the motor facing away from the output shaft, the fan is disposed between a first bearing for supporting a rear end of the drive shaft and the motor, and the first bearing at least partially overlaps with the fan along a direction of the first axis.

7. The impact tool of claim 4, wherein the fan blades are disposed at least partially on a front end surface of the fan baseplate, and at least part of edges of the fan blades on a rear side of the fan blades are basically flush with a rear end surface of the fan baseplate along the first axis.

8. The impact tool of claim 4, wherein the fan at least partially overlaps with the motor along the first axis.

9. The impact tool of claim 1, further comprising a second bearing for supporting the drive shaft and a main shaft bearing for supporting the main shaft; wherein the impact assembly further comprises a spring sleeved on the main shaft, and a projection of the spring on a reference plane along the first axis overlaps with a projection of at least one of the second bearing or the main shaft bearing on the reference plane along the first axis.

10. The impact tool of claim 9, wherein a projection of the second bearing on the reference plane along the first axis overlaps with a projection of the main shaft bearing on the reference plane along the first axis.

11. The impact tool of claim 9, wherein the main shaft is formed with a first groove in which the drive shaft or the second bearing is at least partially disposed, and the main shaft is further formed with a second groove in which at least part of the spring is disposed along the first axis.

12. The impact tool of claim 11, wherein a projection of the first groove on a reference plane perpendicular to an up and down direction overlaps with a projection of the second groove on the reference plane perpendicular to the up and down direction.

13. The impact tool of claim 1, wherein the drive shaft comprises at least a first part and a second part along the first axis, the second part is provided with a mounting portion for mounting a second bearing, the first part is formed with a gear that drives the impact assembly, an effective gear length of the first part is L5, the second bearing has a first end surface facing the gear, the first part has a second end surface facing away from the second bearing, and a distance between the first end surface and the second end surface along the first axis is L6, wherein a ratio of L5 to L6 is greater than or equal to 0.4 and less than or equal to 1.

14. The impact tool of claim 13, wherein the gear is formed on the first part through a cold extrusion process.

15. The impact tool of claim 3, wherein the motor comprises a stator and a rotor that rotates relative to the stator, and the drive shaft is formed on or connected to the rotor, the transmission assembly comprises a sun gear connected to or formed at a front end of the drive shaft and a planetary gearset, the planetary gearset comprises a plurality of planet gears that rotate in mesh with the sun gear and an inner ring gear that is engaged around the plurality of planet gears, and the inner ring gear is formed on or connected to the stator.

* * * * *